(12) United States Patent
Hiraizumi et al.

(10) Patent No.: US 8,073,274 B2
(45) Date of Patent: Dec. 6, 2011

(54) IMAGE PROCESSING APPARATUS, IMAGE PROCESSING METHOD, STORAGE MEDIUM, AND PROGRAM

(75) Inventors: Kei Hiraizumi, Kanagawa (JP); Tetsujiro Kondo, Tokyo (JP); Kazutaka Ando, Kanagawa (JP); Yasunobu Node, Tokyo (JP); Michimasa Obana, Tokyo (JP); Masanori Machimura, Tokyo (JP); Masato Akao, Kanagawa (JP)

(73) Assignee: Sony Corporation (JP)

( * ) Notice: Subject to any disclaimer, the term of this patent is extended or adjusted under 35 U.S.C. 154(b) by 1037 days.

(21) Appl. No.: 11/800,803

(22) Filed: May 7, 2007

(65) Prior Publication Data
US 2008/0019594 A1    Jan. 24, 2008

(30) Foreign Application Priority Data

May 11, 2006  (JP) ................. P2006-132713

(51) Int. Cl.
*G06K 9/46* (2006.01)
(52) U.S. Cl. ........ 382/239; 382/232; 382/254; 386/241; 386/248
(58) Field of Classification Search .......... 382/239, 382/254; 348/606–624; 386/241, 248
See application file for complete search history.

(56) References Cited

U.S. PATENT DOCUMENTS

| | | | | |
|---|---|---|---|---|
| 5,099,322 A * | 3/1992 | Gove | ............................ | 348/700 |
| 5,404,316 A * | 4/1995 | Klingler et al. | ............... | 715/723 |
| 6,424,789 B1 * | 7/2002 | Abdel-Mottaleb | ............. | 386/52 |
| 6,704,029 B1 * | 3/2004 | Ikeda et al. | .................... | 715/723 |
| 7,020,381 B1 * | 3/2006 | Kato et al. | ....................... | 386/52 |
| 7,272,183 B2 * | 9/2007 | Abiko et al. | ............. | 375/240.16 |
| 7,725,828 B1 * | 5/2010 | Johnson | ........................ | 715/726 |
| 2002/0154140 A1 * | 10/2002 | Tazaki | .......................... | 345/620 |
| 2004/0240562 A1 * | 12/2004 | Bargeron et al. | ........ | 375/240.29 |

FOREIGN PATENT DOCUMENTS
JP    2003-202944 A    7/2003
JP    2006109005 A    4/2006

OTHER PUBLICATIONS
Office Action from Japanese Application No. 2006-132713, dated Jan. 13, 2011.

* cited by examiner

*Primary Examiner* — Matthew Bella
*Assistant Examiner* — Eric Rush
(74) *Attorney, Agent, or Firm* — Lerner, David, Littenberg, Krumholz & Mentlik, LLP

(57) ABSTRACT

An image processing apparatus may include a feature value extraction unit adapted to extract a feature value from an image, a setting unit adapted to set setting-information defining a process to be performed on the image, an editing unit adapted to edit the setting-information set by the setting unit, and recording unit adapted to record the setting-information edited by the editing unit, in association with the feature value of the image, on a data recording medium.

42 Claims, 56 Drawing Sheets

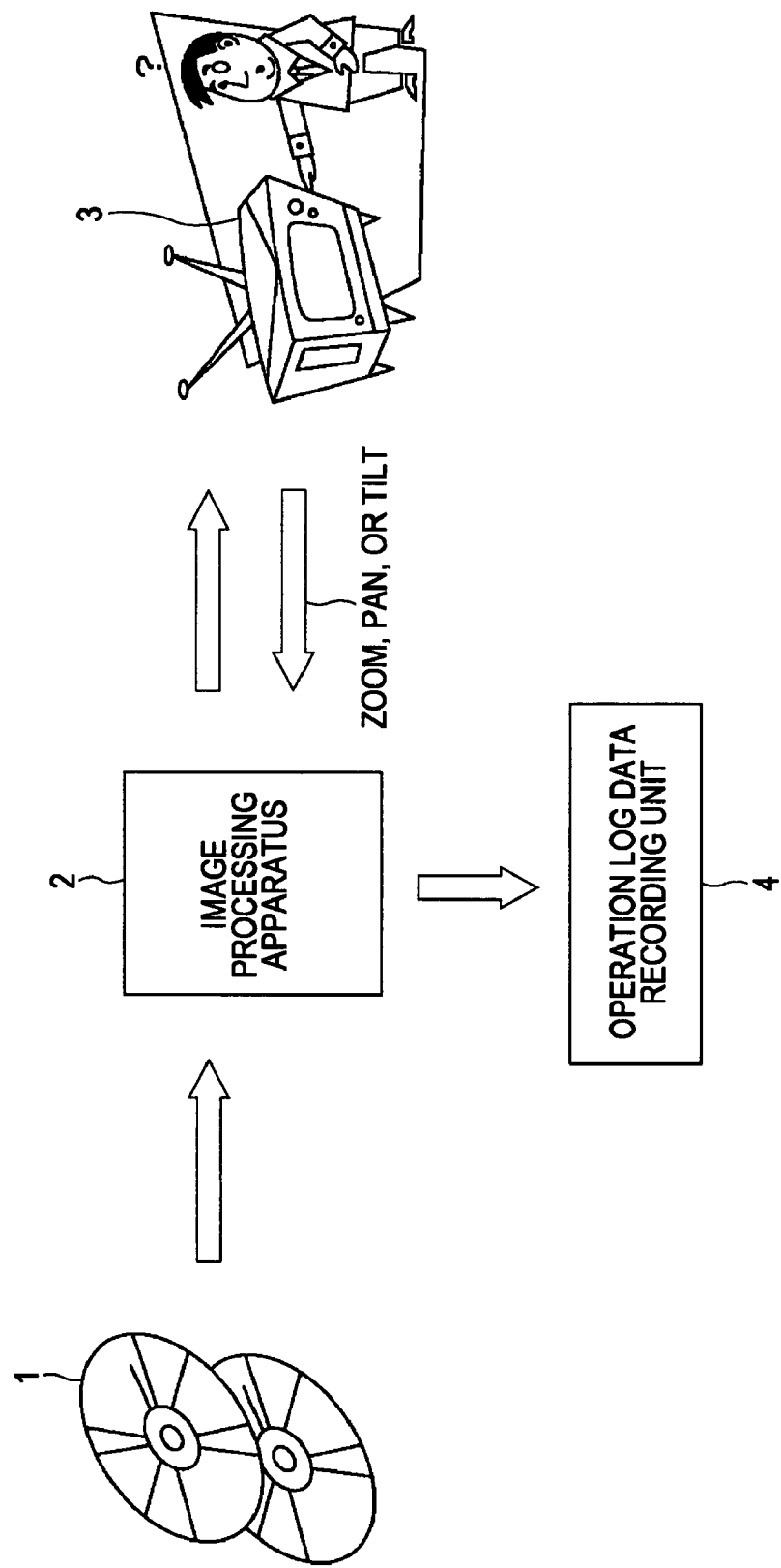

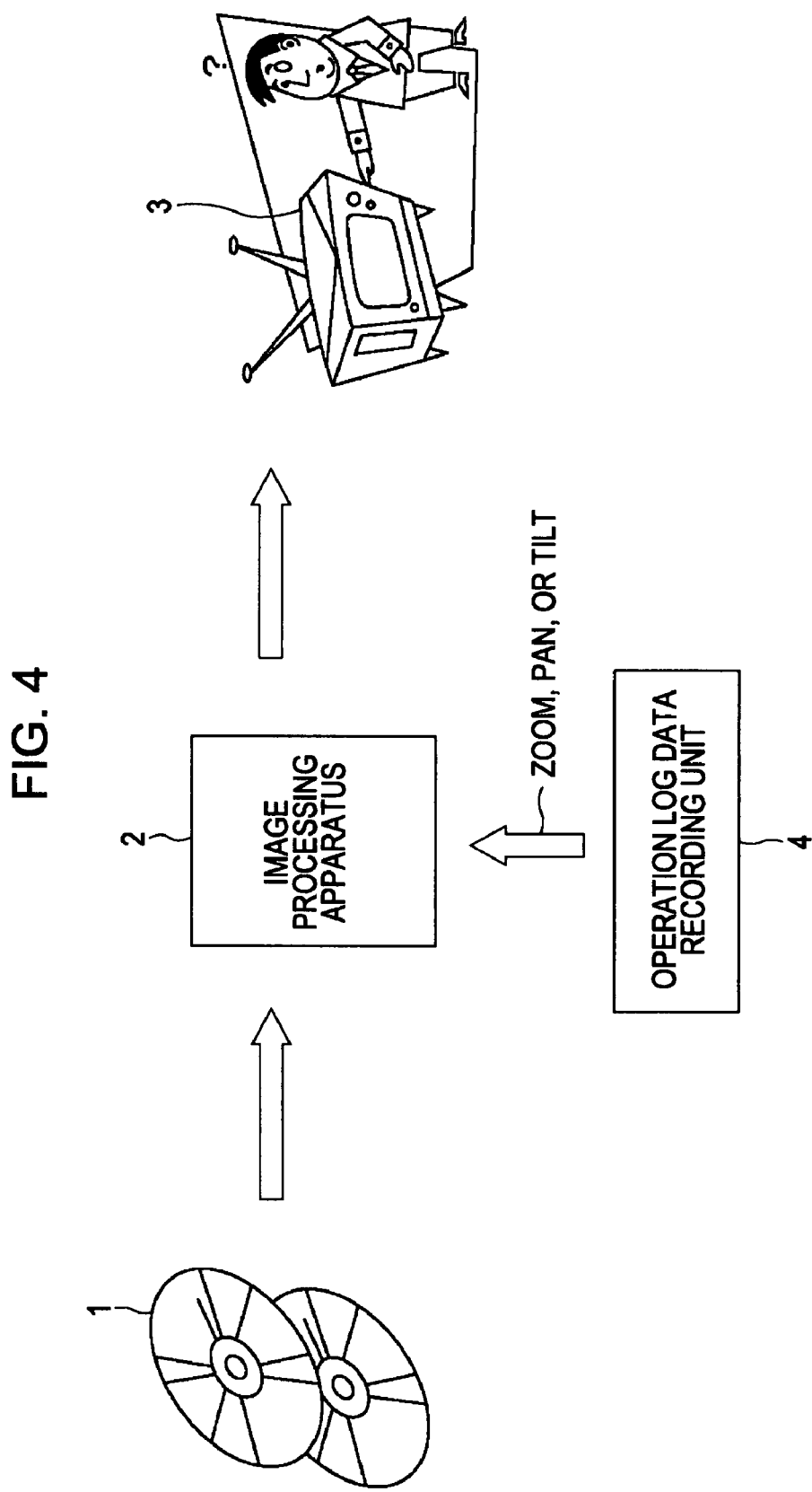

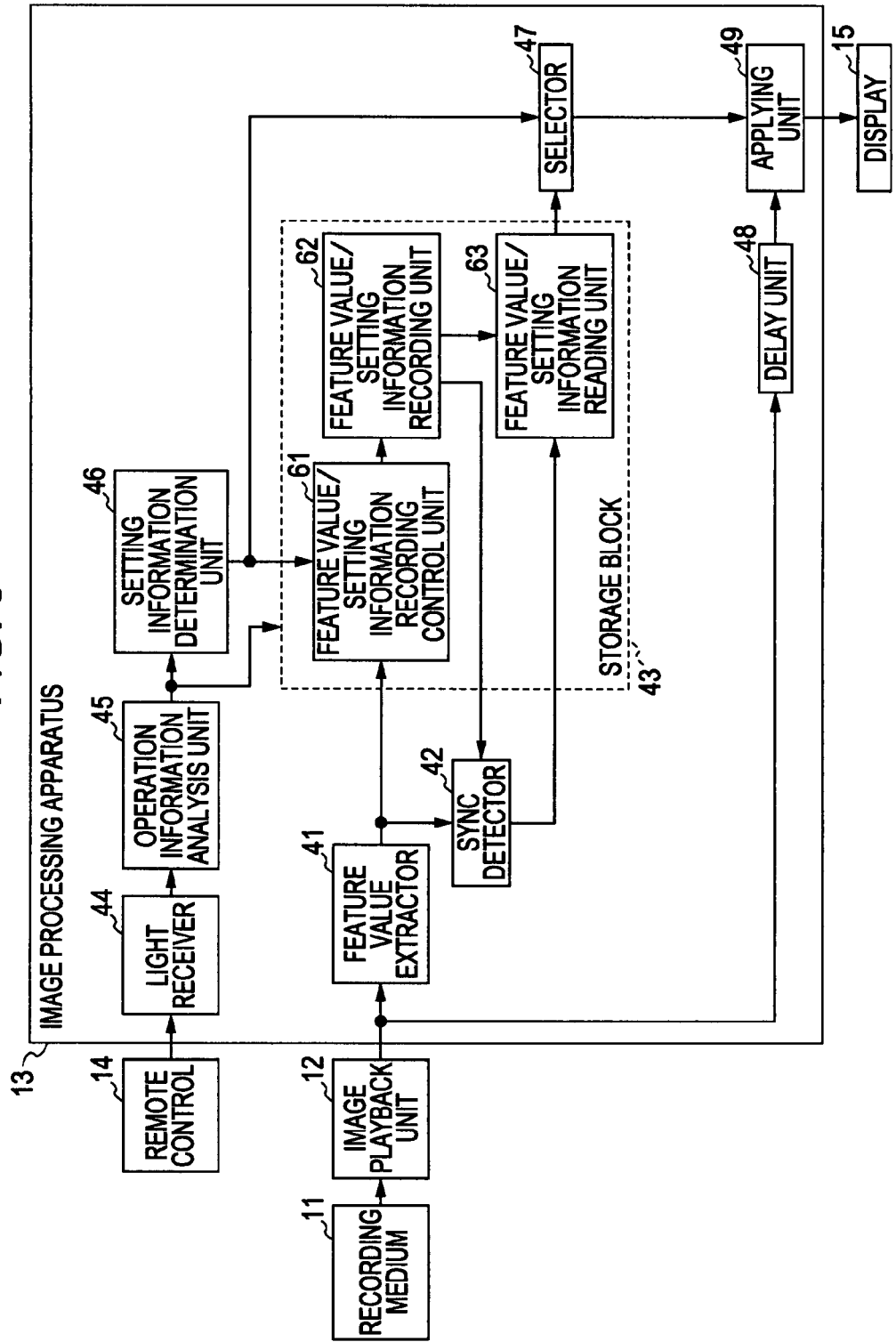

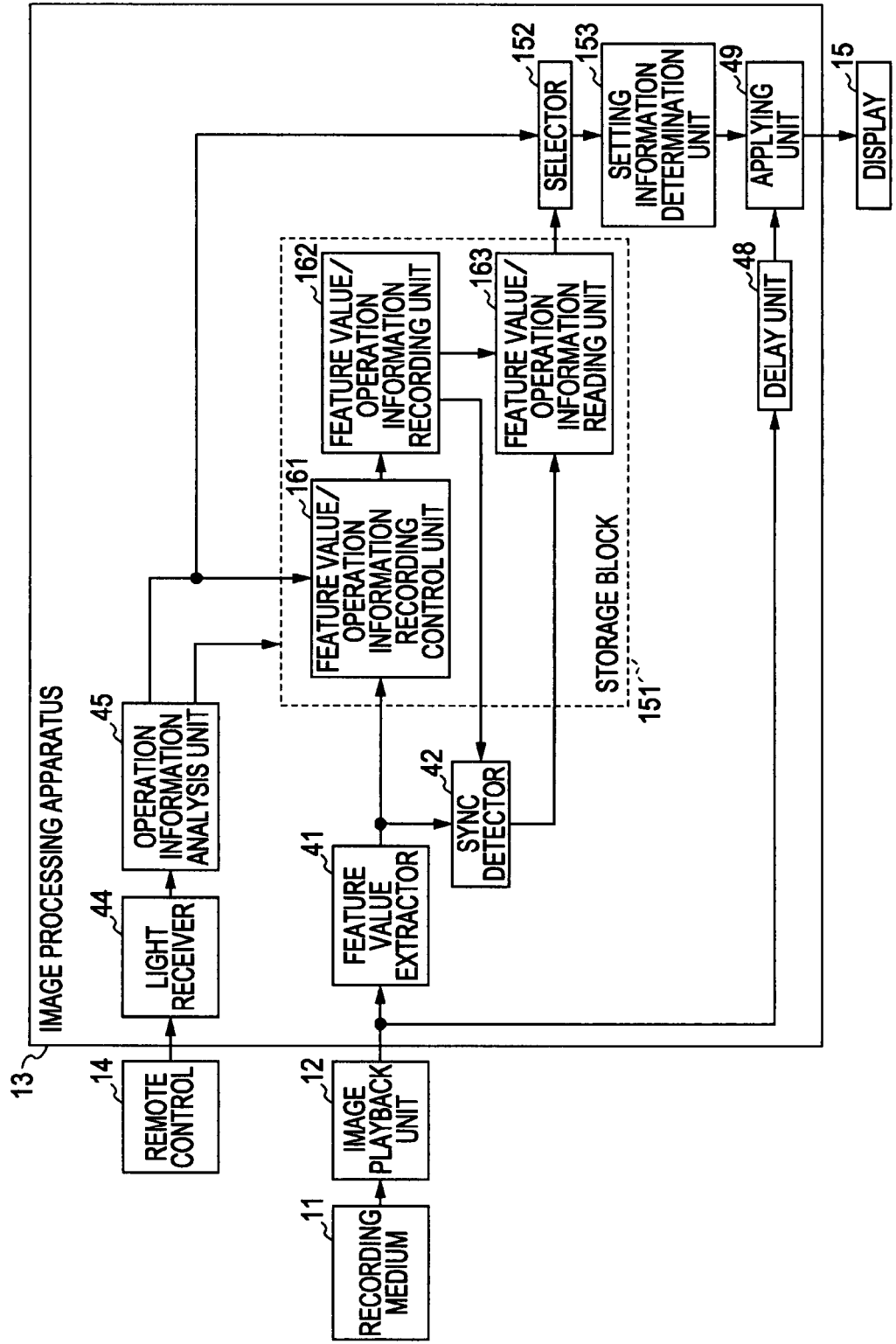

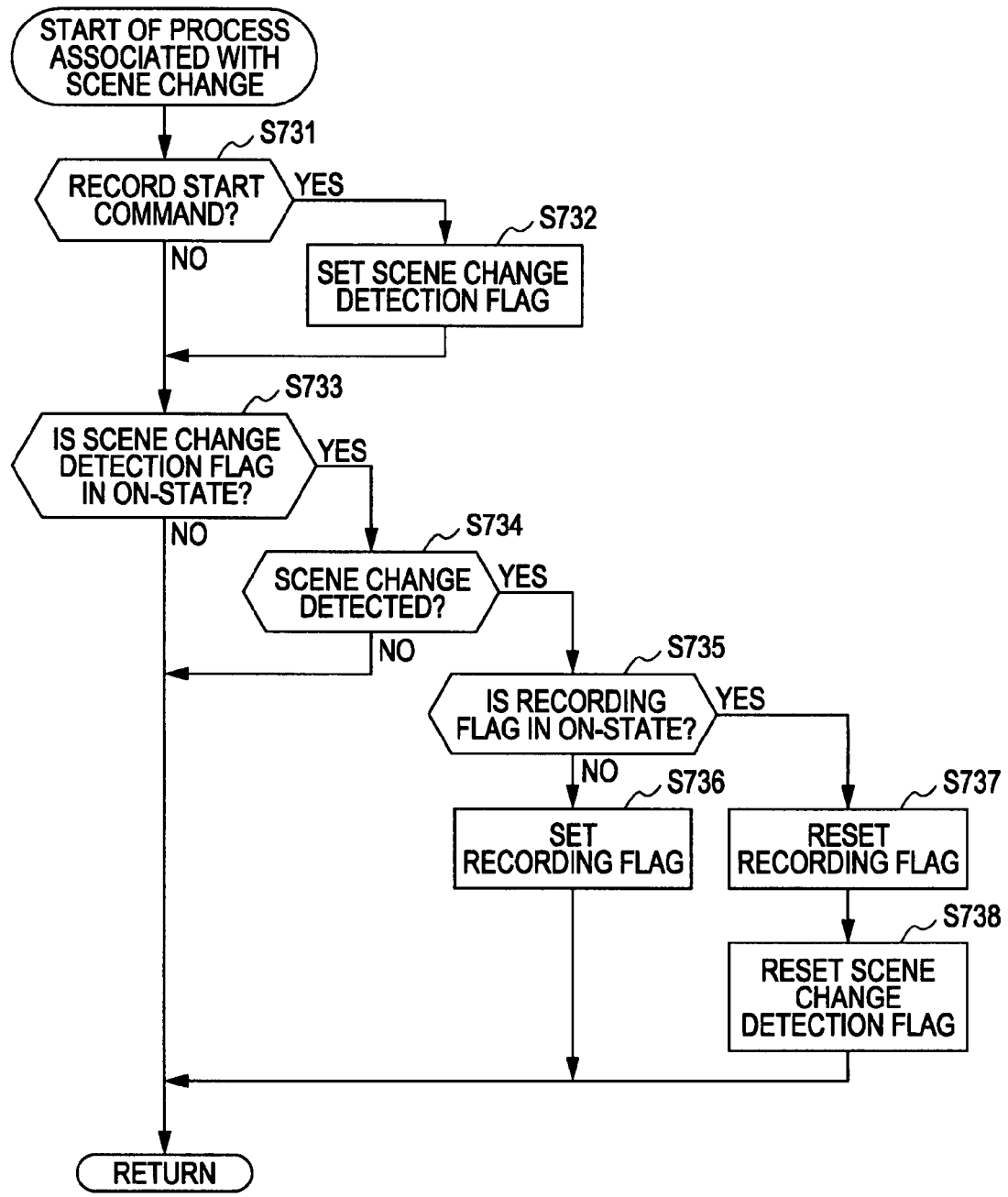

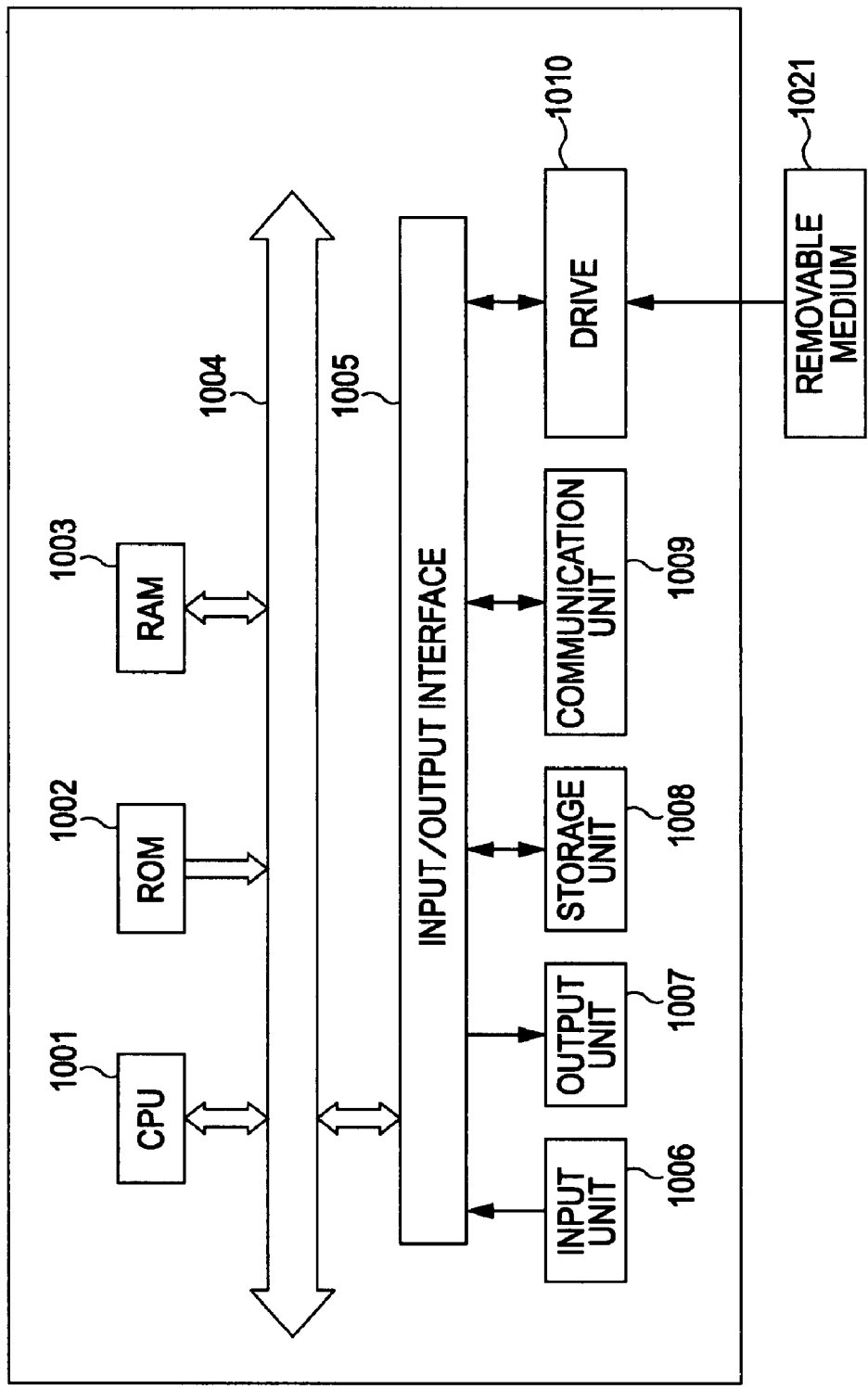

IMAGE PROCESSING APPARATUS, IMAGE PROCESSING METHOD, STORAGE MEDIUM, AND PROGRAM

CROSS-REFERENCE TO RELATED APPLICATIONS

This application claims priority from Japanese Patent Application No. JP 2006-132713 filed in the Japanese Patent Office on May 11, 2006, the entire content of which is incorporated herein by reference.

BACKGROUND OF THE INVENTION

1. Field of the Invention

The present invention relates to an image processing apparatus, and image processing method, a storage medium, and a program. More particularly, the present invention relates to an image processing apparatus, and image processing method, a storage medium, and a program, adapted to record information indicating a process to be performed on an image in association with a feature value of the image thereby allowing it to reproduce the processed image each time the image is played back.

2. Description of the Related Art

Many techniques to easily processing images are available.

Most techniques of editing an image taken by a video camera or the like are based on a linear editing method in which when original image data is being played back, various processes are performed on the played-back image and a resultant image is recorded on a storage medium.

However, the linear editing has a problem that when original image data is protected in a copy-once mode, if the original image data is once recorded on a recording apparatus such as a VTR (Video Tape Recorder), it is not allowed to record an image obtained by editing the image played back from the recording apparatus.

To avoid the above problem, there is proposed a technique to record an operation performed to specify a process to edit an image (for example, see Japanese Unexamined Patent Application Publication No. 2003-202944).

Referring to FIGS. 1 and 2, a known technique of recording and editing an image is described below. In FIG. 1, a horizontal axis indicates "time" of a content recorded, wherein "time" is represented by time code. In FIG. 1, a vertical axis indicates a setting-value recorded and played back. Herein, the setting-value is, for example, a zoom ratio, coordinates of a zoom point, an image parameter such as brightness, contrast, or color, etc.

At the top of FIG. 1, a shaded part of a content indicates a part subjected to editing. In the example shown in FIG. 1, the same part of the content is played back three times or more, and an effect/edit control operation performed on the content is recorded and played back in synchronization with the content.

In the second part immediately below the top part of FIG. 1, a setting-value recorded in a first-time effect/edit control operation is shown. In the first-time effect/edit control operation, as shown in FIG. 1, recording of the setting-value is started when the effect/edit control operation starts, and the recording is ended when the effect/edit control operation ends. Note that at the start point T1 at which recording of the setting-value is started, the setting-value has a normal value. If an operation end button or the like is operated at the end point T2, the effect/edit control operation is ended, and accordingly recording is ended. Thus, in many cases, a discontinuous change in setting-value occurs at the end of the effect/edit control operation, that is, the setting-value returns discontinuously to the normal value at the end of the effect/edit control operation as is the case in the example shown in the second part of FIG. 1.

In the third part, below the second part, of FIG. 1, a setting-value recorded in a second-time effect/edit control operation is shown. In the second-time effect/edit control operation, in this example, the part of the content subjected to the process (from the effect/edit control operation start point T1 to the effect/edit control operation end point T2) is partially modified. More specifically, an operation for modification is started at a modification start point T3 and is ended at a modification end point T4. That is, in the second-time effect/edit control operation, when the same content as that subjected to the first-time effect/edit control operation is being played back, an effect/edit control operation different from that performed in the first-time effect/edit control operation is performed from the modification start point T3 to the modification end point T4 as shown in the third part of FIG. 1.

In the third part of FIG. 1, a broken line indicates the setting-value recorded in the first-time effect/edit control operation.

After the first-time effect/edit control operation is performed (that is, after the setting-value is recorded in the first-time effect/edit control operation), a user has to rewind the content to the effect/edit control operation start point T1 before the second-time effect/edit control operation is started. After the setting-value is recorded in the second-time effect/edit control operation, if the content is again rewound and played back, the setting-value is reproduced in such a manner as shown in the fourth part of FIG. 1. Note that in the second-time effect/edit control operation, the setting-value is overwritten on the setting-value recorded in the first-time effect/edit control operation. Thus, in many cases, a discontinuous change occurs in the setting-value at the end of the overwritten part.

Referring to FIGS. 2A to 2C, a specific example of an effect/edit control operation is described below. FIG. 2A shows a first-time effect/edit control operation and a setting-value recorded in the first-time effect/edit control operation. FIG. 2B shows a second-time effect/edit control operation and a setting-value recorded in the second-time effect/edit control operation. FIG. 2C shows a setting-value recorded as an overall result of the first and second effect/edit control operations. In each of FIGS. 2A and 2B, an upper part shows a setting-value, and a lower part shows an effect/edit control operation.

In the example shown in FIG. 2A, the first-time effect/edit control operation is performed such that an operation signal such as that shown in the lower part of FIG. 2A is output from a controller in accordance with an operation performed on the controller by a user, and a corresponding setting-value is recorded as shown in the upper part of FIG. 2A. Note that the setting-value is given by the integral of the amount of the operation performed on the controller. In FIGS. 2A and 2B, a "positive operation" refers to a positive effect/edit control operation such as enlarging of an image, and a "negative operation" refers to a negative effect/edit control operation such as reducing of an image.

In the example shown in FIG. 2A, a positive effect/edit control operation is performed in a period from an effect/edit control operation start point T1 to an effect/edit control operation end point T11 (see the lower part of FIG. 2A), and the integral of the amount of the operation is recorded as the setting-value. Thus, the recorded setting-value gradually increases as shown in the upper part of FIG. 2A. In a period from a point of time T11 to a point of time T12, a negative effect/edit control operation is performed, and thus the resultant setting-value gradually decreases. After the point of time T12, a positive effect/edit control operation and a negative effect/edit control operation are performed, and a setting-value is recorded in accordance with the operations.

If an operation end button (a record end button) on the controller is operated at the point of time T2, recording of the setting-value is ended. When the recording is ended, the setting-value is returned to the normal value. As a result, the setting-value is recorded as shown in the upper part of FIG. 2A.

As shown in the lower part of FIG. 2B, if a second-time effect/edit control operation is performed on the content subjected to the first-time effect/edit control operation such that a positive effect/edit control operation is performed in a period from a time T3 to a time T21 and a negative effect/edit control operation is performed in a period from the time T21 to a time T4, then a setting-value is recorded in the period from the time T3 to the time T4 as shown in the upper part of FIG. 2B.

In the second-time effect/edit control operation, the integral of the amount of the effect/edit control operation is added to the setting-value recorded at the point of time T3 in the first-time effect/edit control operation. When the effect/edit control operation is ended at the point of time T4, the setting-value is returned to the setting-value recorded at the point of time T4 in the first-time effect/edit control operation.

A setting-value produced as a result of the solidification is recorded as represented by a solid line in the upper part of FIG. 2B (that is, the setting-value is modified to the value represented by the solid line). Thus, after the second-time effect/edit control operation, the overall setting-value is recorded as shown in FIG. 2C.

SUMMARY OF THE INVENTION

In the example shown in FIG. 2C, an abrupt reduction occurs in the setting-value at the point of time T4 and another abrupt reduction occurs at the point of time T2. In the case where the setting-value specifies, for example, a zoom ratio of an image, such an abrupt change in the setting-value causes the image to be abruptly enlarged or reduced. Such an abrupt change in image gives a discomfort impression to a user.

Furthermore, as can be seen from FIG. 2C, the setting-value always starts from the normal value and ends at the normal value. This makes it difficult to freely specify the setting-value at the record start point and the record end point, and there is a possibility that the setting-value is discontinuously returned to the normal value, which can cause an abrupt change in the image as described above.

In a case where editing is performed a plurality of times (two times in the example described above with reference to FIGS. 2A to 2C), a setting-value designated in a second-time edit operation is overwritten on a setting-value recorded in the previous operation, and a discontinuity of the setting-value often occurs at the end of the overwriting (at T4 in the above-described example), which can cause the above-described problem.

That is, in the known recording method, the effect/edit control operation is directly recorded, and no correction is made to obtain a smooth change in setting-value. Thus, it is difficult to avoid an abrupt change in an image.

Another problem of overwriting is in that if editing such as compensation for camera shake is performed on an automatically recorded content, then further editing is not allowed for the result.

In view of the above, it may be desirable to provide a technique to edit an image without causing an abrupt change.

According to an embodiment of the present invention, there is provided a first image processing apparatus which may include feature value extraction means for extracting a feature value from an image, setting means for setting setting-information defining a process to be performed on the image, edit means for editing the setting-information set by the setting means, and recording means for recording the setting-information edited by the edit means, in association with the feature value of the image, on a data recording medium.

In this first image processing apparatus, when the setting by the setting means is ended, the edit means may edit the setting-information between first setting-information given at the end of the setting by the setting means and second setting-information defined as normal setting-information such that the setting-information gradually changes from the first setting-information to the second setting-information.

In the first image processing apparatus, when the setting by the setting means is ended, the edit means may edit the setting-information between first setting-information given at the end of the setting by the setting means and second setting-information which has been assigned for the image at a point of time later than the point of time corresponding to the first setting-information and which has been recorded on the data recording medium such that the setting-information gradually changes from the first setting-information to the second setting-information.

In the first image processing apparatus, the edit means may subtract or add a predetermined value from or to a value indicated by the first setting-information, and may assign third setting-information indicating the result of the subtraction or the addition to the image at a point of time next to the point of time corresponding to the first setting-information, if the value indicated by the third setting-information is not within a predetermined range from the value indicated by the second setting-information, the edit means may further subtract or add the predetermined value from or to the value indicated by the third setting-information, and may assign setting-information, as new third setting-information, indicating the result of the subtraction or the addition to the image at a further next point of time, and if the value indicated by the third setting-information falls within the predetermined range from the value indicated by the second setting-information, the edit means may employ the third setting-information as the second setting-information.

In the first image processing apparatus, the edit means may add a value indicated by setting-information set by the setting means to a value indicated by setting-information which has been set for the same image as the image for which the former setting-information is assigned and which has been recorded on the data recording medium.

The first image processing apparatus may further include key point setting means for setting a key point specifying a start point or an end point of a period during which editing is to be performed by the edit means, wherein the edit means may edit the setting-information such that the setting-information gradually changes in value between two adjacent key points of the key points set by the key point setting means.

The key point setting means may set the key points at a point of time before recording is performed by the recording means or at a point of time after recording is performed by the recording means.

According to another embodiment of the present invention, there is provided a first image processing method which may include extracting a feature value from an image, setting setting-information defining a process to be performed on the image, editing the setting-information set in the setting step, and controlling a recording operation so as to record the setting-information edited in the editing step, in association with the feature value of the image, on a data recording medium.

According to another embodiment of the present invention, there is provided a first storage medium on which a program is stored, the program being executable by a computer to perform a process which may include extracting a feature value from an image, setting setting-information defining a process to be performed on the image, editing the setting-information set in the setting step, and controlling a recording operation so as to record the setting-information edited in the editing step, in association with the feature value of the image, on a data recording medium.

According to another embodiment of the present invention, there is provided a first program executable by a computer to perform a process which may include extracting a feature value from an image, setting setting-information defining a process to be performed on the image, editing the setting-information set in the setting step, and controlling a recording operation so as to record the setting-information edited in the editing step, in association with the feature value of the image, on a data recording medium.

In the first image processing apparatus, the first image processing method, and the first program, a feature value may be extracted from an image, setting-information may be set to define a process to be performed on the image, the setting-information may be edited, and the resultant setting-information may be recorded in association with the feature value of the image on a data recording medium.

According to an embodiment of the present invention, there is provided a second image processing apparatus which may include feature value extraction means for extracting a feature value from an image, setting means for setting setting-information defining a process to be performed on the image, recording means for recording the setting-information, in association with the feature value of the image, on a data recording medium, and control means for determining whether the recording means should record the setting-information on the data recording medium, and controlling recording performed by the recording means in accordance with a determination result.

The control means may determine that the recording means should not record the setting-information on the data recording medium, when at least one of the following conditions is satisfied: (a) identical setting-information is set continuously by the setting means, (b) the setting-information set by the setting means is close to corresponding setting-information recorded on the data recording medium, and (c) the setting-information set by the setting means is close to setting-information defined as normal setting-information.

The second image processing apparatus may further include specifying means for specifying a start point at which to start recording by the recording means and an end point at which to end the recording, wherein the control means may determine that recording of the setting-information on the data recording medium by the recording means is to be started at the start point specified by the specifying means, and the control means may determine that recording of the setting-information on the data recording medium by the recording means is to be ended at the end point specified by the specifying means.

The specifying means may specify the start point and the end point at a point of time before recording is performed by the recording means.

The recording means may temporarily record the setting-information on the data recording medium, the specifying means may specify the start point and the end point after recording is performed by the recording means, and the control means may re-record the setting-information temporarily recorded on the data recording medium such that re-recording of the setting-information is started at the start point and ended at the end point.

The second image processing apparatus may further include detection means for detecting a scene change, wherein when a scene change is detected by the detection means, if recording of setting-information on the data recording medium by the recording means is not being performed, the control means may determine that recording should be started, but if recording of setting-information on the data recording medium by the recording means is being performed, the control means may determine that recording should be ended.

According to an embodiment of the present invention, there is provided a second image processing method which may include extracting a feature value from an image, setting setting-information defining a process to be performed on the image, and controlling recording of the setting-information, in association with the feature value of the image, on a data recording medium such that a determination is made as to whether the setting-information should be recorded on the data recording medium, and recording is controlled in accordance with a determination result.

According to an embodiment of the present invention, there is provided a second storage medium on which a program is stored, the program being executable by a computer to perform a process which may include extracting a feature value from an image, setting setting-information defining a process to be performed on the image, controlling recording of the setting-information, in association with the feature value of the image, on a data recording medium such that a determination is made as to whether the setting-information should be recorded on the data recording medium, and recording is controlled in accordance with a determination result.

According to an embodiment of the present invention, there is provided a second program executable by a computer to perform a process which may include extracting a feature value from an image, setting setting-information defining a process to be performed on the image, controlling recording of the setting-information, in association with the feature value of the image, on a data recording medium such that a determination is made as to whether the setting-information should be recorded on the data recording medium, and recording is controlled in accordance with a determination result.

In the second image processing apparatus, the second image processing method, and the second program, a feature value may be extracted from an image, setting-information may be set to define a process to be performed on the image, the setting-information may be recorded in association with the feature value of the image on a data recording medium, and a determination may be made as to whether the setting-information should be recorded on the data recording medium, and recording may be controlled in accordance with a determination result.

According to an embodiment of the present invention, there is provided a third image processing apparatus which may include feature value extraction means for extracting a feature value from an image, operation means for performing an operation to specify a process to be performed on the image, setting means for, in accordance with the operation performed by the operation means, setting setting-information according to which to perform the process on the image, edit means for editing the operation information, and recording means for recording the operation information edited by the edit means, in association with the feature value of the image, on a data recording medium.

In this third image processing apparatus, when the operation by the operation means is ended, the edit means may edit the operation information between first operation information given at the end of the operation by the operation means and second operation information defined as normal operation information such that the operation information gradually changes from the first operation information to the second operation information.

In the third image processing apparatus, when the operation by the operation means is ended, the edit means may edit the operation information between first operation information given at the end of the operation by the operation means and second operation information which has been assigned at a point of time later than the point of time corresponding to the first operation information and which has been recorded on the data recording medium such that the operation information gradually changes from the first operation information to the second operation information.

The edit means may subtract or add a predetermined value from or to a value indicated by the first operation information, and may assign third operation information indicating the result of the subtraction or the addition to the image at a point of time next to the point of time corresponding to the first operation information, if the value indicated by the third operation information is not within a predetermined range from the value indicated by the second operation information, the edit means may further subtract or add the predetermined value from or to the value indicated by the third operation information, and may assign operation information, as new third operation information, indicating the result of the subtraction or the addition to the image at a further next point of time, and if the value indicated by the third operation information falls within the predetermined range from the value indicated by the second operation information, the edit means may employ the third operation information as the second operation information.

The edit means may add a value indicated by the operation information to a value indicated operation information which has been assigned for the same image as the image for which the former operation information is assigned and which has been recorded on the data recording medium.

The third image processing apparatus may further include key point setting means for setting a key point specifying a start point or an end point of a period during which editing is to be performed by the edit means, wherein the edit means may edit the operation information such that the operation information gradually changes in value between two adjacent key points of the key points set by the key point setting means.

The key point setting means may set the key points at a point of time before recording is performed by the recording means or at a point of time after recording is performed by the recording means.

According to an embodiment of the present invention, there is provided a third image processing method which may include extracting a feature value from an image, performing an operation to specify a process to be performed on the image, in accordance with the operation performed in the operation step, setting setting-information according to which to perform the process on the image, editing the operation information, and controlling a recording operation so as to record the operation information edited in the editing step, in association with the feature value of the image, on a data recording medium.

According to an embodiment of the present invention, there is provided a third storage medium on which a program is stored, the program being executable by a computer to perform a process which may include extracting a feature value from an image, performing an operation to specify a process to be performed on the image, in accordance with the operation performed in the operation step, setting setting-information according to which to perform the process on the image, editing the operation information, and controlling a recording operation so as to record the operation information edited in the editing step, in association with the feature value of the image, on a data recording medium.

According to another embodiment of the present invention, there is provided a third program executable by a computer to perform a process which may include extracting a feature value from an image, performing an operation to specify a process to be performed on the image, in accordance with the operation performed in the operation step, setting setting-information according to which to perform the process on the image, editing the operation information, and controlling a recording operation so as to record the operation information edited in the editing step, in association with the feature value of the image, on a data recording medium.

In the third image processing apparatus, the third image processing method, and the third program, a feature value may be extracted from an image, an operation may be performed to specify a process to be performed on the image, in accordance with the performed operation, setting-information may be set according to which to perform the process on the image, operation information is edited, and the resultant operation information may be recorded in association with the feature value of the image on a data recording medium.

According to an embodiment of the present invention, there is provided a fourth image processing apparatus which may include feature value extraction means for extracting a feature value from an image, operation means for performing an operation to specify a process to be performed on the image, setting means for, in accordance with the operation performed by the operation means, setting setting-information according to which to perform the process on the image, recording means for recording operation information indicating the operation performed by the operation means, in association with the feature value of the image, on a data recording medium, and control means for determining whether the recording means should record the operation information on the data recording medium, and controlling recording performed by the recording means in accordance with a determination result.

The control means may determine that the recording means should not record the operation information on the data recording medium, when at least one of the following conditions is satisfied: (d) no signal is supplied from the operation means over a period with a length equal to or greater than a predetermined value, (e) the operation information is close to corresponding operation information recorded on the data recording medium, and (f) the operation information is close to operation information defined as normal operation information.

The fourth image processing apparatus may further include specifying means for specifying a start point at which to start recording by the recording means and an end point at which to end the recording, wherein the control means may determine that recording of the operation information on the data recording medium by the recording means is to be started at the start point specified by the specifying means, and the control means may determine that recording of the operation information on the data recording medium by the recording means is to be ended at the end point specified by the specifying means.

The specifying means may specify the start point and the end point at a point of time before recording is performed by the recording means.

The recording means may temporarily record the operation information on the data recording medium, the specifying means may specify the start point and the end point after recording is performed by the recording means, and the control means may re-record the operation information temporarily recorded on the data recording medium such that re-recording of the operation information is started at the start point and ended at the end point.

The fourth image processing apparatus may further include detection means for detecting a scene change, wherein when a scene change is detected by the detection means, if recording of operation information on the data recording medium by the recording means is not being performed, the control means may determine that recording should be started, but if recording of operation information on the data recording medium by the recording means is being performed, the control means may determine that recording should be ended.

According to an embodiment of the present invention, there is provided a fourth image processing method which may include extracting a feature value from an image, performing an operation to specify a process to be performed on the image, in accordance with the operation performed in the operation step, setting setting-information according to which to perform the process on the image, and determining whether the operation information should be recorded on the data recording medium, and controlling recording in accordance with a determination result.

According to an embodiment of the present invention, there is provided a fourth storage medium on which a program is stored, the program being executable by a computer to perform a process which may include extracting a feature value from an image, performing an operation to specify a process to be performed on the image, in accordance with the operation performed in the operation step, setting setting-information according to which to perform the process on the image, and determining whether the operation information should be recorded on the data recording medium, and controlling recording in accordance with a determination result.

According to another embodiment of the present invention, there is provided a fourth program executable by a computer to perform a process which may include extracting a feature value from an image, performing an operation to specify a process to be performed on the image, in accordance with the operation performed in the operation step, setting setting-information according to which to perform the process on the image, and determining whether the operation information should be recorded on the data recording medium, and controlling recording in accordance with a determination result.

In the fourth image processing apparatus, the fourth image processing method, and the fourth program, a feature value may be extracted from an image, an operation may be performed to specify a process to be performed on the image, in accordance with the performed operation, setting-information may be set according to which to perform the process on the image, the operation information may be recorded in association with the feature value of the image on a data recording medium, a determination may be made as to whether the operation information should be recorded on the data recording medium, and recording may be controlled in accordance with a determination result.

As described above, the present invention may provide a great advantage that the setting-value specifying an effect to be applied to an image may be controlled such that no abrupt change in the image occurs, and the resultant setting-value may be recorded.

BRIEF DESCRIPTION OF THE DRAWINGS

FIG. 3 shows a concept of an image processing apparatus according to an embodiment of the present invention;

FIG. 4 shows a concept of an image processing apparatus according to an embodiment of the present invention;

FIG. 5 is a block diagram showing a configuration of an image processing apparatus according to an embodiment of the present invention;

FIG. 6 is a block diagram showing a configuration of an image processing apparatus according to an embodiment of the present invention;

FIG. 50 is a flow chart showing a process associated with scene change detection according to an embodiment of the present invention;

FIG. 57 is a diagram illustrating a storage medium and a personal computer on which image processing functions are implemented by software according to an embodiment of the present invention.

DETAILED DESCRIPTION

Before embodiments of the present invention are described, correspondence between specific examples of parts/steps in the embodiments and those essential to the present invention. Note that the purpose of the following description is to indicate that specific examples of the present invention are described in the embodiments, and thus the purpose of the following description is not to limit the present invention to those described below. That is, there can be a part/step that is not described in the following description of the correspondence but that corresponds to a part/step according to the present invention. Conversely, an example of a part/step, which is described in the following description as corresponding to a particular aspect of the invention, can correspond to a part/step of another aspect of the invention.

Figure 18:
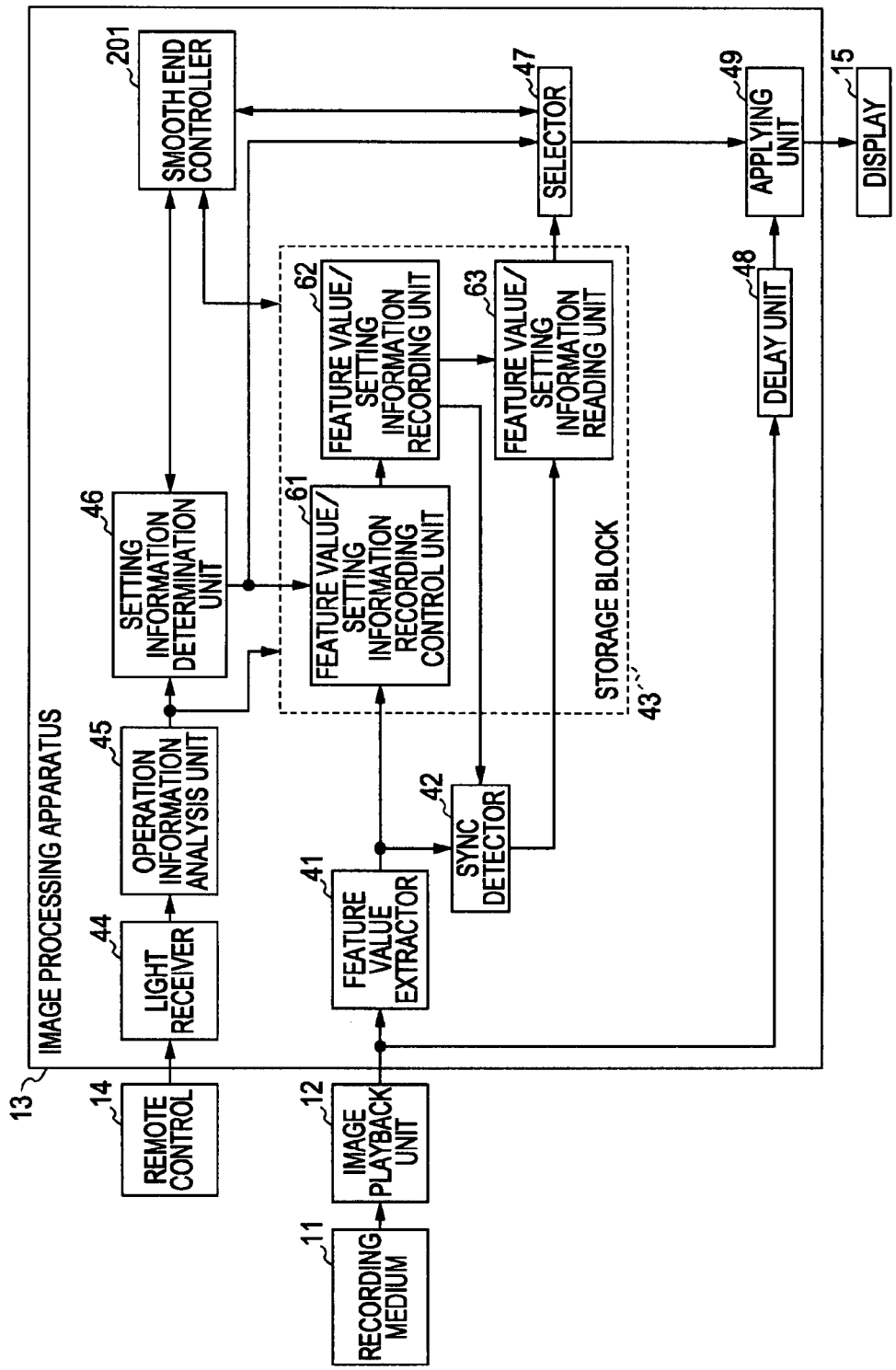
FIG. 18 is a block diagram showing a configuration of an image processing apparatus according to an embodiment of the present invention.

According to an embodiment of the present invention, there is provided a first image processing apparatus (for example, an image processing apparatus 13 shown in FIG. 18) including feature value extraction means (for example, a feature value extractor 41 shown in FIG. 18) for extracting a feature value from an image, setting means (for example, a setting-information determination unit 46 shown in FIG. 18) for setting setting-information defining a process to be performed on the image, edit means (for example, a smooth end controller 201 shown in FIG. 18) for editing the setting-information set by the setting means, and recording means (for example, a storage block 43 shown in FIG. 18) for recording the setting-information edited by the edit means, in association with the feature value of the image, on a data recording medium.

Figure 37:
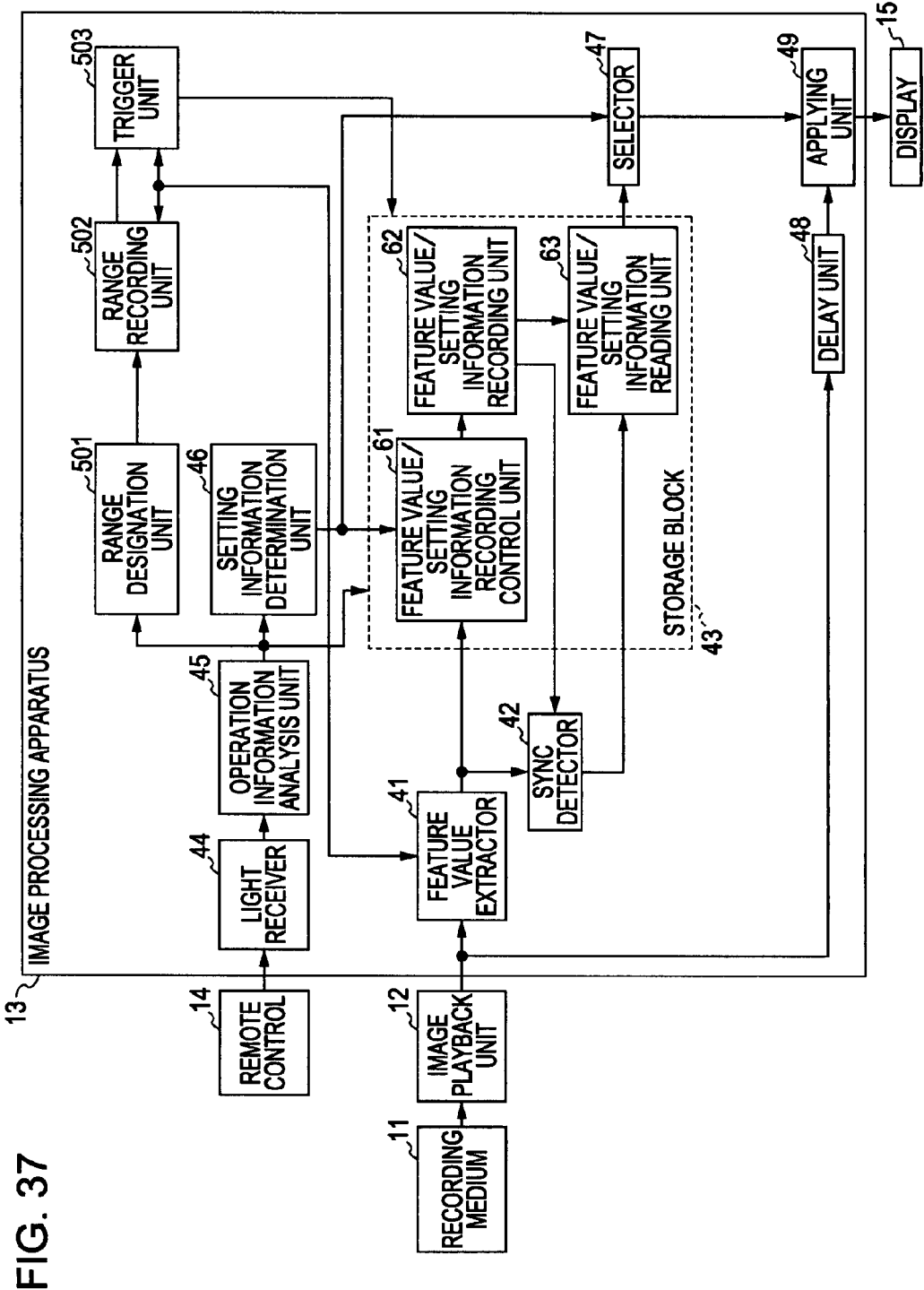
FIG. 37 is a block diagram showing a configuration of an image processing apparatus according to an embodiment of the present invention.

According to an embodiment of the present invention, there is provided a second image processing apparatus (for example, an image processing apparatus 13 shown in FIG. 37) including feature value extraction means (for example, a feature value extractor 41 shown in FIG. 37) for extracting a feature value from an image, setting means (for example, a setting-information determination unit 46 shown in FIG. 37) for setting setting-information defining a process to be performed on the image, recording means (for example, a storage block 43 shown in FIG. 37) for recording the setting-information, in association with the feature value of the image, on a data recording medium, and control means (for example, a trigger unit 503 shown in FIG. 37) for determining whether the recording means should record the setting-information on the data recording medium, and controlling recording performed by the recording means in accordance with a determination result.

Figure 19:
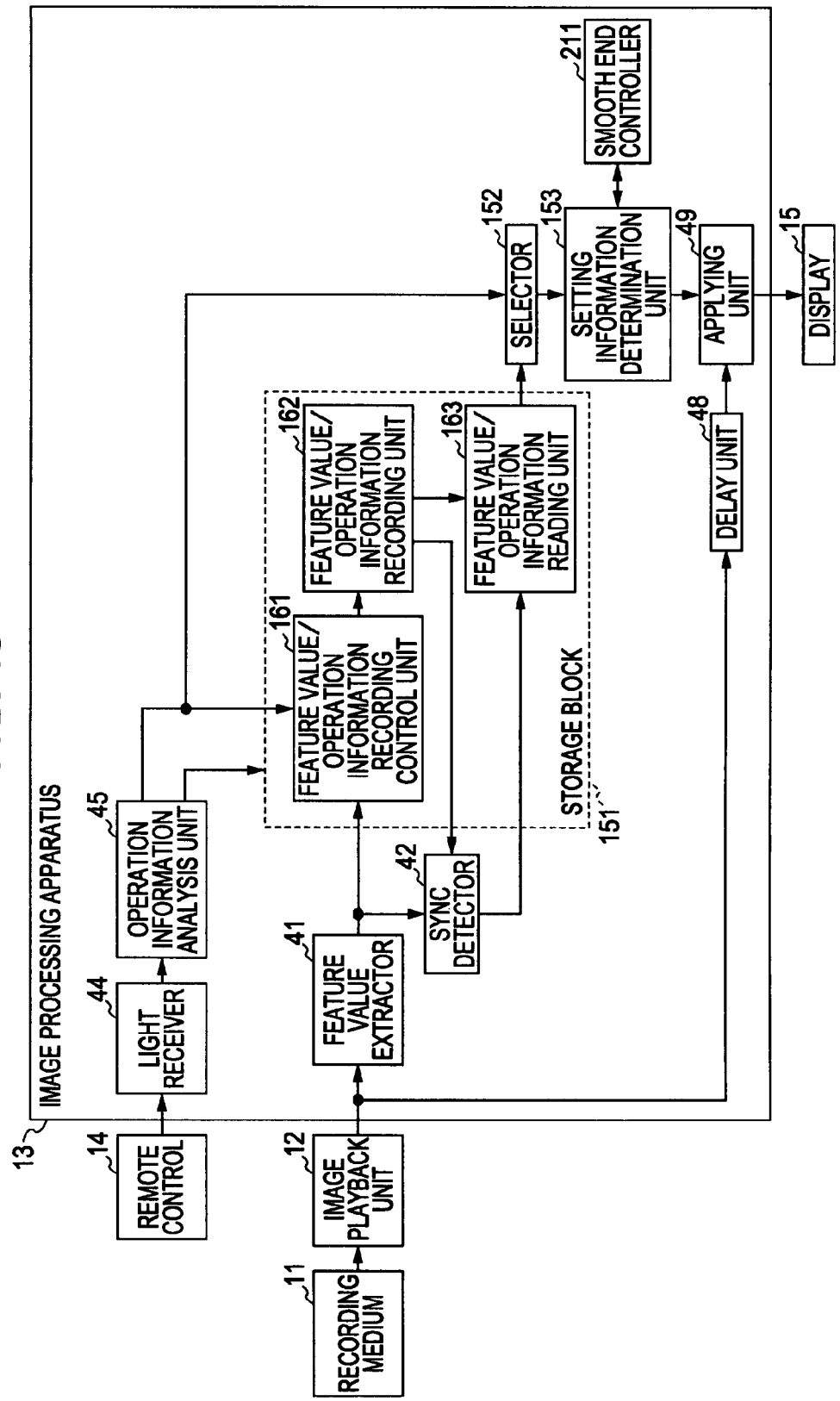
FIG. 19 is a block diagram showing a configuration of an image processing apparatus according to an embodiment of the present invention.

According to an embodiment of the present invention, there is provided a third image processing apparatus (for example, an image processing apparatus 13 shown in FIG. 19) including feature value extraction means (for example, a feature value extractor 41 shown in FIG. 19) for extracting a feature value from an image, operation means (for example, an operation information analysis unit 45 shown in FIG. 19) for performing an operation to specify a process to be performed on the image, setting means (for example, a setting-information determination unit 153 shown in FIG. 19) for, in accordance with the operation performed by the operation means, setting setting-information according to which to perform the process on the image, edit means (for example, a smooth end controller 211 shown in FIG. 19) for editing the operation information, and recording means (for example, a storage block 151 shown in FIG. 19) for recording the operation information edited by the edit means, in association with the feature value of the image, on a data recording medium.

Figure 38:
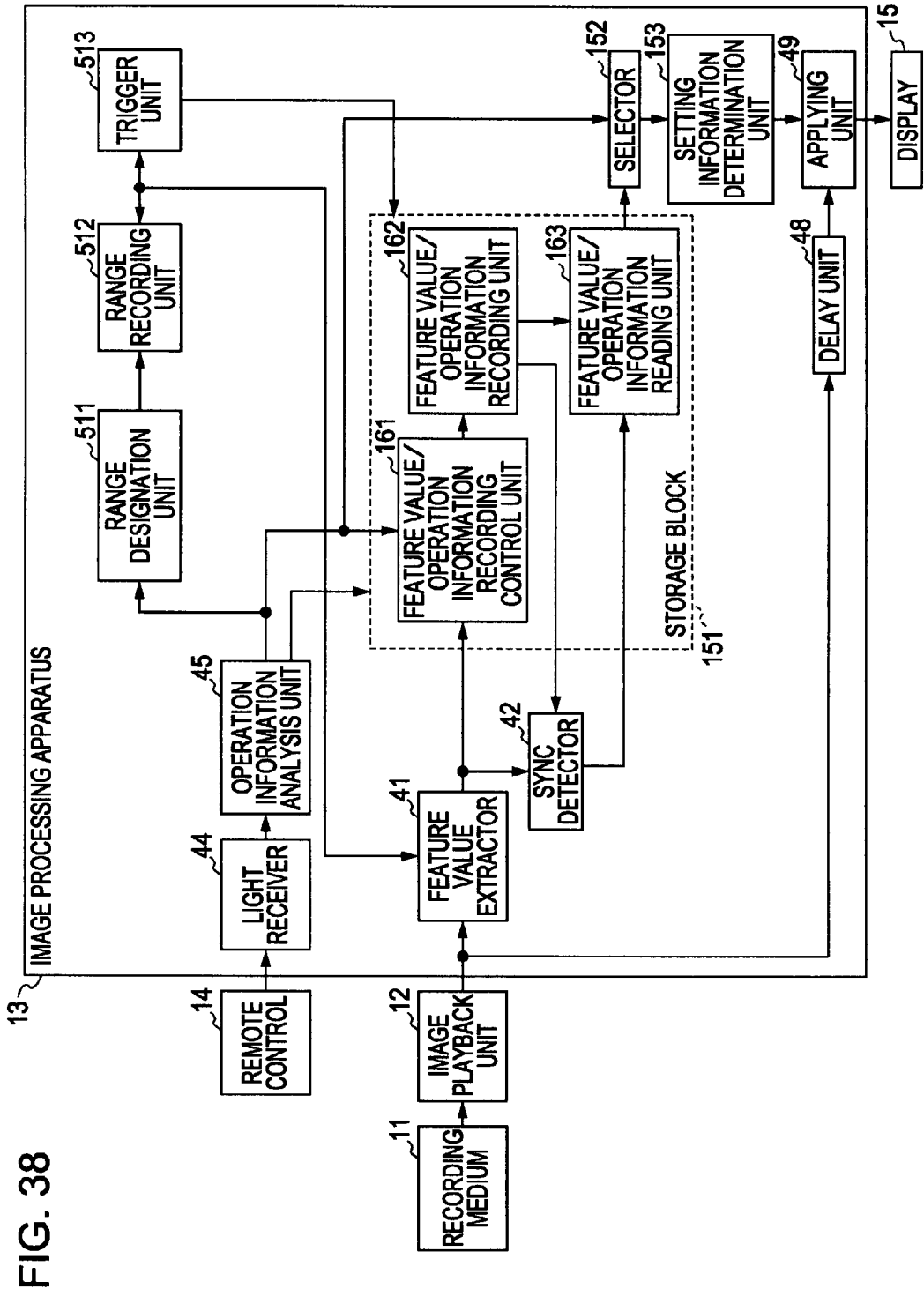
FIG. 38 is a block diagram showing a configuration of an image processing apparatus according to an embodiment of the present invention.

According to an embodiment of the present invention, there is provided a fourth image processing apparatus (for example, an image processing apparatus 13 shown in FIG. 38) including feature value extraction means (for example, a feature value extractor 41 shown in FIG. 38) for extracting a feature value from an image, operation means (for example, an operation information analysis unit 45 shown in FIG. 38) for performing an operation to specify a process to be performed on the image, setting means (for example, a setting-information determination unit 153 shown in FIG. 38) for setting setting-information defining a process to be performed on the image, recording means (for example, a storage block 121 shown in FIG. 38) for recording operation information indicating the operation performed by the operation means, in association with the feature value of the image, on a data recording medium, and control means (for example, a trigger unit 513 shown in FIG. 38) for determining whether the recording means should record the operation information on the data recording medium, and controlling recording performed by the recording means in accordance with a determination result.

Now, embodiments of the present invention are described below with reference to the accompanying drawings.

First, referring to FIGS. 3 and 4, a concept of an image processing apparatus according to an embodiment of the present invention is described below. In the present embodiment, the image processing apparatus is adapted to perform a process specified by a user on an image recorded in advance. In this process, the image processing apparatus extracts a feature value of the image and records information indicating the process specified by the user in association with the feature value. When the image recorded in advance is played back, the image processing apparatus reads the recorded information indicating the process to be performed on the image and processes the image in accordance with the read information.

More specifically, the image processing apparatus 2 has two operation modes: a recording mode, and a playback mode.

In the recording mode, as shown in FIG. 3, the image processing apparatus 2 reads a content including a moving image recorded in advance on a recording medium 1 such as a DVD (Digital Versatile Disc) via a DVD player or the like, and the image processing apparatus 2 displays the image on a display unit 3. When the image is being displayed, if a user operates a remote control or the like to perform an effect/edit process such as zooming, panning, or tilting on the image, the image processing apparatus 2 generates setting-information corresponding to the operation performed on the remote control (hereinafter referred to as an effect/edit control operation), performs the effect/edit process corresponding to the setting-information on the image, and displays the resultant image on the display unit 3. Furthermore, the image processing apparatus 2 extracts a feature value from the image and records the setting-information, in association with the extracted feature value, in an operation log data recording unit 4.

On the other hand, in the playback mode, as shown in FIG. 4, the image processing apparatus 2 reads a content including a moving image played back by a DVD player or the like from a recording medium 1 and extracts a feature value of the image. In this playback operation, the image processing apparatus 2 reads the setting-information associated with the feature value from the operation log data recording unit 4 in synchronization with the feature value of the image read from the recording medium 1, performs the process on the image in accordance with the read setting-information, and displays the resultant image on the display unit 3.

Thus, the image processing apparatus 2 records only the information (setting-information) indicating the process performed on the pre-recorded image without recording the image obtained as a result of the process so that the image is processed in accordance with the recorded setting-information and the resultant image is output in the playback operation.

The image processing apparatus 2 shown in FIGS. 3 and 4 are described in further detail below.

FIG. 5 shows an example of a configuration of an image processing apparatus 13, which corresponds to the image processing apparatus 2 shown in FIG. 3 or 4, according to an embodiment of the present invention.

An image playback unit 12 reads image data recorded in an encoded form on a recording medium 11 corresponding to the recording medium 1 shown in FIG. 3 or 4, and the image playback unit 12 decodes the image data. The resultant decoded image data is supplied to a feature value extractor 41 and a delay unit 48.

The feature value extractor 41 extracts a feature value of each frame of the image data supplied from the image playback unit 12 and supplies the extracted feature value to the synchronization detector 42 and a feature value/setting-information recording control unit 61 in a storage block 43. The detailed configuration of the feature value extractor 41 will be described later with reference to FIG. 7.

A remote control 14 including keys and buttons is used by a user to designate a process to be performed on the image, as shown in FIG. 3 or 4. If the remote control 14 is operated by the user, the remote control 14 generates an operation signal corresponding to the operation performed by the user and emits an infrared ray or the like having an emission pattern corresponding to the operation signal to a light receiver 44 of the image processing apparatus 13.

If the light receiver 44 receives the infrared ray from the remote control 14, the light receiver 44 converts the optical signal of the infrared ray into the original operation signal indicating the operation performed on the remote control 14 and supplies the resultant operation signal to an operation information analysis unit 45. The operation information analysis unit 45 analyzes the received operation signal supplied from the light receiver 44 to detect operation information corresponding to a process specified, by the user, to be performed on the image. The resultant operation information is supplied to a setting-information determination unit 46.

In accordance with the operation information supplied from the operation information analysis unit 45, the setting-information determination unit 46 determines setting-information indicating the process to be performed on the image by an applying unit 49, which will be described in detail later, and the setting-information determination unit 46 supplies the determined setting-information to the feature value/setting-information recording control unit 61 and a selector 47.

The feature value/setting-information recording control unit 61 in the storage block 43 records the feature value supplied from the feature value extractor 41 and the setting-information supplied from the setting-information determination unit 46 in a feature value/setting-information recording unit 62 (corresponding to the operation log data recording unit 4 shown in FIG. 3 or 4) in such a manner that the feature value and the setting-information are associated with each other.

The synchronization detector 42 searches the feature value/setting-information recording unit 62 to detect a feature value (a retrieved-frame feature value described later) identical to the feature value extracted, by the feature value extractor 41, from the image being played back by the image playback unit 12. If the identical feature value is detected, the synchronization detector 42 supplies the detected feature value indicating the synchronous image position to a feature value/setting-information reading unit 63. The detailed configuration of the synchronization detector 42 will be described later with reference to FIG. 9.

If the feature value/setting-information reading unit 63 acquires the feature value (the retrieved-frame feature value) indicating the synchronous position from the synchronization detector 42, the feature value/setting-information reading unit 63 reads setting-information corresponding to the acquired feature value from the feature value/setting-information recording unit 62 and supplies the read setting-information to the selector 47. If the selector 47 receives the setting-information from the setting-information determination unit 46, the selector 47 supplies this setting-information to the applying unit 49 regardless of whether setting-information is supplied from the feature value/setting-information reading unit 63 at the same time as the time at which the setting-information is supplied from the setting-information determination unit 46. On the other hand, in a case where no setting-information is supplied from the setting-information determination unit 46 but setting-information is supplied from the feature value/setting-information reading unit 63, the selector 47 transfers the setting-information supplied from the feature value/setting-information reading unit 63 to the applying unit 49. In a case where setting-information is supplied from neither, the selector 47 supplies no setting-information to the applying unit 49.

The delay unit 48 temporarily stores the image data supplied from the image playback unit 12 for a period equal to a total delay time caused by processes performed by the feature value extractor 41, the synchronization detector 42, the storage block 43, and the selector 47, and the delay unit 48 outputs the resultant delayed image data to the applying unit 49. In the case where the applying unit 49 receives setting-information from the selector 47, the applying unit 49 applies the specified process to the image supplied from the delay unit 48 and displays the resultant image on the display unit 15. On the other hand, when no setting-information is supplied from the selector 47 to the applying unit 49, the applying unit 49 directly displays the image supplied from the delay unit 48 on the display unit 15.

FIG. 6 shows another example of the configuration of the image processing apparatus 13. In this example shown in FIG. 6, the image processing apparatus 13 is configured to record not setting-information but operation information in association with the feature value. In FIG. 6, similar parts to those in FIG. 5 are denoted by similar reference numerals, and a duplicated explanation thereof is omitted herein.

That is, a feature value extractor 41, a synchronization detector 42, a light receiver 44, an operation information analysis unit 45, a delay unit 48, and an applying unit 49 are similar to those in the image processing apparatus 13 shown in FIG. 5. However, the image processing apparatus 13 shown in FIG. 6 is different from the image processing apparatus 13 shown in FIG. 5 in that the storage block 43, the setting-information determination unit 46, and the selector 47 are respectively replaced with a storage block 151, a setting-information determination unit 153, and a selector 152.

The storage block 151 stores the operation information supplied from the operation information analysis unit 45 in association with the feature value. The storage block 151 also reads stored operation information corresponding to a feature value of an image being currently played back, and supplies the read operation information to the selector 152.

The feature value/operation information recording control unit 161 in the storage block 151 stores the feature value supplied from the feature value extractor 41 and the operation information supplied from the operation information analysis unit 45, in association with each other, in the feature value/operation information recording unit 162.

If the feature value/operation information reading unit 163 receives a retrieved-frame feature value, that is, a feature value indicating a synchronous image position, from the synchronization detector 42, the feature value/operation information reading unit 163 reads operation information stored in association with the received feature value and supplies it to the selector 152. In the case where the selector 152 receives the operation information from the operation information analysis unit 45, the selector 152 transfers the operation information supplied from the operation information analysis unit 45 to the setting-information determination unit 153 regardless of whether operation information is received from the feature value/operation information reading unit 163. On the other hand, in the case where the selector 152 receives no operation information from the operation information analysis unit 45 but the selector 152 receives operation information from the feature value/operation information reading unit 163, the selector 152 transfers the operation information supplied from the feature value/operation information reading unit 163 to the setting-information determination unit 153. In a case where operation information is supplied from neither, the selector 152 supplies no operation information to the setting-information determination unit 153.

In accordance with the operation information supplied from the selector 152, the setting-information determination unit 153 determines setting-information indicating the process to be performed on the image by the applying unit 49 and supplies it to the applying unit 49.

In the image processing apparatus 13 shown in FIG. 6, the feature value extractor 41 and the synchronization detector 42 are similar to those used in the image processing apparatus 13 shown in FIG. 5. The feature value extractor 41 and the synchronization detector 42 are described in detail below.

Figure 7:
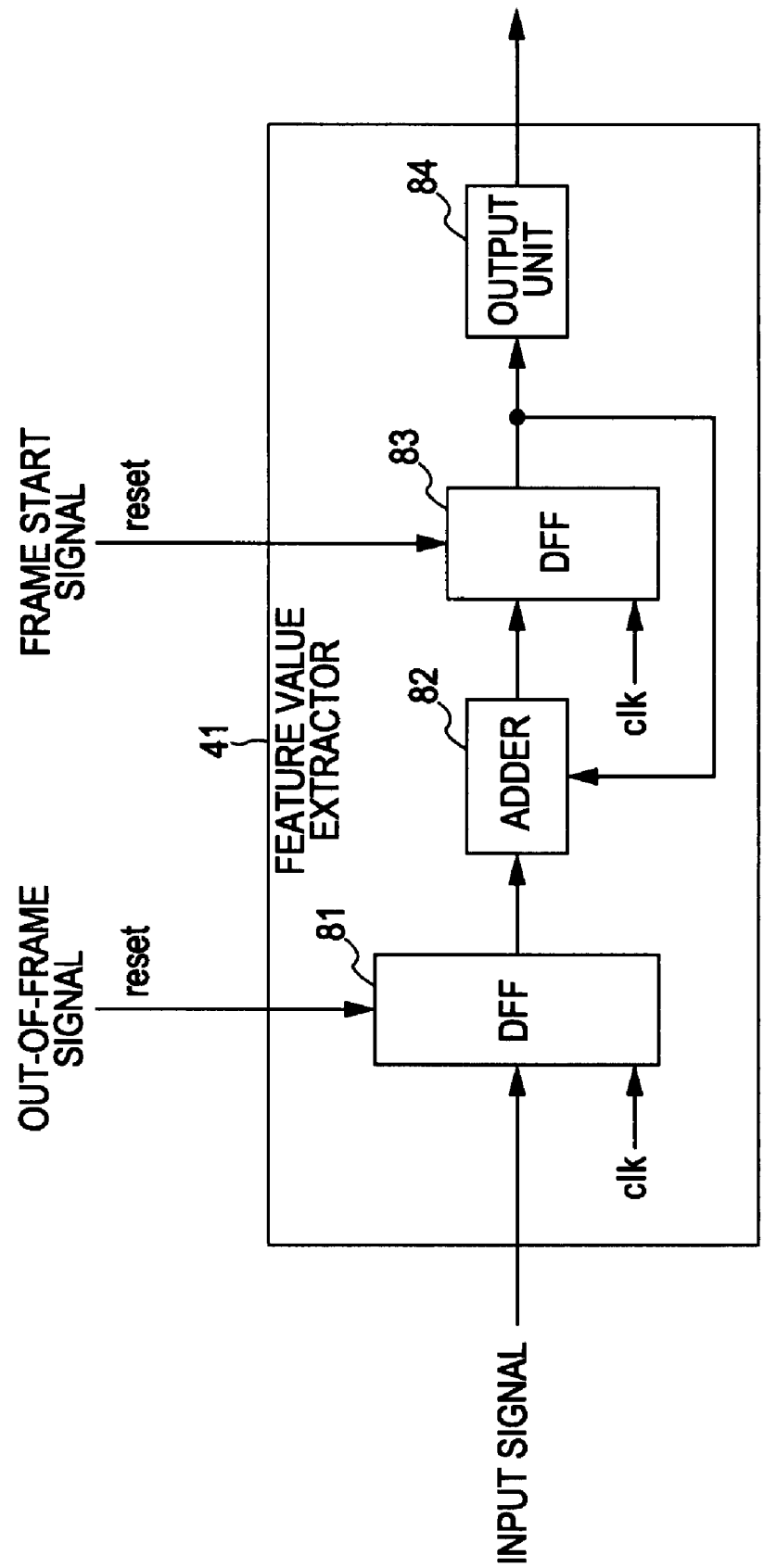
FIG. 7 is a block diagram showing an example of a configuration of a feature value extractor according to an embodiment of the present invention.

First, referring to FIG. 7, an example of a configuration of the feature value extractor 41 is described in detail.

Figure 8:
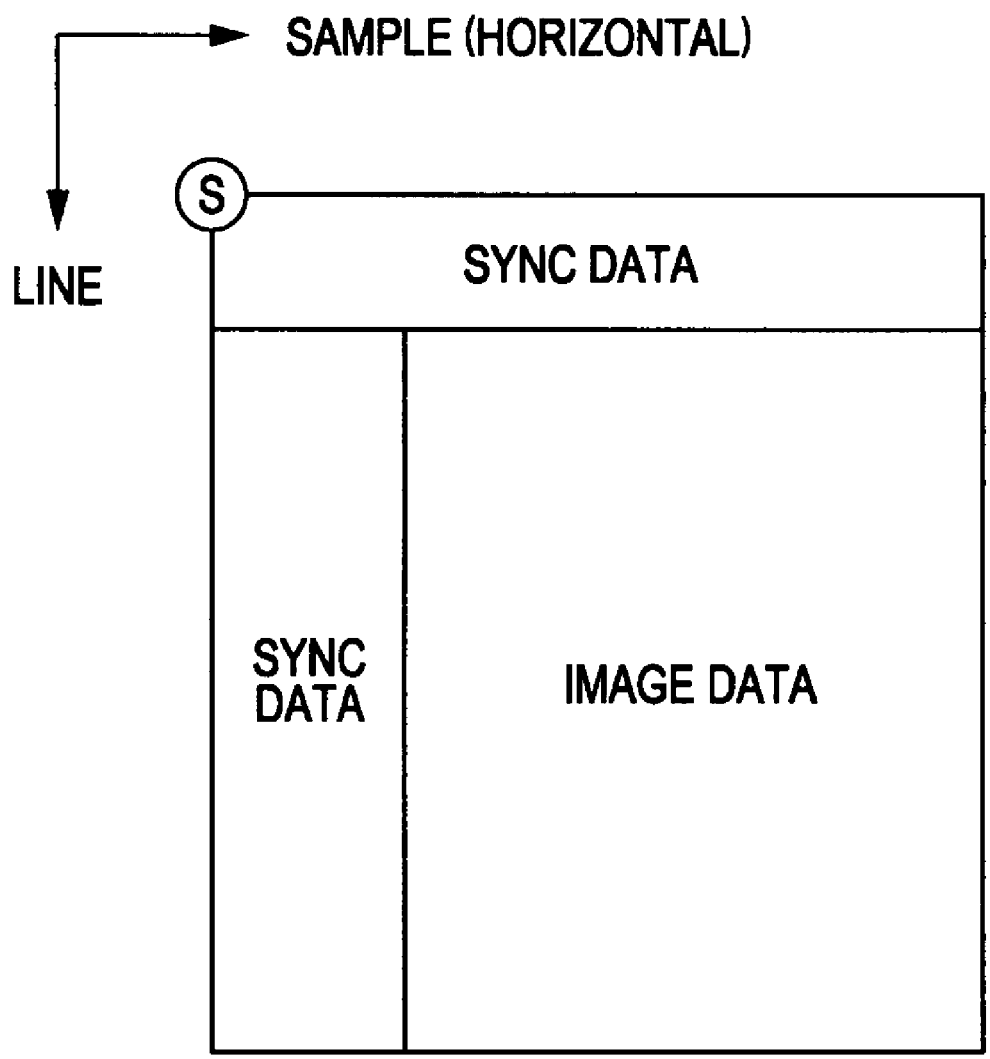
FIG. 8 is a diagram showing an example of a format of an image signal.

A DFF (D-flip-flop) 81 stores an immediately previous input signal and outputs it to an adder 82 in synchronization with a clock signal (CLK) supplied from a clock signal generator (not shown). When the input signal is out of an image data area, a reset signal is input to the DFF 81 such that the input signal is deleted and no image signal is output. Note that, as shown in FIG. 8, the image signal includes a synchronization data area and an image data area.

Application of the reset signal to the DFF 81 is controlled in accordance with position information indicating the position of the image signal with respect to the frame start position S, which is the intersection of the horizontal axis (sample) and the vertical axis (line). If the position information indicates that the image signal is in the synchronization data area and is output of the image data area, the reset signal is applied to the DFF 81 and thus the image signal is output to the adder 82. That is, only the image signal in the image data area is supplied from the DFF 81 to the adder 82 in synchronization with the clock signal.

The adder 82 adds the signal supplied from the DFF 81 and a signal supplied from a DFF 83, and supplies a resultant signal to the DFF 83. More specifically, the adder 82 extracts low-order 8 bits of the sum of the signal supplied from the DFF 81 and the signal supplied from the DFF 83, and supplies the extracted 8 bits to the DFF 83.

The signal input to the DFF 83 from the adder 82 is output to the adder 82 and an output unit 84 in synchronization with the clock signal (CLK) supplied from the clock generator (not shown). When the signal input to the DFF 83 is a signal at the frame start point (the intersection of the horizontal axis (sample) and the vertical axis (line)), the reset signal is input to the DFF 83 such that the input signal is deleted and no signal is output from the DFF 83. That is, the input signal is added cumulatively over the image data area by the adder 82 in cooperation with the DFF 83, and the resultant cumulative sum is output from the DFF 83 to the output unit 84.

When the output unit 84 receives the cumulative sum for one frame (or one field) from the DFF 83, the output unit 84 outputs the cumulative sum as the feature value of the one frame of image. Note that the value output as the feature value of the one frame (or field) of image from the output unit 84 is given by the low-order 8 bits of the sum of pixel values in the image data area calculated by the adder 82. The purpose of the feature value is to identify each frame, and thus the feature value is not limited to the low-order 8 bits of the cumulative sum of the input signal (pixel values) over the image data area, but any other value correctly identifying each frame may be used as the feature value. For example, the sum of pixel values in a predetermined central area of the image data area may be used.

Figure 9:
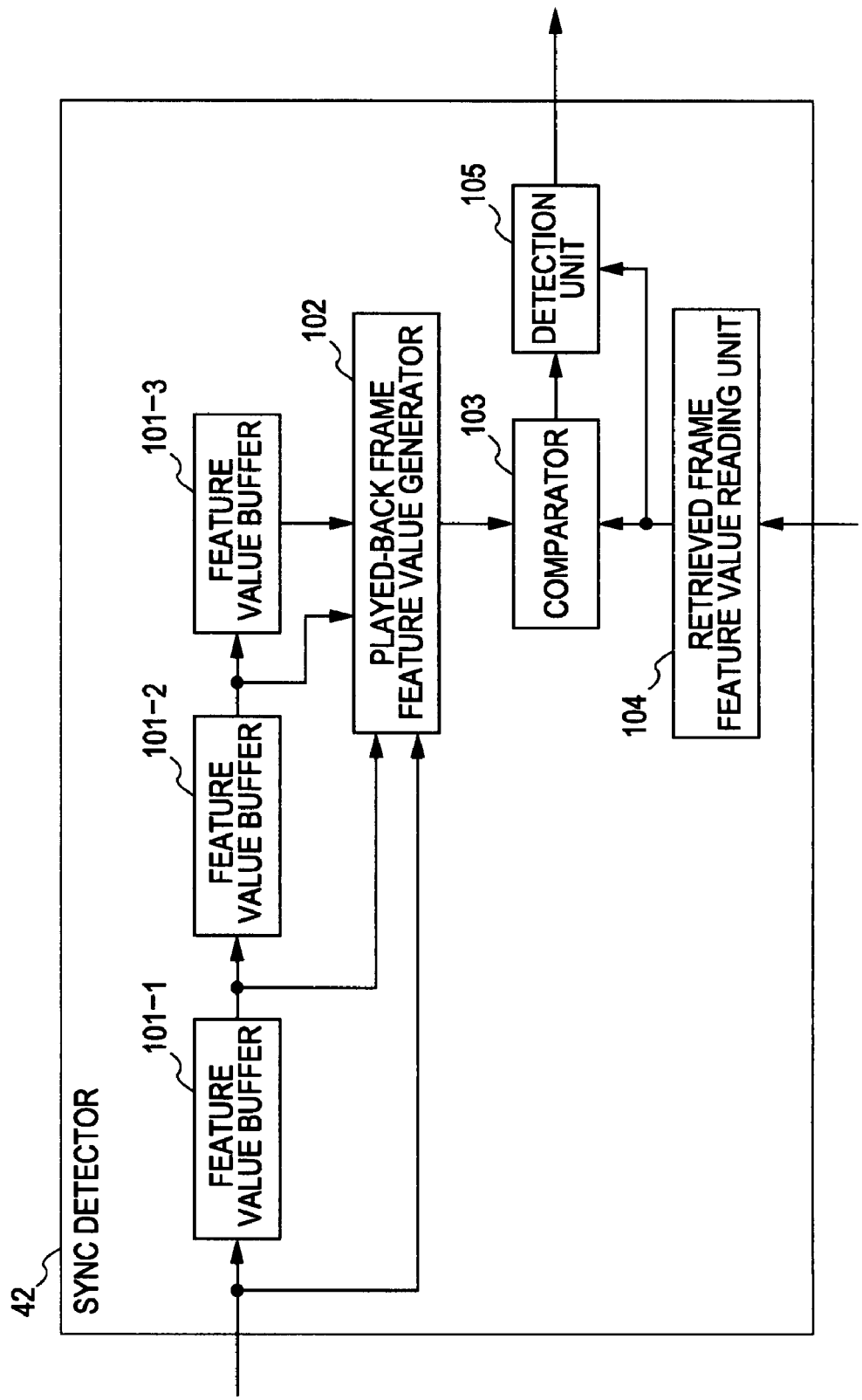
FIG. 9 is a block diagram showing an example of a configuration of a synchronization detector according to an embodiment of the present invention.

Next, referring to FIG. 9, an example of a configuration of the synchronization detector 42 is described in detail below.

Each of feature value buffers 101-1 to 101-3 is adapted to temporarily store a feature value input thereto. When a feature value is input to each of feature value buffers 101-1 to 101-3, a feature value currently stored therein is transferred to a feature value buffer (the feature value buffer 101-2 or 101-3) at the next position and also to the played-back frame feature value generator 102. Note that because there is no feature value buffer connected to the output of the feature value buffer 101-3, the feature value output from the feature value buffer 101-3 is supplied only to the played-back frame feature value generator 102. Each time the played-back frame feature value generator 102 receives the feature value of the current frame and the feature values of previous three frames from the feature value buffers 101-1 to 101-3, the played-back frame feature value generator 102 produces played-back frame feature information (played-back frame feature value) from the received feature values and outputs it to a comparator 103. That is, the played-back frame feature value generator 102 produces the played-back frame feature value identifying the played-back frame by using the feature values of four frames including the current frame and previous three frames.

A retrieved-frame feature value reading unit 104 sequentially reads four successive feature values at a time from the feature value/setting-information recording unit 62 and supplies them as retrieved-frame feature values to the comparator 103 and the detection unit 105. The comparator 103 compares the played-back frame feature values supplied from the played-back frame feature value generator 102 with the retrieved-frame feature values sequentially supplied from the retrieved-frame feature value reading unit 104. If the comparator 103 detects retrieved-frame feature values identical to the played-back frame feature values, the comparator 103 determines that synchronization is detected, and the comparator 103 notifies the detection unit 105 that synchronization is detected. If the detection unit 105 captures the retrieved-frame feature value supplied from the retrieved-frame feature value reading unit 104 at the same time as the time at which the synchronization notification is received from the comparator 103, and the detection unit 105 outputs this retrieved-frame feature value as a synchronization detection result.

Operations of the image processing apparatus 13 shown in FIGS. 5 and 6 are described in further detail below with reference to flow charts shown in FIGS. 10 to 14. The operation of the image processing apparatus 13 shown in FIG. 6 is basically similar to that of the image processing apparatus 13 shown in FIG. 5, and thus the operation is explained below, by way of example, for the image processing apparatus 13 shown in FIG. 5 with reference to flow charts shown in FIGS. 10 to 14.

The image processing apparatus 13 is adapted to process an image which is input from, for example, a recording medium 11. More specifically, for example, the image recorded on the recording medium 11 is read by the image playback unit 12 (FIG. 5) and supplied to the image processing apparatus 13. In the image processing apparatus 13, the supplied image is temporarily stored on a frame-by-frame basis in the delay unit 48. Note that although it is assumed in the following explanation, by way of example, that the process is performed on a frame-by-frame basis, the process may be performed in different units. For example, the process may be performed on a field-by-field basis.

In step S11, the feature value extractor 41 performs a feature value extraction process to extract a feature value of one frame of image supplied from the image playback unit 12. More specifically, when one frame of image is supplied to the delay unit 48 for temporary storage, the same one frame of image is supplied to the feature value extractor 41. Thus, when a feature value of this image is extracted by the feature value extractor 41, the image is temporarily stored in the delay unit 48 during the process of feature value extraction.

Figure 11:
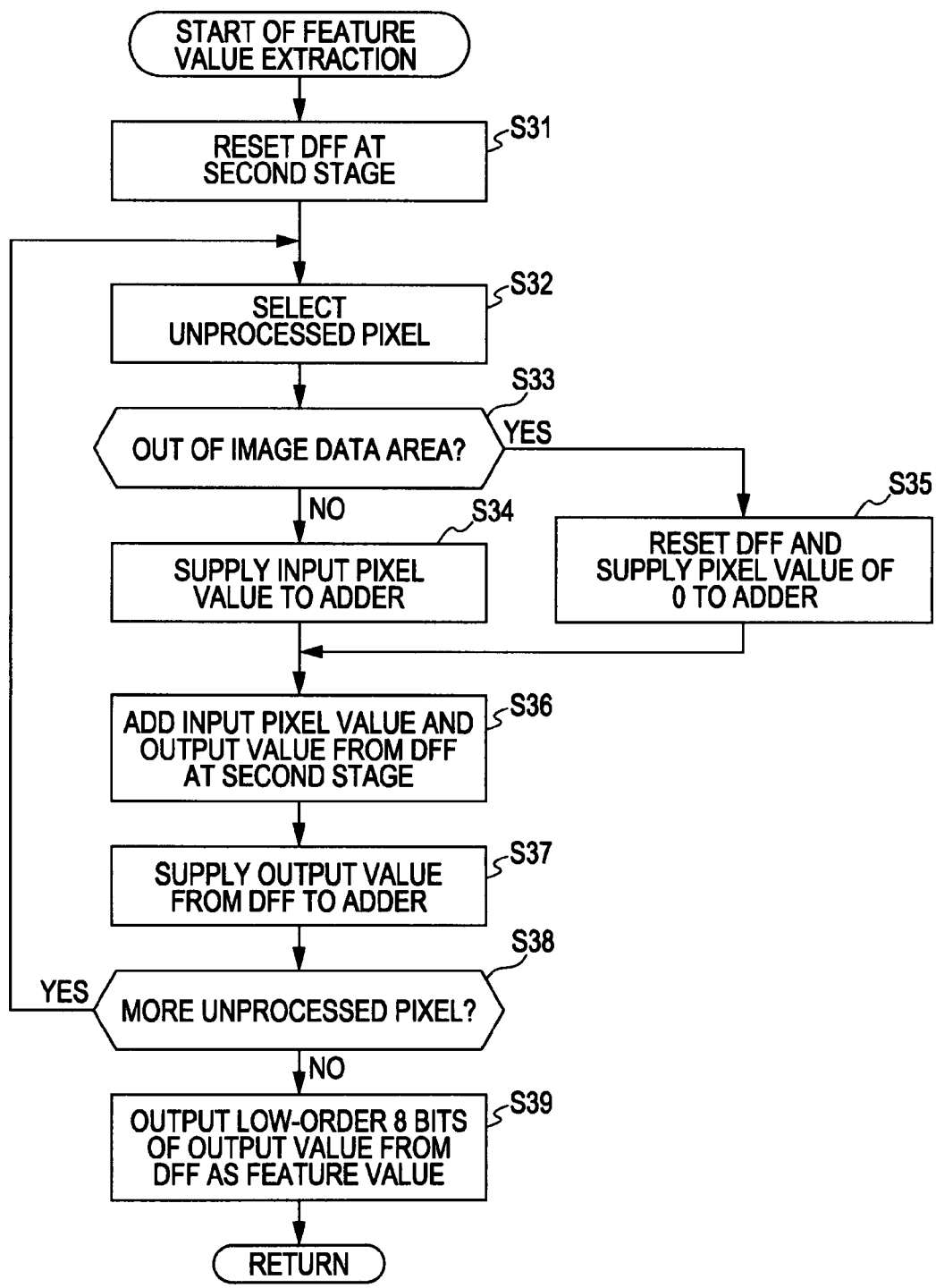
FIG. 11 is a flow chart showing a feature value extraction process according to an embodiment of the present invention.

The details of the feature value extraction process performed by the feature value extractor 41 in step S11 are described with reference to a flow chart shown in FIG. 11.

In step S31, the DFF 83 is reset at the frame start point S (FIG. 8).

In step S32, an unprocessed pixel is selected. In step S33, a determination is made as to whether the given pixel is out of the image data area. More specifically, pixels of one frame are sequentially read in a raster scan order, and the determination as to whether the pixel is out of the image data area is made each time an unprocessed pixel is input.

As can be seen from FIG. 8, a first pixel (at the frame start point S) is in the synchronization data area, and thus it is determined in step S33 that the pixel is out of the image data area. In this case, the process proceeds to step S35, in which the DFF 81 is reset. As a result, 0 is output as the pixel value from the DFF 81. In a case where a selected pixel is determined to be in the image data area, the process proceeds to step S34 in which the DFF 81 transfers the input pixel value to the adder 82 in synchronization with the clock signal.

In step S36, the adder 82 adds the input pixel value with the signal supplied from the DFF 83. The resultant value is supplied to the DFF 83. In step S37, low-order 8 bits of the value supplied as the addition result from the adder 82 to the DFF 83 are returned to the adder 82 from the DFF 83 in synchronization with the clock signal. In this case, although the low-order 8 bits of the addition result are also supplied to the output unit 84, the output unit 84 does not output the given data.

In step S38, a determination is made as to whether there are more unprocessed pixels. If so, the process returns to step S32, and the process from step S32 to S38 is performed repeatedly until all pixels of one frame have been processed. If it is determined in step S38 that the above-described process is completed for all pixels of one frame, then the processing flow proceeds to step S39. In step S39, the value supplied as the addition result from the DFF 83 to the output unit 84 is output from the output unit 84 as the feature value of the one frame of image. More specifically, low-order 8 bits of the sum of pixel values of pixels in the image data area of one frame are output from the output unit 84.

Thus, via the above-described process, pixel values are cumulatively added over the image data area of one frame of image signal, and low-order 8 bits of the resultant sum of pixel values are output as the feature value of this frame.

Figure 10:
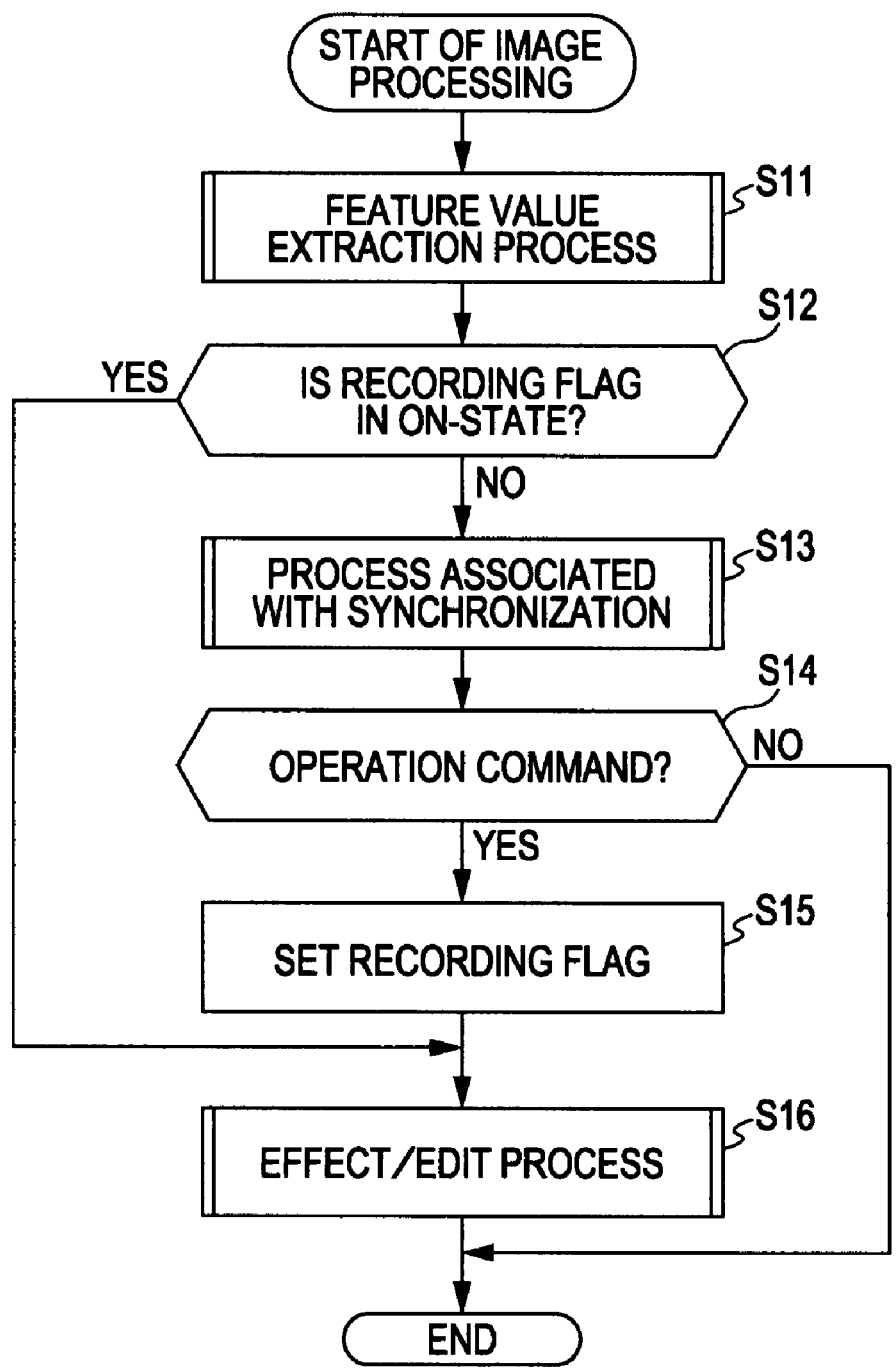
FIG. 10 is a flow chart showing image processing performed by an image processing apparatus according to an embodiment of the present invention.

Referring again to the flow chart shown in FIG. 10, if the feature value extraction process performed by the feature value extractor 41 in step S11 is completed, then, in step S12, it is determined whether a recording flag is in an on-state. Note that when a process of recording operation information or setting-information (setting-value) is being performed, the recording flag is set in the on-state to indicate that the recording process is being performed.

Note that the determination as to whether the recording flag is in the on-state is made by the feature value/setting-information recording control unit 61. If it is determined in step S12 that the recording flag is in the on-state, the process proceeds to step S16. However, if it is determined in step S12 that the recording flag is in an off-state, the process proceeds to step S13.

In step S13, a process associated with synchronization is performed. The details of this process associated with synchronization are described below with reference to a flow chart shown in FIG. 12. The process associated with synchronization includes a synchronization detection process and a process of setting a setting-value depending on the result of the synchronization detection process. The synchronization detection process is performed in step S51, and the setting of the setting-value is performed in steps S52 to S56.

Figure 13:
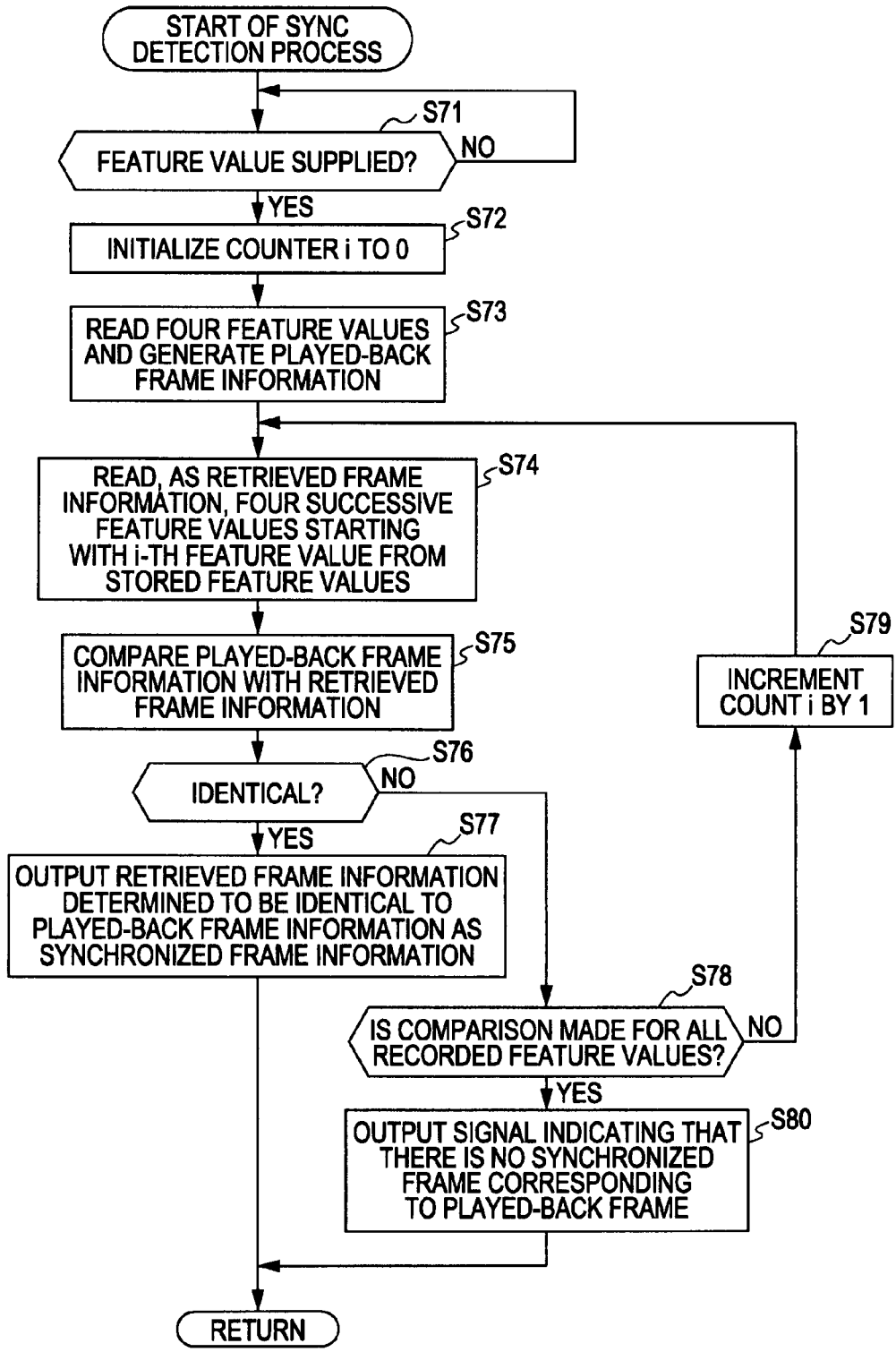
FIG. 13 is a flow chart showing a synchronization detection process according to an embodiment of the present invention.

The synchronization detection process in step S51 is performed by the synchronization detector 42 (FIG. 9) to detect synchronization between a feature value of an image being currently played back and a feature value identifying a frame for which to perform a process specified by setting-information, as described in further detail below with reference to a flow chart shown in FIG. 13.

In step S71, the played-back frame feature value generator 102 of the synchronization detector 42 determines whether a feature value has been received from the feature value extractor 41. If no feature value has been received yet, step S71 is repeated until a feature value is received. If a feature value is extracted in the feature value extraction process in step S11 and the feature value of the frame of image being currently played back is supplied from the feature value extractor 41, then the process proceeds to step S72.

In step S72, the retrieved-frame feature value reading unit 104 initializes, to 0, a counter i for counting retrieved-frame feature values.

In step S73, the played-back frame feature value generator 102 acquires a newly supplied feature value and also acquires feature values stored in the feature value buffers 101-1 to 101-3. More specifically, when the new feature value is supplied to the feature value buffer 101-1, the previous feature value stored in the feature value buffer 101-1 is transferred to the played-back frame feature value generator 102 and the feature value buffer 101-2, and the feature value newly supplied to the feature value buffer 101-1 is stored therein.

Similarly, when the feature value is supplied from the feature value buffer 101-1 to the feature value buffer 101-2, the feature value currently stored in the feature value buffer 101-2 is transferred to the played-back frame feature value generator 102 and the feature value buffer 101-3, and the feature value supplied to the feature value buffer 101-2 is stored therein. When the feature value is supplied from the feature value buffer 101-2 to the feature value buffer 101-3, the feature value currently stored in the feature value buffer 101-3 is transferred to the played-back frame feature value generator 102, and the feature value supplied to the feature value buffer 101-3 is stored therein. As a result, the played-back frame feature value generator 102 receives the feature value of the newest frame and feature values of three previous frames stored in the feature value buffers 101-1 to 101-3. The played-back frame feature value generator 102 supplies, as the played-back frame feature value, the feature value of the frame being currently played back and the feature values of the three previous frames to the comparator 103.

In step S74, the retrieved-frame feature value reading unit 104 reads a feature value of an i-th frame as counted from the beginning and feature values of following three successive frames from the feature value/setting-information recording unit 62, and the retrieved-frame feature value reading unit 104 supplies these feature values as the retrieved-frame feature values to the comparator 103 and the detection unit 105.

In step S75, the comparator 103 compares the played-back frame feature values including the feature value of the frame being currently played back and the feature values of previous three frames supplied from the played-back frame feature value generator 102 with the retrieved-frame feature values including the feature value of the i-th frame as counted from the beginning and the feature values of following three frames read from the feature value/setting-information recording unit 62 and supplied from the retrieved-frame feature value reading unit 104.

In step S76, the comparator 103 determines whether the comparison result indicates that the feature values are identical. If it is determined in step S76 that no matching is found in feature values, the process proceeds to step S78. In step S78, the retrieved-frame feature value reading unit 104 determines whether the comparison of the played-back frame feature values has been made for all feature values stored in the feature value/setting-information recording unit 62. If it is determined in step S78 that the comparison is not completed for all feature values, the process proceeds to step S79. In step S79, the retrieved-frame feature value reading unit 104 increments the counter i by 1. The process then returns to step S74. That is, the process from step S74 to step S76 and steps S78 and S79 is performed repeatedly as long as no matching is found between the played-back frame feature values and the retrieved-frame feature values and the comparison is not completed for all feature values stored in the feature value/setting-information recording unit 62. In each iteration of this process, feature value data of four frames are shifted by one frame for the retrieved-frame feature values and the played-back frame feature values, and the comparison is made for these shifted data.

Figure 15:
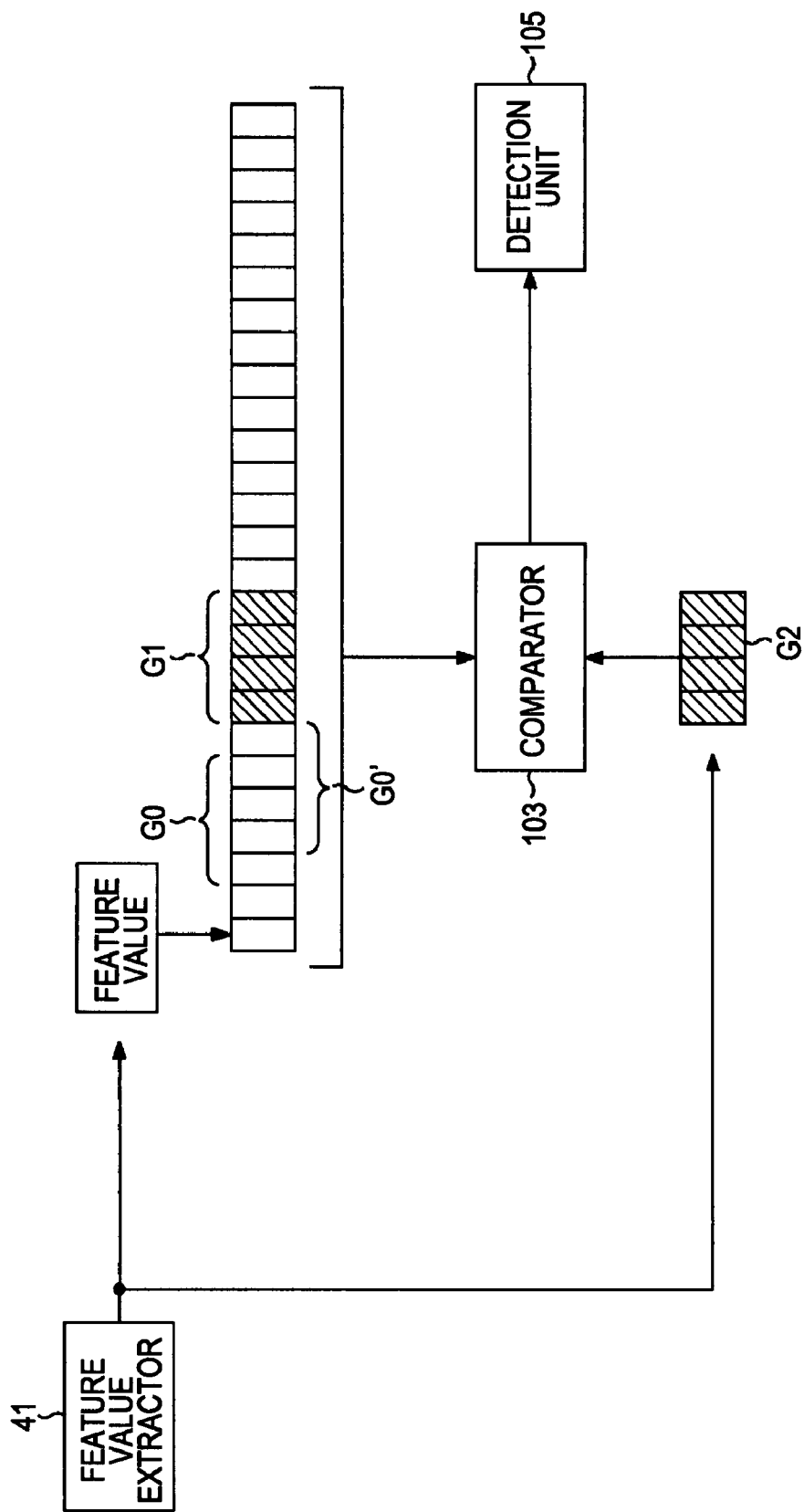
FIG. 15 is a diagram illustrating a synchronization detection process according to an embodiment of the present invention.

Note that in the present embodiment, the retrieved-frame feature values are sequentially given in the form of a set of feature values of four successive frames from the feature value extractor 41. In FIG. 15, each vertically-long rectangular block denotes a feature value of one frame. Four shaded blocks G1 are identical in feature value to four shaded blocks G2. Note that in the present embodiment, the played-back frame feature values are sequentially given in the form of a set of feature values of four successive frames, including the frame being currently played back, from the feature value extractor 41.

In the specific example shown in FIG. 15, when the set of played-back frame feature values G2 is compared with a set of retrieved-frame feature values G0, it is determined that there is no matching between them and that no synchronization is found. In this specific case, the comparison is not completed for all stored feature values, the counter i is incremented by 1, and the set of played-back frame feature values G2 is compared with a set of retrieved-frame feature values G0'. As described above, the comparison of the set of played-back frame feature values G2 with the set of retrieved-frame feature values is made repeatedly while shifting the set of retrieved-frame feature values by one frame at a time.

In the specific example, when the comparison is made between the set of played-back frame feature values G2 and the set of retrieved-frame feature values G1, the determination in step S76 is made that matching in feature values is found, and thus, in step S77, the comparator 103 notifies the detection unit 105 that matching in feature values is found. In response to the notification from the comparator 103, the detection unit 105 extracts a feature value at the first location in the current set of retrieved-frame feature values supplied from the retrieved-frame feature value reading unit 104, that is, an i-th feature value as counted from the beginning of whole stored feature values, and the detection unit 105 supplies the extracted feature value as synchronous position information to the feature value/setting-information reading unit 63.

In a case where it is determined in step S78 that the comparison is completed for all stored retrieved-frame feature values, the process proceeds to step S80. In step S80, the detection unit 105 outputs a signal indicating that there is no retrieved-frame feature value identical to the played-back frame feature value and thus no synchronization is found.

Via the above-described process, it is possible to synchronize the feature value stored in the feature value/setting-information recording unit 62 with the feature value of the image being played back. Note that in the above-described synchronization detection process, the synchronization detector 42 compares not only the feature value of one frame being currently played back with a feature value read from the feature value/setting-information recording unit 62, but feature values of four frames including the frame being currently played back are compared with feature values stored in the feature value/setting-information recording unit 62 thereby preventing an incorrect detection of synchronization due to sheer coincidence at a wrong position. By using feature values in the above-described manner, it becomes possible to detect synchronization in units of frames on the basis of feature values without using time codes of frames.

Figure 12:
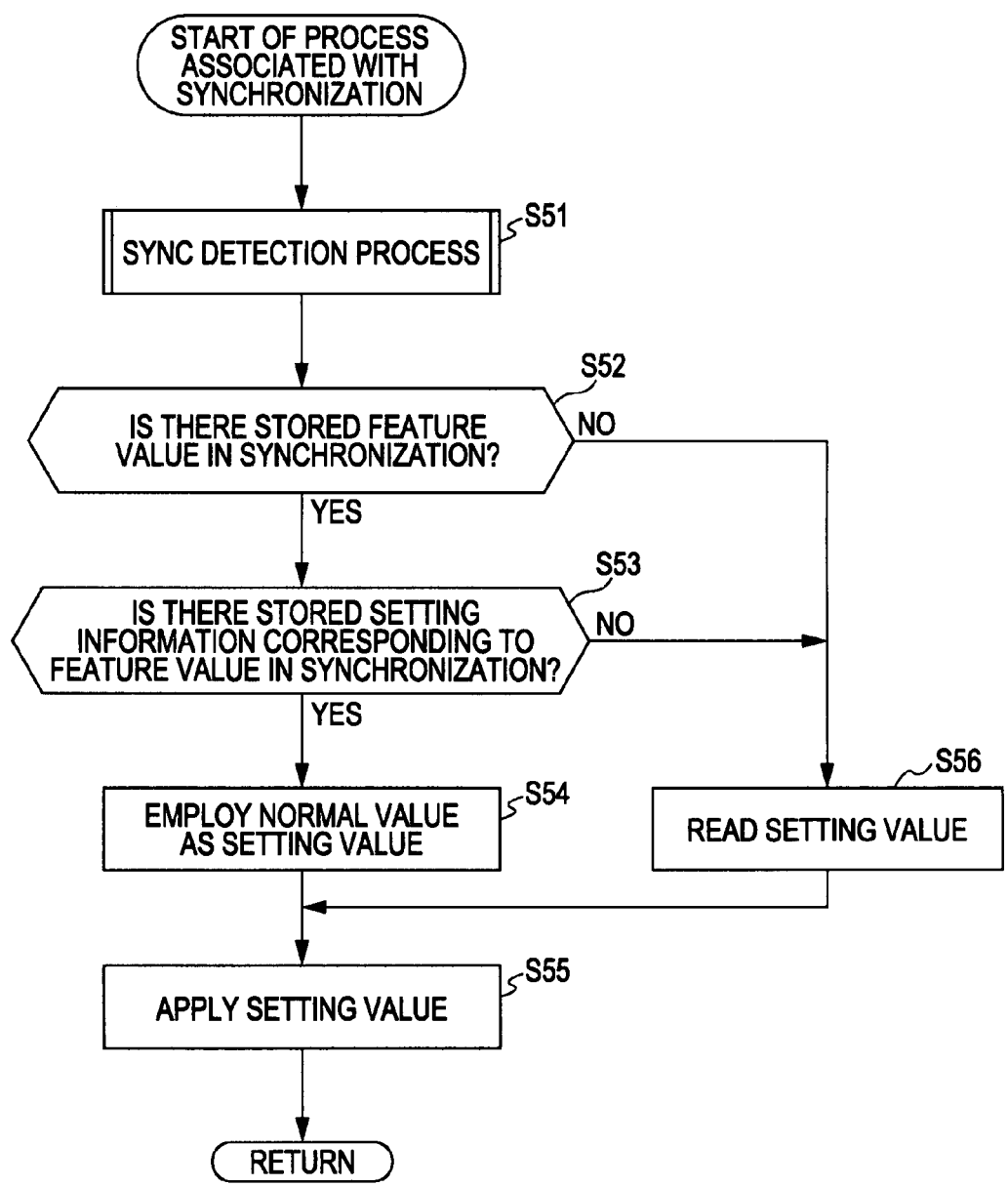
FIG. 12 is a flow chart showing a process associated with synchronization according to an embodiment of the present invention.

Referring again to the flow chart of the process associated with synchronization shown in FIG. 12, if the synchronization detection process in step S51 is completed, then in step S52, the feature value/setting-information reading unit 63 determines whether a feature value identical to the played-back frame feature value of a frame being currently played back has been found from the feature values stored in the feature value/setting-information recording unit 62. For example, in the case where the feature value/setting-information reading unit 63 receives the synchronous position information in step S77 of the flow chart shown in FIG. 13, the feature value/setting-information reading unit 63 determines that a feature value identical to the played-back frame feature value of the frame being currently played back has been found from the feature values stored in the feature value/setting-information recording unit 62, and the process proceeds to step S53.

In step S53, the feature value/setting-information reading unit 63 determines whether the feature value/setting-information recording unit 62 includes setting-information corresponding to the detected feature value in synchronization. Because feature values corresponding to no setting-information can be stored in the feature value/setting-information recording unit 62, it is necessary to make the determination in step S53 to check whether there is setting-information corresponding to the feature value.

In a case where it is determined in step S53 that there is no setting-information corresponding to the feature value, the process proceeds to step S54 in which a normal value is set as the setting-value. Herein, the "normal" value refers to a default value employed when no operation is performed to designate a process to be applied to the image.

In the case where the normal value is set as the setting-value in step S54, the process proceeds to step S55 in which the setting-value is applied to the image. When the normal value is set as the setting-value (setting-information) as in the present case, the feature value/setting-information reading unit 63 does not supply setting-information to the selector 47. In this case, the selector 47 does not receive the setting-information from either the setting-information determination unit 46 or the feature value/setting-information reading unit 63, and thus setting-information specifying a process to be performed is not supplied to the applying unit 49. As a result, the applying unit 49 directly displays one frame of image temporarily stored in the delay unit 48 on the display unit 15.

On the other hand, in the case where the determination made in step S53 is that there is stored setting-information corresponding to the feature value, the process proceeds to step S56 in which the setting-information (the setting-value) is read.

When the setting-value is read, the setting-value is applied to the image in step S55. That is, in this case, the feature value/setting-information reading unit 63 reads the setting-information corresponding to the feature value of the synchronous position information from the feature value/setting-information recording unit 62 and supplies it to the selector 47. In the present case, the selector 47 receives the setting-information from the feature value/setting-information reading unit 63 but no setting-information from the setting-information determination unit 46, and thus the selector 47 transfers the setting-information received from the feature value/setting-information reading unit 63 to the applying unit 49. According to this setting-information, one frame of image stored in the delay unit 48 is processed, and a resultant image is displayed on the display unit 15.

As described above, in the state in which synchronization is performed, the image is processed according to the setting-value, and the resultant image is displayed.

Referring again to the flow chart shown in FIG. 10, if the above-described process associated with synchronization in step S13 is completed, then, in step S14, the operation information analysis unit 45 determines whether an image-processing command has been issued by a user by operating the remote control 14 (hereinafter, such an operation performed by a user to designate an effect to be applied to an image will be referred to simply as an "effect/edit control operation"). For example, when an image is being displayed on the display unit 15, if the user issues a 2×-zoom command, an optical signal corresponding to the 2×-zoom command is emitted from the remote control 14. If the light receiver 44 receives the optical signal, the light receiver 44 outputs an electrical signal corresponding to the received optical signal to the operation information analysis unit 45. Accordingly, the operation information analysis unit 45 determines that an effect/edit control operation has been performed, and thus the process proceeds to step S15.

In step S15, the recording flag is set. The process comes in step S15 only in a situation in which the determination made in step S12 is that the recording flag is in the off-state and the determination made in step S14 is that an image-processing command has been issued by a user. Therefore, in this case, it is necessary to start recording operation information or setting-information. Thus, in step S15, the recording flag is set.

After the recording flag is set in step S15, the process proceeds to step S16 to perform the effect/edit process in accordance with the effect/edit control operation. The process also comes in step S16 when it is determined in step S12 that the recording flag is in the on-state. That is, step S16 is performed when the recording flag is in the on-state. In other words, when it is determined in step S12 that the recording flag is in the off-state and it is determined in step S14 that no effect/edit control operation has been performed by a user, it is not necessary to record the operation information or setting-information, and thus step S16 is not performed.

The effect/edit process performed in accordance with the effect/edit control operation in step S16 is described in detail with reference to a flow chart shown in FIG. 14. In step S91, the operation information analysis unit 45 analyzes the signal supplied from the light receiver 44 to detect operation information and supplies the detected operation information to the setting-information determination unit 46.

In step S92, it is determined whether recording is ended. Note that there is a possibility that the operation information acquired in step S91 indicates a record end command. More specifically, for example, if the effect/edit control operation by the user is ended, and an end button is finally pressed by the user, then a signal generated in response to pressing the end button is received by the light receiver 44, and thus it is determined that the received operation information indicates that recording should be ended.

In the case where it is determined in step S92 that recording is not ended, the process proceeds to step S93. That is, if it is determined that recording is still being performed (because the effect/edit control operation is still being performed), the process proceeds to step S93 to produce the setting-value in accordance with the content of the operation information.

More specifically, in step S93, in accordance with the operation information, the setting-information determination unit 46 determines setting-information indicating a process to be performed on the image by the applying unit 49, and the setting-information determination unit 46 supplies the setting-information to the feature value/setting-information recording control unit 61 and the selector 47. For example, if a 2×-zoom command is issued, the setting-information is determined so as to instruct the applying unit 49 to perform a 2×-zoom process on the image, and the resultant setting-information is supplied to the feature value/setting-information recording control unit 61 and the selector 47.

Figure 16:
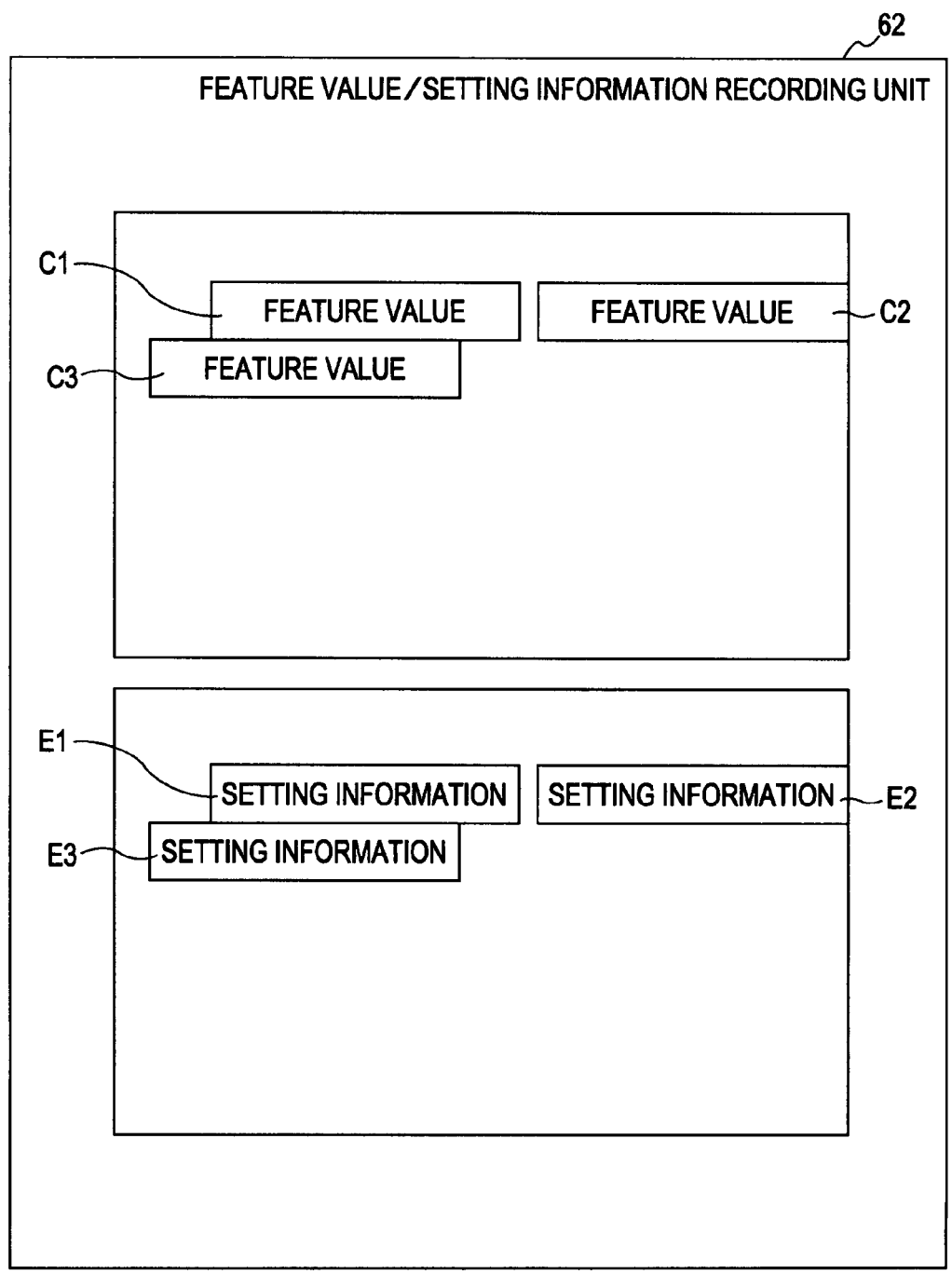
FIG. 16 is a diagram illustrating a feature value extraction process according to an embodiment of the present invention.

In step S94, the feature value/setting-information recording control unit 61 records the feature value supplied from the feature value extractor 41 in the feature value/setting-information recording unit 62 and also records the setting-information supplied from the setting-information determination unit 46 in association with the feature value. Via the above-described process, feature values and setting-information are stored in the feature value/setting-information recording unit 62. More specifically, for example, as shown in FIG. 16, when a feature value C1 is recorded as an address A, setting-information E1 corresponding to the feature value C1 is recorded at an address equal to the address A times m, that is, m×A. Note that FIG. 16 shows locations of addresses in the feature value/setting-information recording unit 62 where feature values and setting-information are recorded.

Similarly, for a feature value C2 and corresponding setting-information E2, the feature value/setting-information recording control unit 61 records the feature value C2 at an address B and the setting-information E2 at an address m×B. For a feature value C3 and corresponding setting-information E3, the feature value/setting-information recording control unit 61 records the feature value C3 at an address C and the setting-information E2 at an address m×C. By recording setting-information in association with corresponding feature values as described above, it is possible to identify an address of setting-information corresponding to a feature value from the address of the feature value. This makes it possible to easily read setting-information corresponding to each feature value stored in the setting-information recording unit 62. Note that feature values and corresponding setting-information are continuously recorded over a period during which a process to be performed on the image is continuously specified. Note that each of the feature values C1 to C3 shown in FIG. 16 is not limited to that corresponding to one frame, but as many feature values may be continuously recorded as there are frames in a period during which a process is continuously specified. As for setting-information, each of the setting-information E1 to E3 shown in FIG. 16 is not limited to that corresponding to a feature value of one frame, but as many pieces of setting-information may be recorded at each address corresponding to the address of each feature value C1 to C3 as there are frames in the period during which the process is continuously specified.

In step S95, the selector 47 transfers the setting-information received from the setting-information determination unit 46 to the applying unit 49. The applying unit 49 processes the image stored in the delay unit 48 in accordance with the setting-information supplied from the selector 47. Thus, the resultant image produced by processing the original image in accordance with the command issued by the user is displayed on the display unit 15.

On the other hand, in the case where it is determined in step S92 that recording is ended, the process proceeds to step S96. In step S96, the setting-value is set to a normal value. In step S97, processing is performed in accordance with the setting-value. In this specific case, because the normal value is employed as the setting-value, the feature value/setting-information reading unit 63 does not supply setting-information to the selector 47. Therefore, the selector 47 does not receive the setting-information from either the setting-information determination unit 46 or the feature value/setting-information reading unit 63, and thus setting-information specifying a process to be performed is not supplied to the applying unit 49. As a result, the applying unit 49 directly displays one frame of image temporarily stored in the delay unit 48 on the display unit 15.

In step S98, the recording flag is reset. In response, the recording of setting-information is ended.

Figure 1:
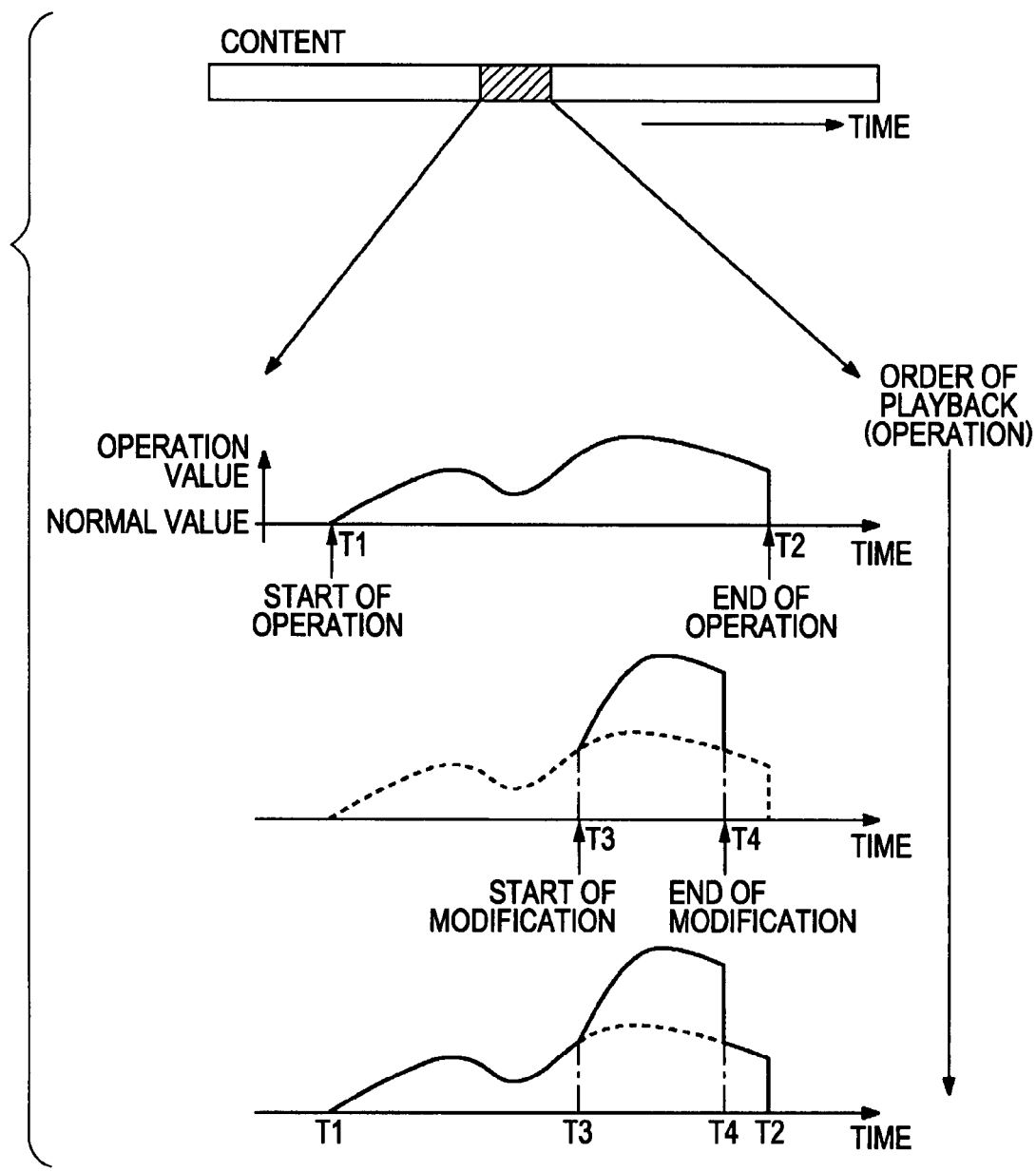
FIG. 1 shows a change in a setting-value associated with editing according to a conventional technique.
Figure 2A:
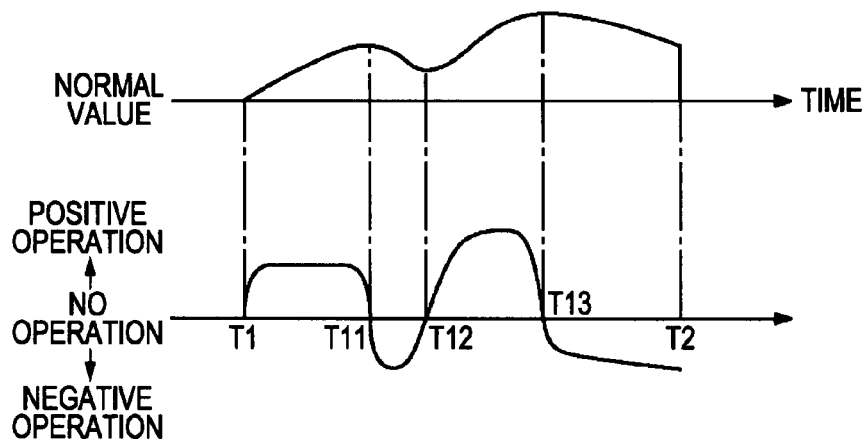
FIG. 2 shows a change in a setting-value associated with editing according to a conventional technique.
Figure 2B:
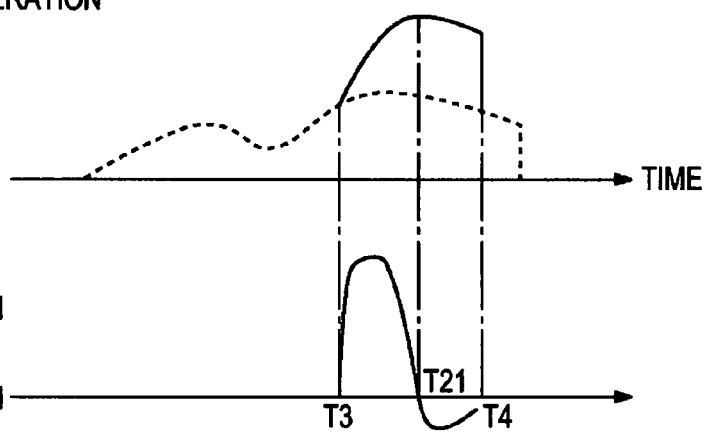

As described above, as long as a command specifying a process to be performed on an image is continuously output by operating the remote control 14 by a user, the process from step S91 to S95 is performed repeatedly, whereby setting-information indicating the process to be performed is stored in association with feature values in the feature value/setting-information recording unit 62. Note that this iterative process from step S91 to step S95 is performed in the recording mode described above with reference to FIGS. 1 and 2.

Referring back to the flow chart shown in FIG. 10, if the effect/edit process in step S16 is ended, the image processing is ended. As described above, the process of the flow chart shown in FIG. 10 is performed for each frame. That is, each time a new frame is input, the process of the flow chart shown in FIG. 10 is performed for the input frame. Thus, as described above, as long as a command specifying a process to be performed on an image is continuously output by operating the remote control 14 by a user, setting-information indicating the process to be performed is stored in association with feature values in the feature value/setting-information recording unit 62.

Smooth End Function

By using the image processing apparatus 13 shown in FIG. 5 or 6, it is possible to edit an image recorded on the recording medium 11 a plurality of times by performing the above-described process the plurality of times. By using the image processing apparatus 13 shown in FIG. 5 or 6, it is possible to play back the image in the form edited the plurality of times from the recording medium 11.

As described above with reference to FIG. 1 or 2, there is a possibility that an abrupt change in the setting-value occurs at the end of the recording depending on how editing is performed. In such a case, for example, an abrupt change in zoom ratio or the like can occur during playback of an image. Such an abrupt change during playback gives a discomfort impression to a user. The above problem can be avoided by performing recording without producing an abrupt change in setting-values by using the image processing apparatus 13 as described below. Hereinafter, a function of controlling the setting-value to have no abrupt change will be referred to as a smooth end function.

Figure 17A:
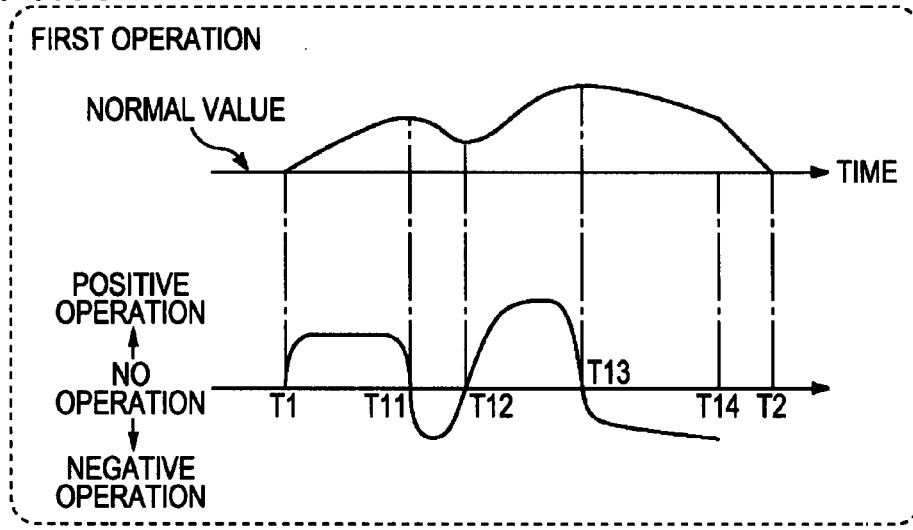
FIG. 17 is a diagram illustrating a change in a setting-value associated with a smooth end process according to an embodiment of the present invention.
Figure 17B:
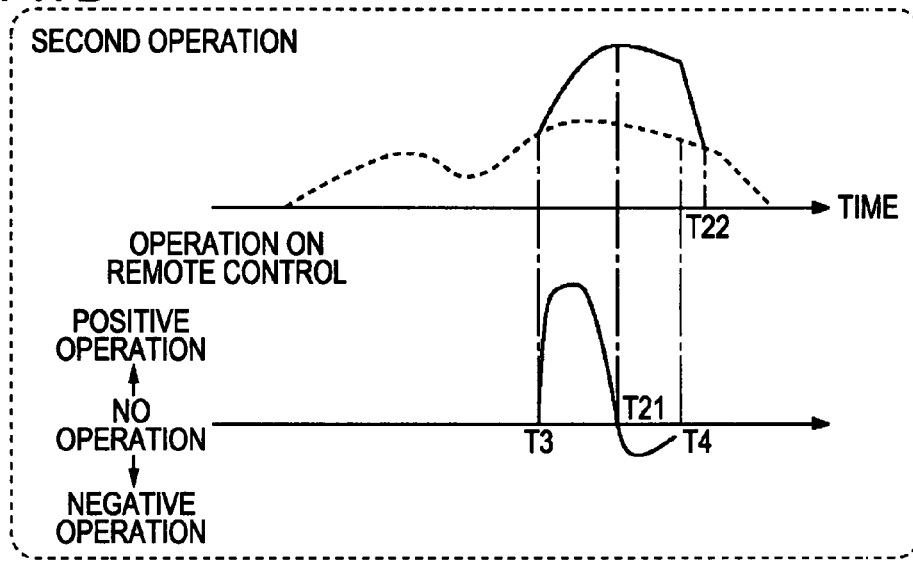
Figure 17C:
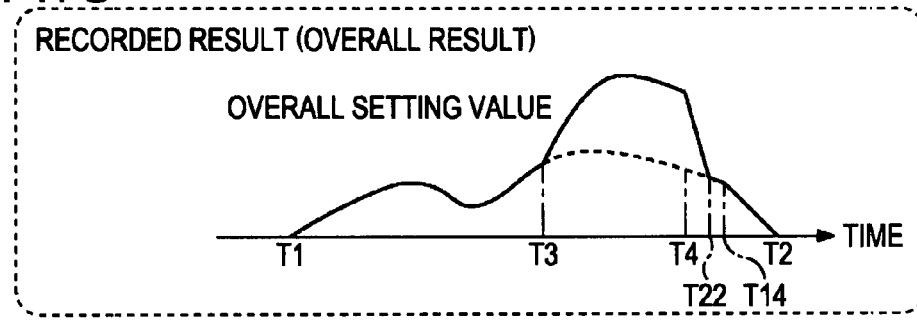

Referring to FIGS. 17A to 17C, the smooth end function is described below. FIG. 17A shows a first-time effect/edit control operation and a setting-value recorded in accordance with the effect/edit control operation. FIG. 17B shows a second-time effect/edit control operation and a setting-value recorded in accordance with the effect/edit control operation. FIG. 17C shows setting-values recorded as a total result of the above process. In each of FIGS. 17A and 17B, the setting-value is shown in the upper part of the figure, and the effect/edit control operation is shown in the lower part of the figure. FIGS. 17A to 17C are drawn in a similar manner to FIGS. 2A to 2C so that it is possible to easily understand a difference between the recording method by the smooth end function and the conventional recording method.

In the first-time effect/edit control operation, if an operation signal such as that shown in the lower part of FIG. 17A is output from the remote control 14, a setting-value such as that plotted in the upper part of FIG. 17A is recorded. Note that the setting-value is given by the integral of an operation value of the remote control 14. In FIGS. 17A and 17B, a "positive operation" refers to a positive effect/edit control operation such as enlarging of an image, and a "negative operation" refers to a negative effect/edit control operation such as reducing of an image.

In the example shown in FIG. 17A, a positive operation is performed over a period from an operation start time T1 to a time T11 as shown in the lower part of FIG. 17A, and the integral of the operation value is recorded as the setting-value, which gradually increases with time as shown in the lower part of FIG. 17B. In a period from the time T11 to a time T12, a negative operation is performed, and accordingly the recorded setting-value gradually decreases. After the time T12, positive and negative operations are performed, and the setting-value is recorded in accordance with the operations.

If an operation end button (a record end button) of the remote control 14 is pressed at a time T14, the recording of the setting-value is ended. Note that when the recording is ended at the time T14, the setting-value does not return to the normal value immediately, but the setting-value is reduced gradually to the normal value in a period from T14 to T2 by the smooth end function, and the resultant setting-value is recorded. As a result of the above-described process including the smooth end process, the setting-value is recorded as shown in the upper part of FIG. 17A.

Note that the normal value refers to a default setting-value, and setting-information corresponding to the normal value is referred to as normal setting-information.

In the specific example shown in FIG. 17B, the second-time effect/edit control operation is performed on the same content as that subjected to the first-time effect/edit control operation such that a positive operation is performed over a period from a time T3 to a time T21, and a negative operation is performed over a period from the time T21 to a time T4. As a result, a setting-value is recorded in the period from the time T3 to the time T4 as shown in the upper part of FIG. 17B.

In the second-time effect/edit control operation, the setting-value given by the integral of the operation value is added to the already-recorded setting-value obtained at the point of time T3 in the first-time effect/edit control operation. When the operation is ended at the time T4, the setting-value is gradually reduced in a period from the time T4 to a time T22 to a value (A) obtained at the time T4 in the first-time effect/edit control operation.

As a result of a modification of the setting-value according to the second-time effect/edit control operation, the setting-value is recorded as represented by a solid line shown in the upper part of FIG. 17B (that is, the setting-value is modified to a value represented by the solid line). Thus, after the completion of the second-time effect/edit control operation, the setting-value is recorded as shown in FIG. 17C as a total result of the process.

Figure 2C:
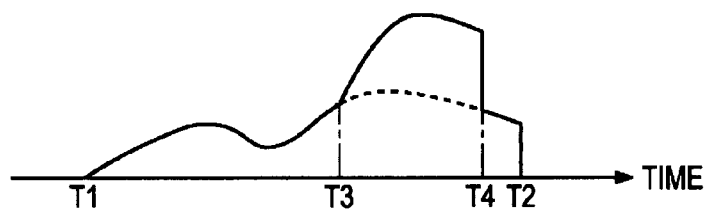

In the recorded result shown in FIG. 17C, unlike the recorded result shown in FIG. 2C in which abrupt changes in setting-value occur at times T4 and T2, the setting-value gradually changes in the period from the time T4 to the time T22 and the period from the time T14 to the time T2.

As described above, by the smooth end function, the setting-value is gradually changed at the end of the recording operation such that an abrupt change in setting-value does not occur.

FIG. 18 shows an example of a configuration of an image processing apparatus obtained by modifying the configuration of the image processing apparatus 13 shown in FIG. 5 so as to have the smooth end function, and FIG. 19 shows an example of a configuration of an image processing apparatus obtained by modifying the configuration of the image processing apparatus 13 shown in FIG. 6 so as to have the smooth end function.

In FIG. 18, similar parts to those in FIG. 5 are denoted by similar reference numerals, and a duplicated explanation thereof is omitted herein. The image processing apparatus 13 shown in FIG. 18 is similar to the image processing apparatus 13 shown in FIG. 5 except that it additionally includes a smooth end controller 201 adapted to execute a smooth end process.

The smooth end controller 201 receives/transmits setting-information from/to the setting-information determination unit 46. Information output from the smooth end controller 201 is supplied to the feature value/setting-information recording control unit 61 and the selector 47.

The setting-information determination unit 46 converts the input operation into setting-information and supplies the resultant setting-information to the smooth end controller 201. The smooth end controller 201 directly outputs the setting-information received from the setting-information determination unit 46 except when the end command is issued by the input operation. In the case where the end command is issued by the input operation, the smooth end controller 201 produces setting-information by interpolating between the last one of the input operation values stored in the feature value/setting-information recording unit 62 and the output from the feature value/setting-information recording unit 62. The produced setting-information is supplied to the applying unit 49 via the selector 47, and the applying unit 49 processes the image in accordance with the supplied setting-information. The setting-information is also supplied to the feature value/setting-information recording control unit 61 and recorded in the feature value/setting-information recording unit 62.

When a transition occurs in the setting-information output from the feature value/setting-information recording unit 62 as in the case where a transition occurs when the setting-information is returned from the end value given in the second-time effect/edit control operation to the original value obtained in the first-time effect/edit control operation as described above with reference to FIGS. 17A to 17C, the smooth end controller 201 smoothly connects the two pieces of setting-information.

Now, referring to FIG. 19, an example of a modification of the image processing apparatus 13 shown in FIG. 6 so as to have the smooth end function is described below. In FIG. 19, similar parts to those in FIG. 6 are denoted by similar reference numerals, and a duplicated explanation thereof is omitted herein. The image processing apparatus 13 shown in FIG. 19 is similar to the image processing apparatus 13 shown in FIG. 6 except that it additionally includes a smooth end controller 211 adapted to execute a smooth end process. The smooth end controller 211 is adapted to receive/transmit setting-information from/to the setting-information determination unit 153.

At a transition where original setting-information produced by the setting-information determination unit 153 changes discontinuously, the smooth end controller 211 modifies the setting-information by interpolation such that it gradually change.

Operations of the image processing apparatus 13 shown in FIGS. 18 and 19 are described in further detail below with reference to flow charts shown in FIGS. 20 to 23. The operation of the image processing apparatus 13 shown in FIG. 19 is basically similar to that of the image processing apparatus 13 shown in FIG. 18, and thus the operation is explained below, by way of example, for the image processing apparatus 13 shown in FIG. 18 with reference to flow charts shown in FIGS. 20 to 23.

Figure 20:
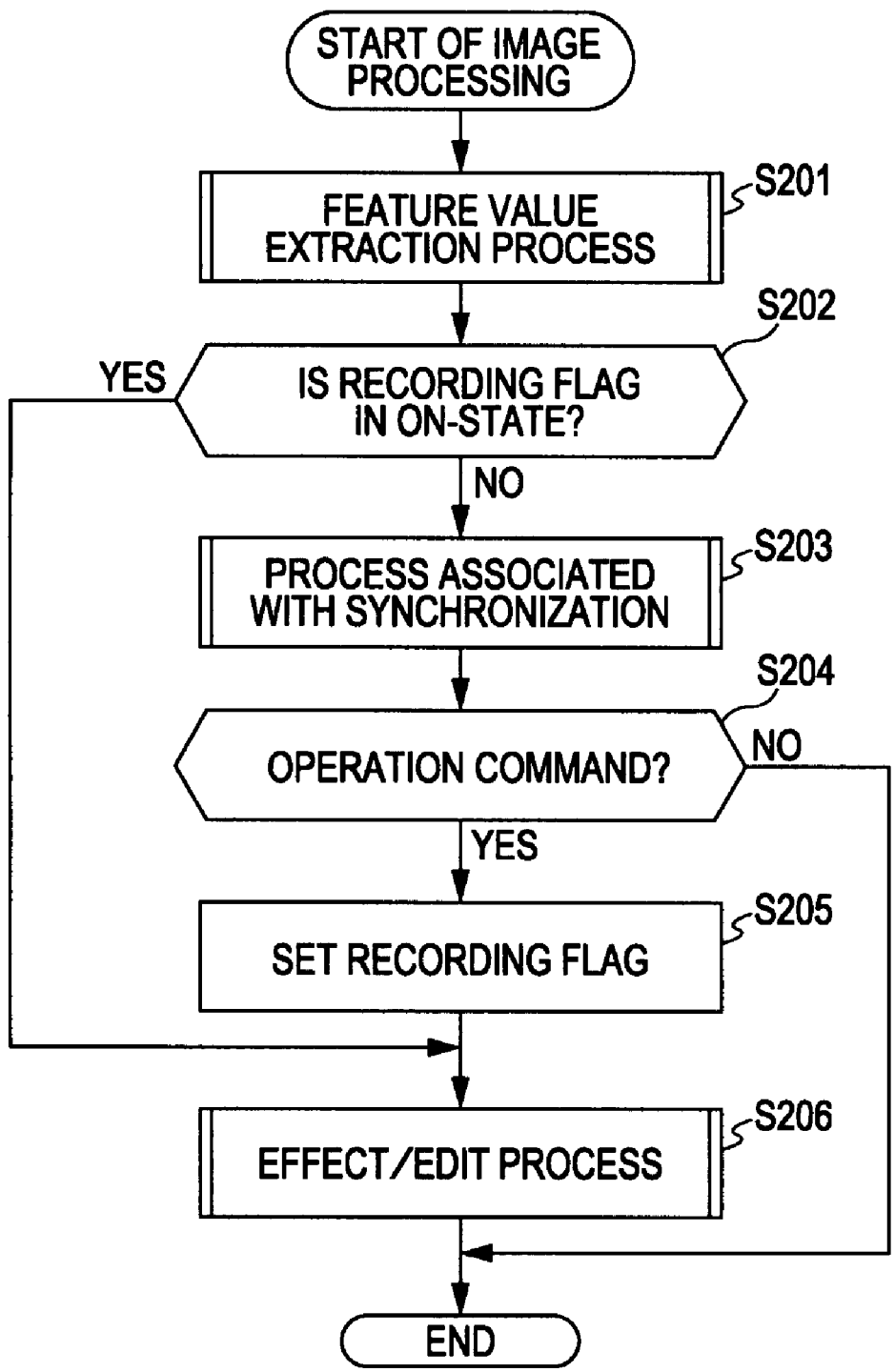
FIG. 20 is a flow chart showing image processing according to an embodiment of the present invention.

First, referring to FIG. 20, image processing performed by the image processing apparatus 13 shown in FIG. 18 is described. Basically, the image process is performed in a similar manner to that performed by the image processing apparatus 13 shown in FIG. 5, described above with reference to the flow chart shown in FIG. 10. More specifically, steps S201 to S206 are similar to steps S11 to S16 described in detail above with reference to the flow chart shown in FIG. 10, and thus the following discussion will be focused on differences.

In step S201, the feature value extractor 41 performs a feature value extraction process in a similar manner to that described above in the flow chart shown in FIG. 11.

In step S202, it is determined whether the recording flag is in the on-state. If it is determined that the recording flag is in an off-state, the process proceeds to step S203. In step S203, a process associated with synchronization is performed. The details of this process associated with synchronization in step S203 are described below with reference to a flow chart shown in FIG. 21.

Figure 21:
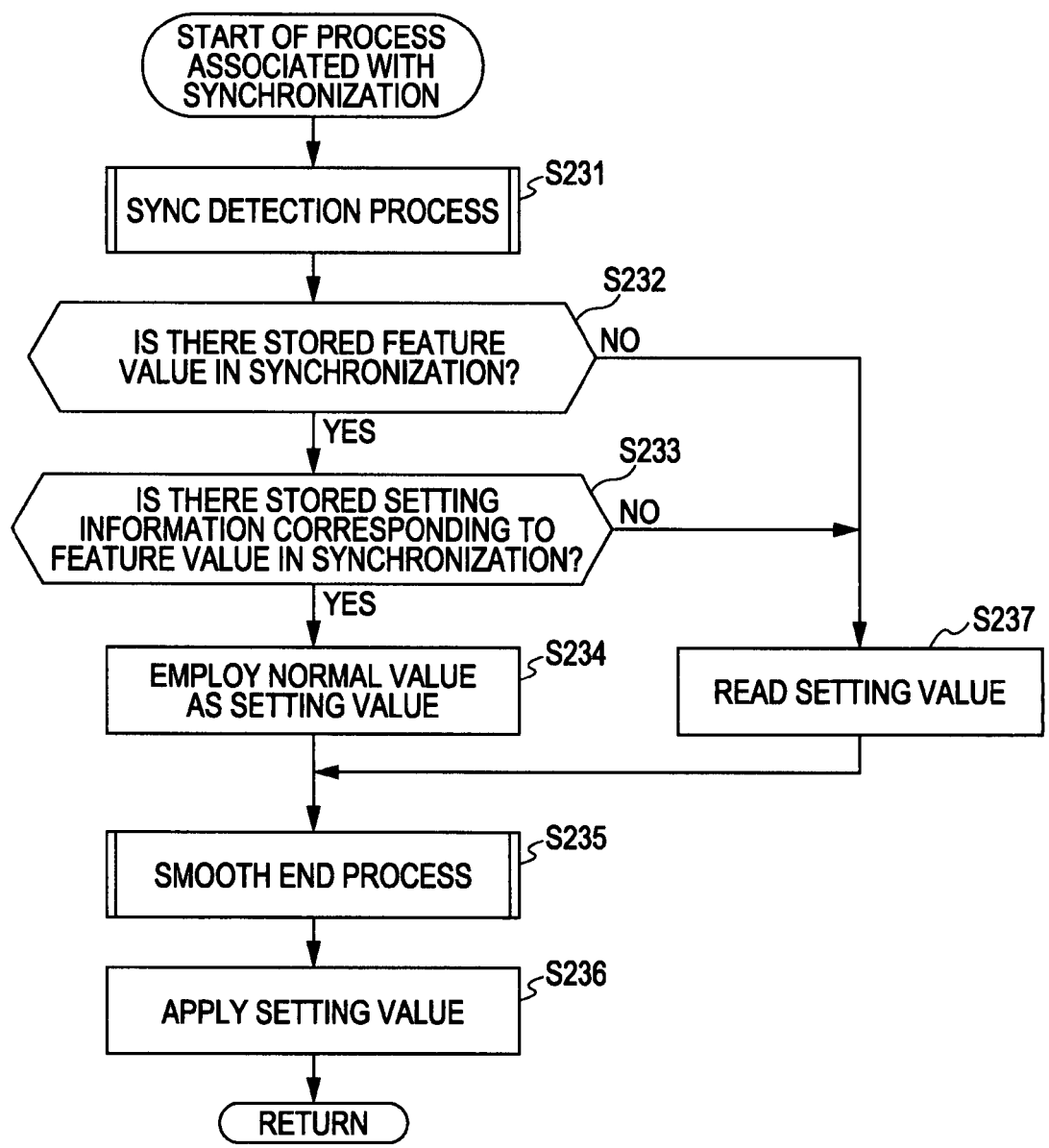
FIG. 21 is a flow chart showing a process associated with synchronization according to an embodiment of the present invention.

The flow chart shown in FIG. 21 is basically similar to that shown in FIG. 12 except that there is an additional step S235. After the setting-value is set to the normal value in step S234 or after setting-information (setting-value) is read from the feature value/setting-information recording unit 62 in step S237, the process proceeds to step S235 to perform a smooth end process. In step S236, the image is processed according to the setting-values subjected to the smooth end process.

Figure 22:
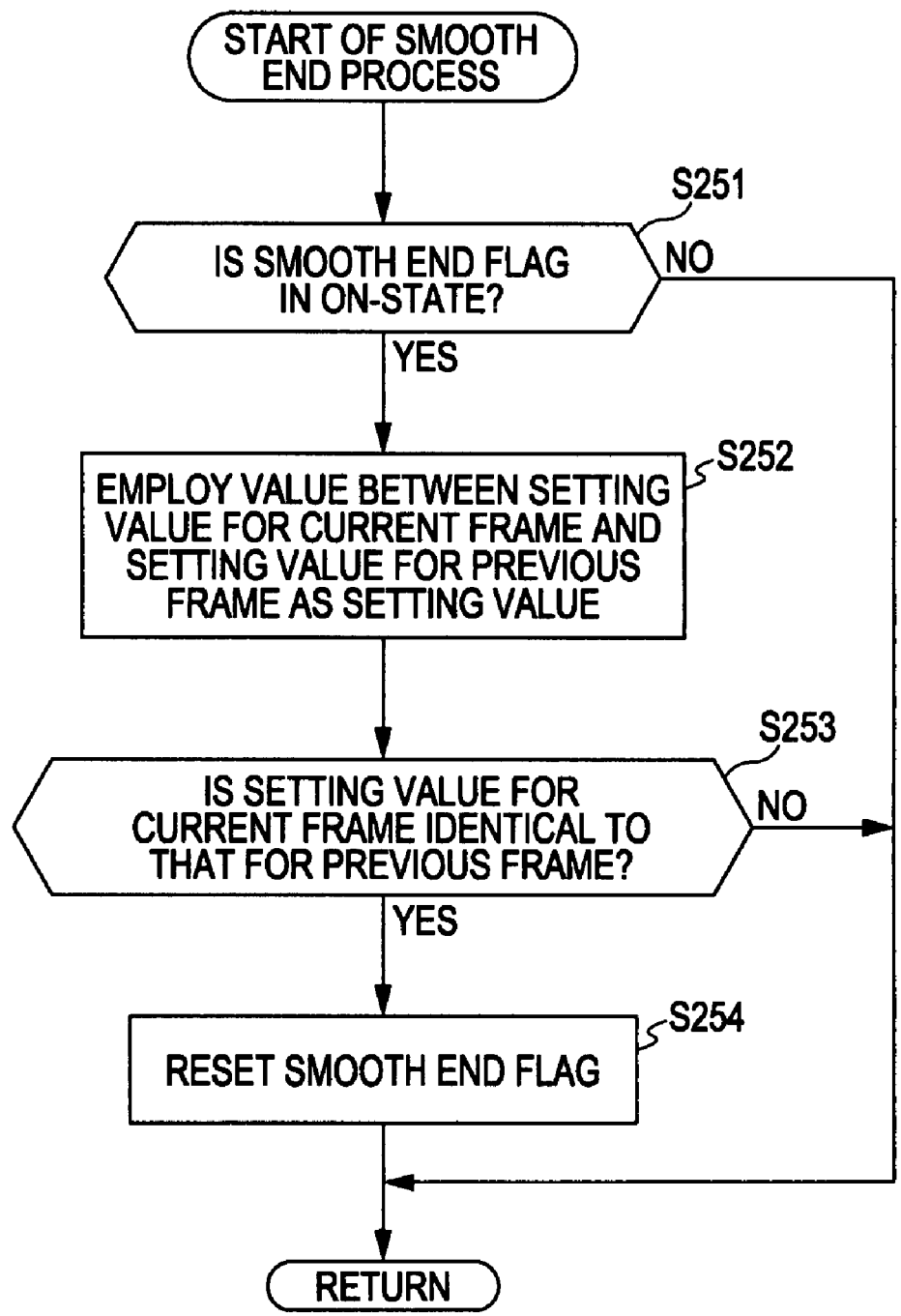
FIG. 22 is a flow chart showing a smooth end process according to an embodiment of the present invention.

The smooth end process performed in step S235 is described below with reference to a flow chart shown in FIG. 22. Note that the process shown in the flow chart of FIG. 22 is performed by the smooth end controller 201. In step S251, it is determined whether a smooth end flag is in an on-state. Note that the smooth end flag is set when the smooth end function should be executed, that is, when an edit end command is issued by a user.

In a case where it is determined in step S251 that the smooth end flag is in the off-state, it is not necessary to perform the smooth end process, and thus the smooth end process is ended.

On the other hand, in a case where it is determined in step S251 that the smooth end flag is in the on-state, the process proceeds to step S252. In step S252, the setting-value is set to a value between the setting-value for a previous frame and a current setting-value. Note that the setting-value for the previous frame refers to the setting-value for the frame immediately previous to a current frame for which the process shown in FIG. 20 is being performed, and the feature value of the previous frame has been stored in the feature value/setting-information recording unit 62. The current frame refers to a frame being currently processed, and the setting-value for the current frame has been set in step S234 or step S237 (FIG. 21).

In step S252, the setting-value is set to a value between the setting-value for the previous frame and the setting-value for the current frame. For example, when the setting-value for the previous frame is greater than the setting-value for the current frame, the setting-value is set to a value equal to the setting-value for the previous frame minus a predetermined value. When the setting-value for the previous frame is smaller than the setting-value for the current frame, the setting-value is set to a value equal to the setting-value for the previous frame plus a predetermined value. As described above, the setting-value for the current frame is set to a value equal to the setting-value for the previous frame plus or minus the predetermined value.

In step S253, it is determined whether the setting-value for the previous frame is equal to the setting-value for the current frame. Instead of determining whether the setting-value for the previous frame is equal to the setting-value for the current frame, the determination may be made as to whether the difference between the setting-value for the previous frame and the setting-value for the current frame is within a predetermined range.

In a case where it is determined in step S253 that the setting-value for the previous frame is not equal to the setting-value for the current frame, step S254 is skipped and the smooth end process for the frame of interest is ended. On the other hand, in a case where it is determined in step S253 that the setting-value for the previous frame is equal to the setting-value for the current frame, the process proceeds to step S254, in which the smooth end flag is reset.

Figure 24:
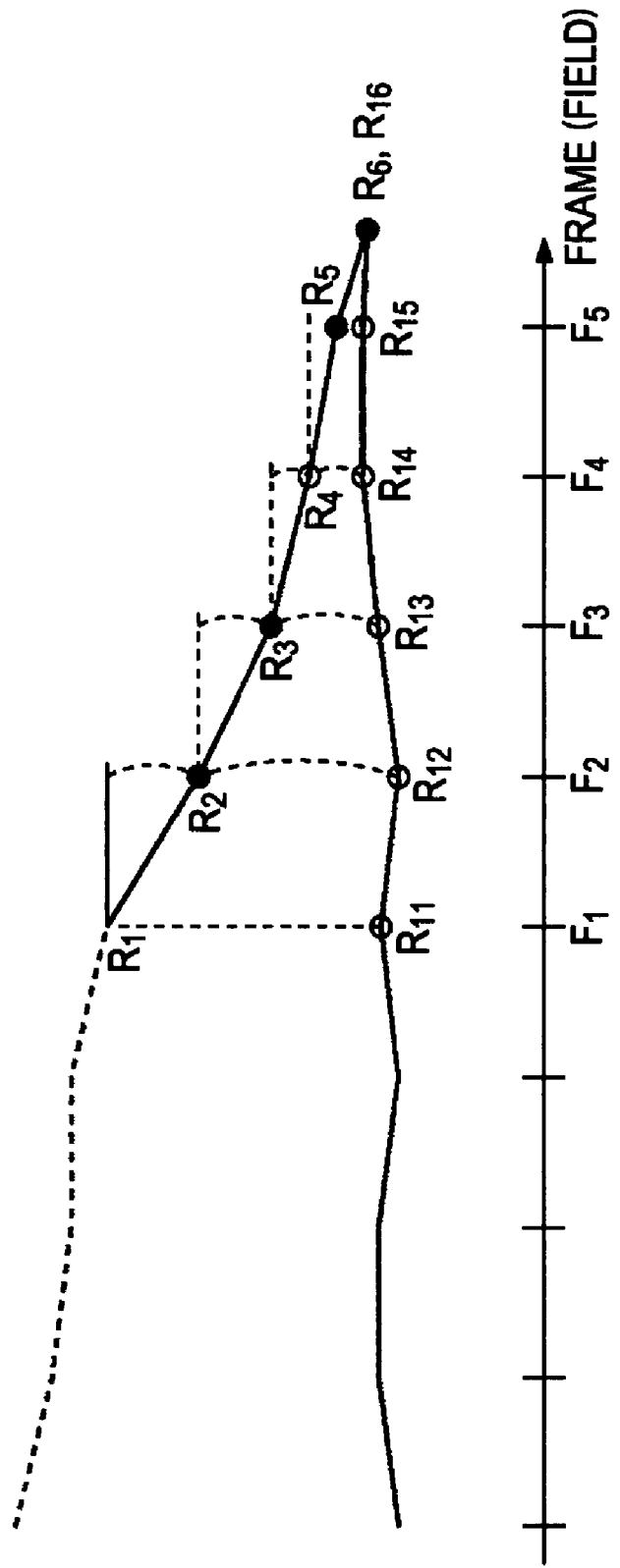
FIG. 24 is a diagram illustrating a smooth end process according to an embodiment of the present invention.

In a period in which the smooth end flag is in the on-state, the process in step S252 is performed for each frame, and the setting-value approaches the setting-value recorded in the process performed in response to the previous effect/edit control operation. Thus, it is possible to prevent an abrupt change in the setting-value as described in further detail below with reference to FIG. 24.

If the effect/edit control operation is ended at a frame F1, and if the setting-value for the frame F1 is set to R1, then, in the conventional technique, the setting-value for a next frame F2 is returned to a value R12 already recorded for the frame F2. However, in the present embodiment, unlike the conventional technique, the smooth end process (step S252) is performed to set the setting-value for the frame F2 to a value R2 between the setting-value R1 and the setting-value R12, and more specifically to a value equal to the setting-value R1 minus the predetermined value.

For a frame F3, the setting-value is set to a value R3 equal to the setting-value R2 minus the predetermined value. The setting-value for a frame F4 is set to a value R4, and the setting-value for a frame F5 is set to a value R5 in a similar manner.

In the present example, the difference between the setting-value R5 for the frame F5 and the original recorded setting-value R15 is within the predetermined range, and thus the setting-value for a next frame F6 is set to value equal to a setting-value R16 originally set and recorded for the frame F6. In the present embodiment, as described above, the setting-value is changed gradually to the original value set in the process performed in response to the previous effect/edit control operation, without abruptly changing the setting-value to the original value.

Referring back to the flow chart shown in FIG. 21, if the smooth end process in step S235 is completed, the process proceeds to step S236 to apply the setting-value to the image. If the process associated with synchronization is completed, the process proceeds to step S204 (FIG. 20).

In step S204, it is determined whether an effect/edit control operation (for editing) is performed by a user. If it is determined that an effect/edit control operation is performed, the process proceeds to step S205. In step S205, the recording flag is set. In step S206, an effect/edit process is performed in accordance with the effect/edit control operation. The details of the process performed in step S206 in accordance with the effect/edit control operation are described below with reference to a flow chart shown in FIG. 23.

Figure 14:
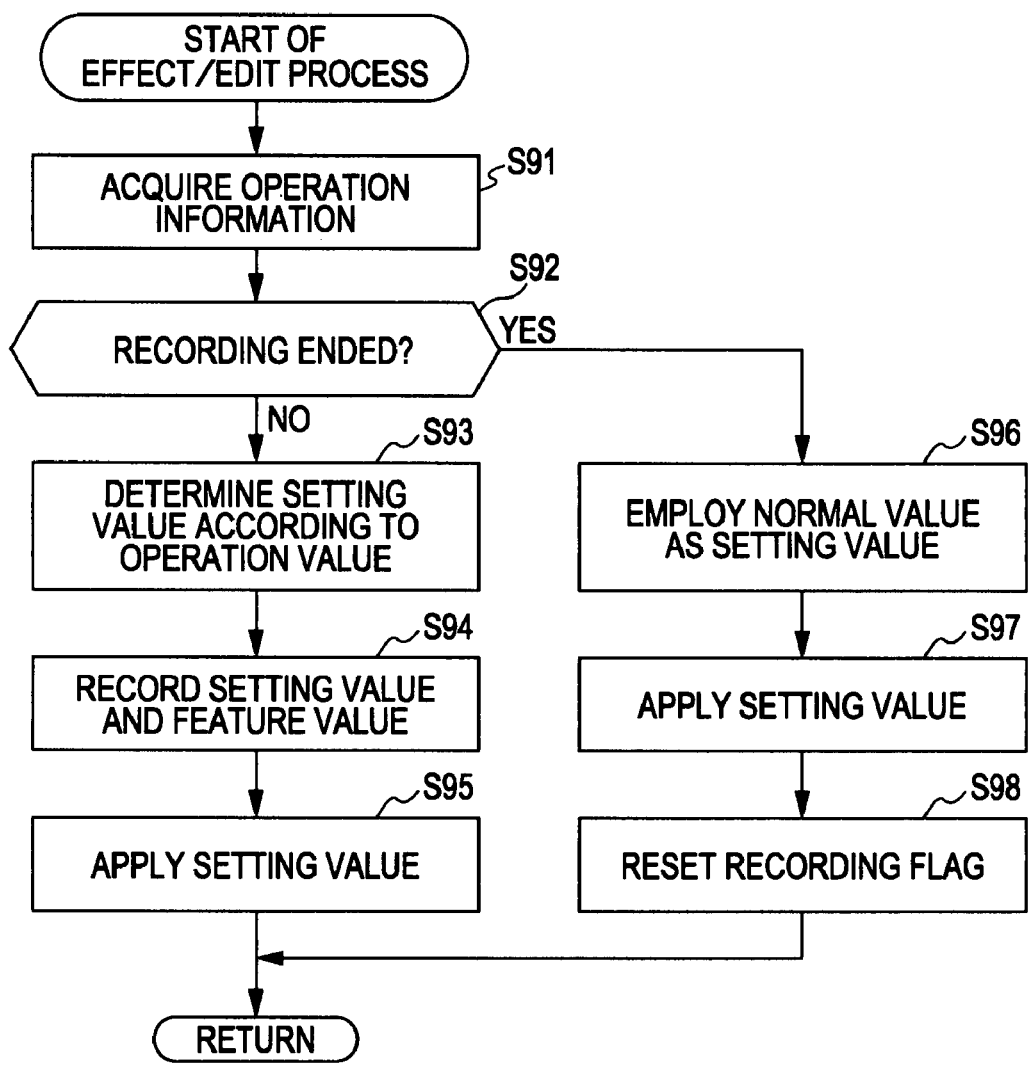
FIG. 14 is a flow chart showing an effect/edit process according to an embodiment of the present invention.
Figure 23:
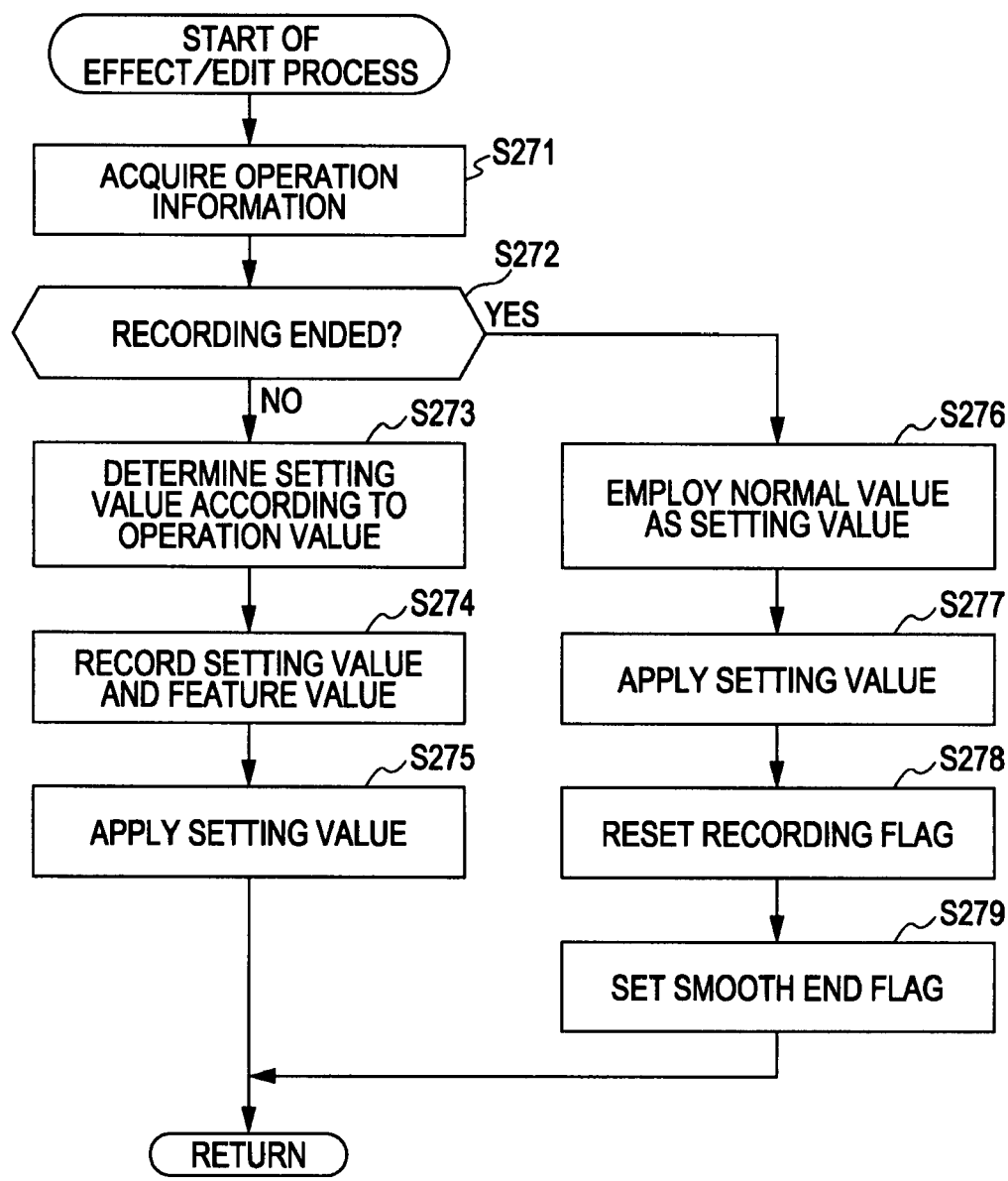
FIG. 23 is a flow chart showing an effect/edit process according to an embodiment of the present invention.

Steps S271 to S278 in FIG. 23 are similar to steps S91 to S98 in FIG. 14, and thus a duplicated explanation thereof is omitted herein. In step S279, the smooth end flag is set. The process comes in step S279 only when the determination made in step S272 is that recording has been ended. The recording is ended when an operation end button or the like is pressed by a user.

In the conventional technique, when an operation (edit) end command is issued by a user, the setting-value returns to an original already-recorded value, as described above. However, such an abrupt change in setting-value can cause an undesirable abrupt change in image. In the present embodiment, to avoid the above problem, the smooth end process is performed. The smooth end process is performed when the smooth end flag is in the on-state. Thus, when the operation end command is issued by a user, the smooth end flag is set in step S279.

If the smooth end flag is set, then an affirmative answer is given to the determination in step S251 (FIG. 22) as to whether the smooth end flag is in the on-state. As a result, steps S252 and S253 are performed. Thus, the setting-value is changed gradually to the original already-recorded value.

As described above, execution of the smooth end process prevents an abrupt change in setting-value when editing is performed a plurality of times. Thus, an abrupt change in image is prevented.

Automatic Effect/Edit Control Operation End Function

An automatic effect/edit control operation end function is described below. The automatic effect/edit control operation end function makes it possible to automatic end an effect/edit control operation without a user having to perform a particular operation.

Figure 25A:
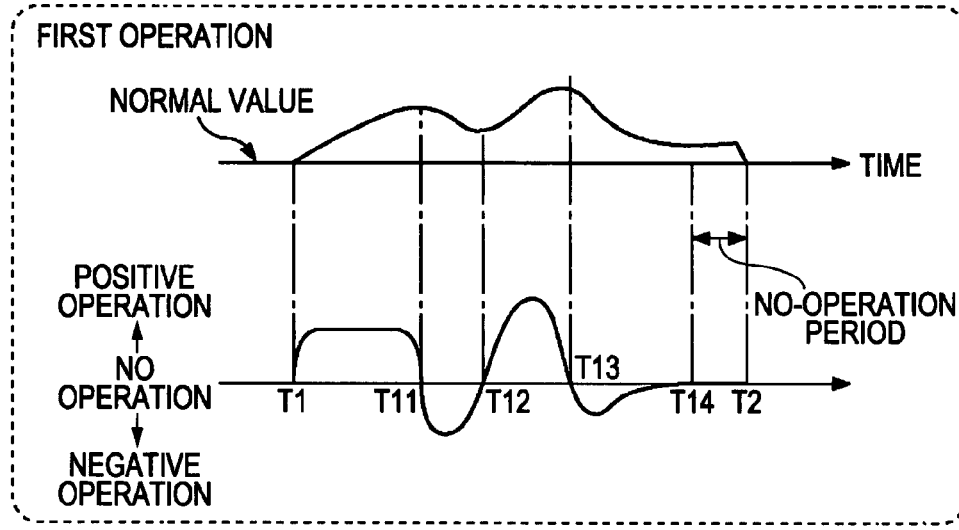
FIG. 25 is a diagram illustrating a change in a setting-value associated with an automatic end process according to an embodiment of the present invention.
Figure 25B:
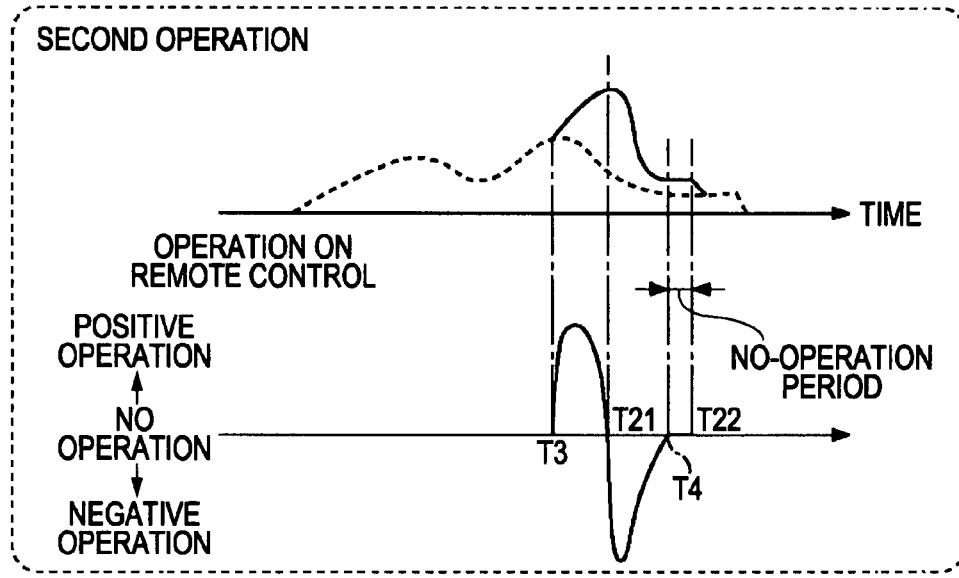
Figure 25C:
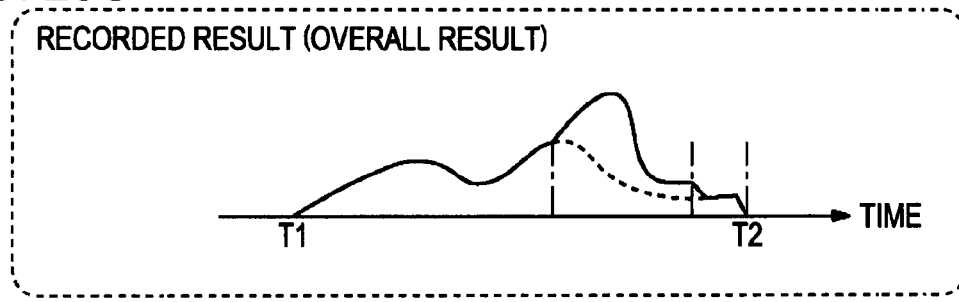

Referring to FIGS. 25A to 25C, the automatic effect/edit control operation end function is described. FIG. 25A shows a first-time effect/edit control operation and a setting-value recorded in accordance with the effect/edit control operation. FIG. 25B shows a second-time effect/edit control operation and a setting-value recorded in accordance with the effect/edit control operation. FIG. 25C shows a setting-value recorded as a total result of the above process. In each of FIGS. 25A and 25B, the setting-value is plotted in the upper part of the figure, and the operation result is shown in the lower part of the figure.

In the specific example shown in FIG. 25A, a first-time effect/edit control operation is performed on a content in a period from a time T1 to a time T2, and a setting-value is recorded in accordance with the effect/edit control operation in the period from T1 to T2. More particularly, a positive operation is performed in a period from T1 to T11, a negative operation is performed in a period from T11 to T12, a positive operation is performed in a period from T12 to T13, and a negative operation is performed in a period from T13 to T14. As a result, a setting-value is recorded as shown in the upper part of FIG. 25A.

In the present example, no effect/edit control operation is performed in a period from T14 to T2, that is, the period from T14 to T2 is a no-operation period. If the length of the no-operation period is greater than a predetermined value, the setting-value returns to a normal value without needing a command issued by a user.

After the setting-value was recorded according to the first-time effect/edit control operation, if a second-time effect/edit control operation is performed as shown in FIG. 25B, then a setting-value is recorded as shown in FIG. 25C. That is, in the example shown in FIG. 2B, the second-time effect/edit control operation is performed such that a positive effect/edit control operation is performed in a period from a point of time T3 to a point of time T21, a negative effect/edit control operation is performed in a period from the point of time T21 to a point of time T4, and no effect/edit control operation is performed after that. If no operation is performed over a period with a length equal to or greater than a predetermined value, that is, if the length of the period from T4 to T22 is equal to or greater than the predetermined value, the setting-value returns to a normal value without needing a command issued by a user.

When an operation end command is not issued by a user, if no effect/edit control operation is performed over a predetermined period, the setting-value is gradually returned to the original value.

As described above, the automatic effect/edit control operation end function makes it possible to determine whether the effect/edit control operation has been ended, and to automatically end the effect/edit control operation even if an effect/edit control operation end command is not issued by a user in such a manner that the setting-value is gradually changed to the original value without changing it abruptly.

Figure 26:
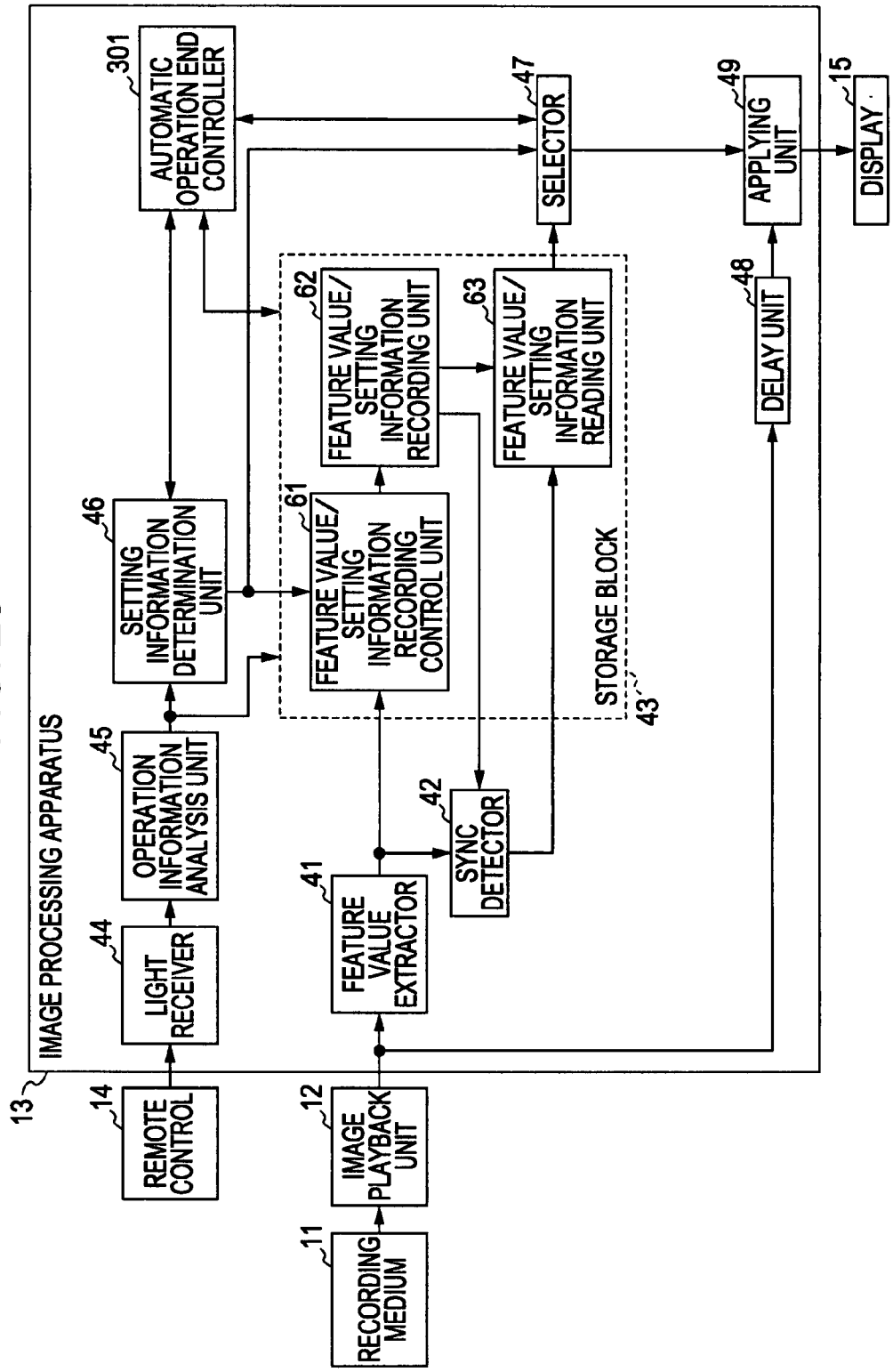
FIG. 26 is a block diagram showing a configuration of an image processing apparatus according to an embodiment of the present invention.
Figure 27:
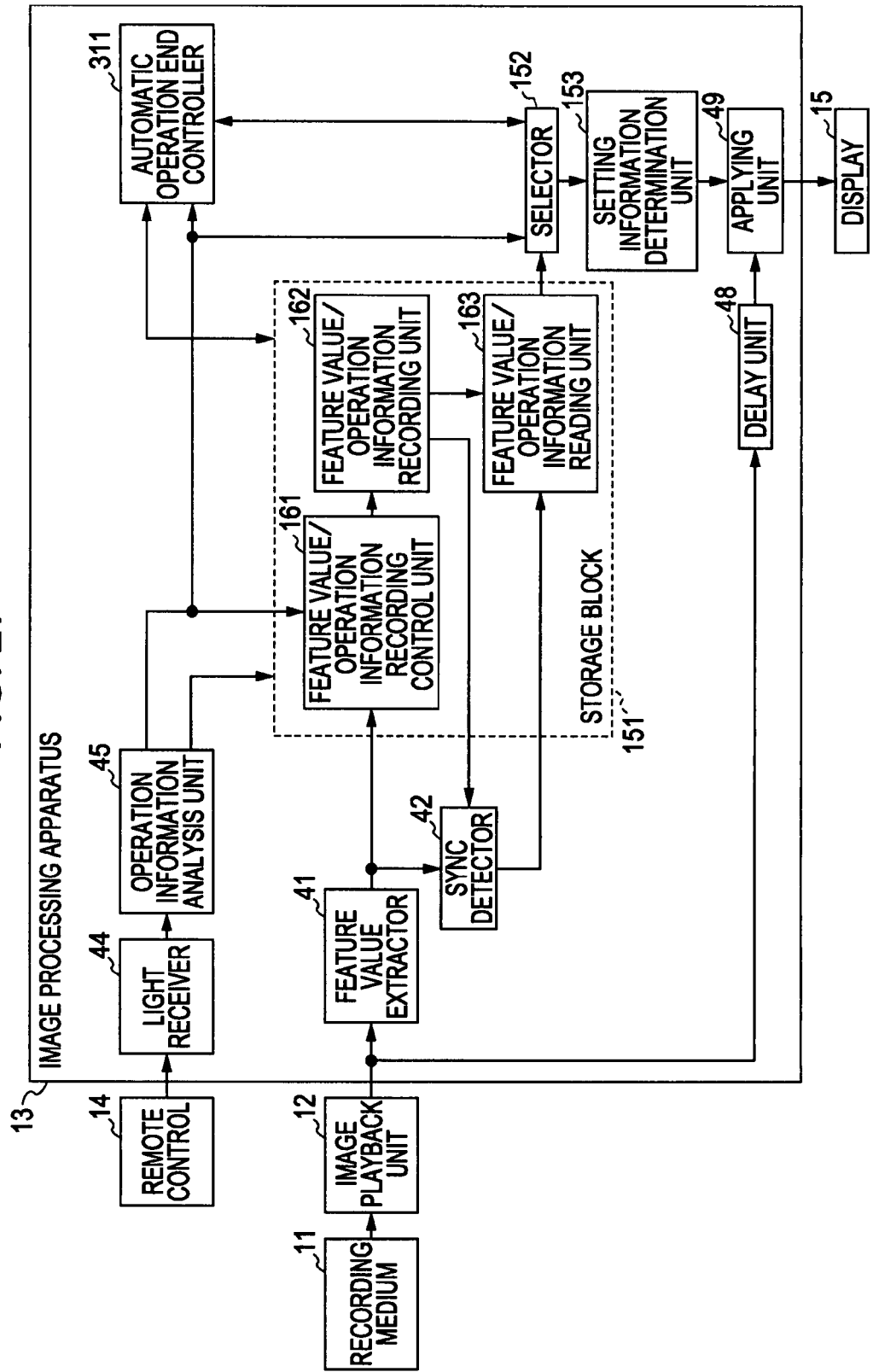
FIG. 27 is a block diagram showing a configuration of an image processing apparatus according to an embodiment of the present invention.

FIG. 26 shows an example of a configuration of an image processing apparatus obtained by modifying the configuration of the image processing apparatus 13 shown in FIG. 5 so as to have the automatic operation end function, and FIG. 27 shows an example of a configuration of an image processing apparatus obtained by modifying the configuration of the image processing apparatus 13 shown in FIG. 6 so as to have the automatic operation end function.

In FIG. 26, similar parts to those in FIG. 5 are denoted by similar reference numerals, and a duplicated explanation thereof is omitted herein. The image processing apparatus 13 shown in FIG. 26 is similar to the image processing apparatus 13 shown in FIG. 5 except that it additionally includes an automatic operation end controller 301 adapted to execute the automatic operation end process.

The automatic operation end controller 301 is adapted to transmit/receive data to/from the setting-information determination unit 46, the storage block 43, and the selector 47.

In FIG. 27, similar parts to those in FIG. 6 are denoted by similar reference numerals, and a duplicated explanation thereof is omitted herein. The image processing apparatus 13 shown in FIG. 27 is similar to the image processing apparatus 13 shown in FIG. 6 except that it additionally includes an automatic operation end controller 311 adapted to execute the automatic operation end process.

The automatic operation end controller 311 is adapted to transmit/receive data to/from the storage block 151 and the selector 152.

Figure 29:
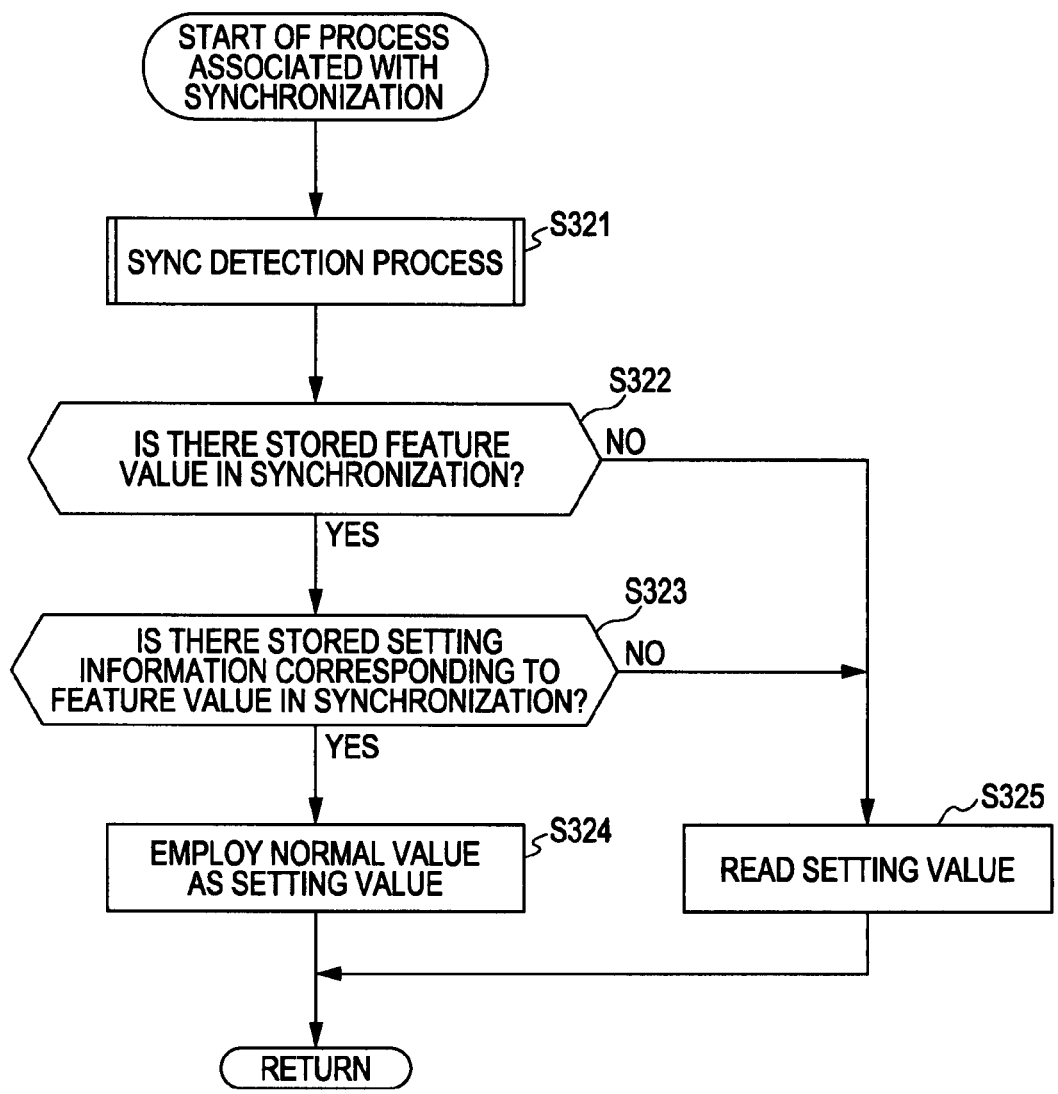
FIG. 29 is a flow chart showing a process associated with synchronization according to an embodiment of the present invention.
Figure 30:
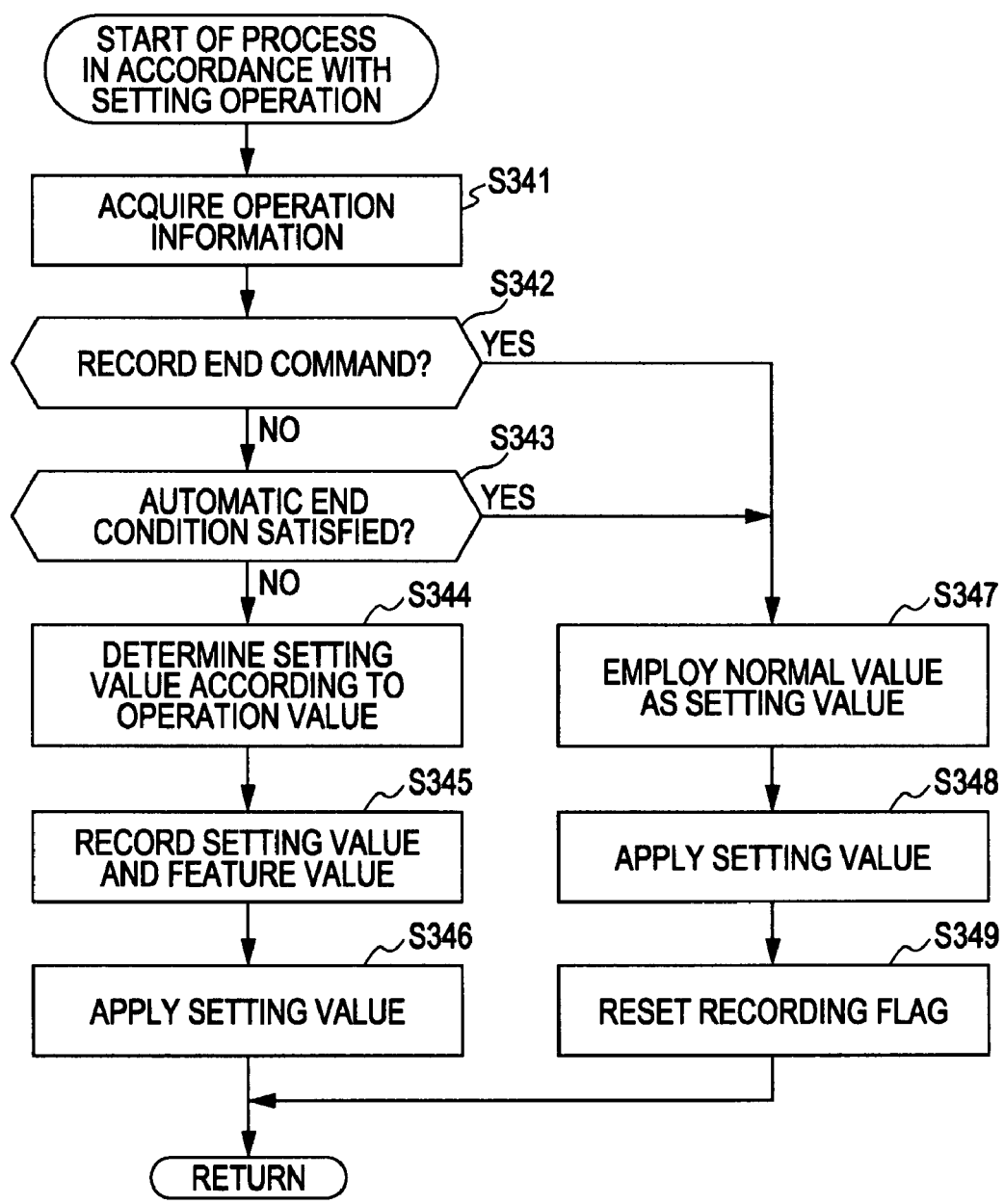
FIG. 30 is a flow chart showing an effect/edit process according to an embodiment of the present invention.

Image processing performed by the image processing apparatus 13 shown in FIG. 26 is described below with reference to flow charts shown in FIGS. 28 to 30.

In step S301, a feature value extraction process is performed. The feature value extraction process in step S301 is performed in a similar manner as described above with reference to the flow chart shown in FIG. 11, and thus a duplicated explanation thereof is omitted herein.

In step S302, the process associated with synchronization is performed. The details of this process associated with synchronization in step S302 are described below with reference to a flow chart shown in FIG. 29. Steps S321 to S325 are similar to steps S51 to S54 and S56 described above with reference to the flow chart shown in FIG. 12, and thus a duplicated explanation thereof is omitted herein. Note that the process associated with synchronization does not include applying the setting to the image.

Figure 28:
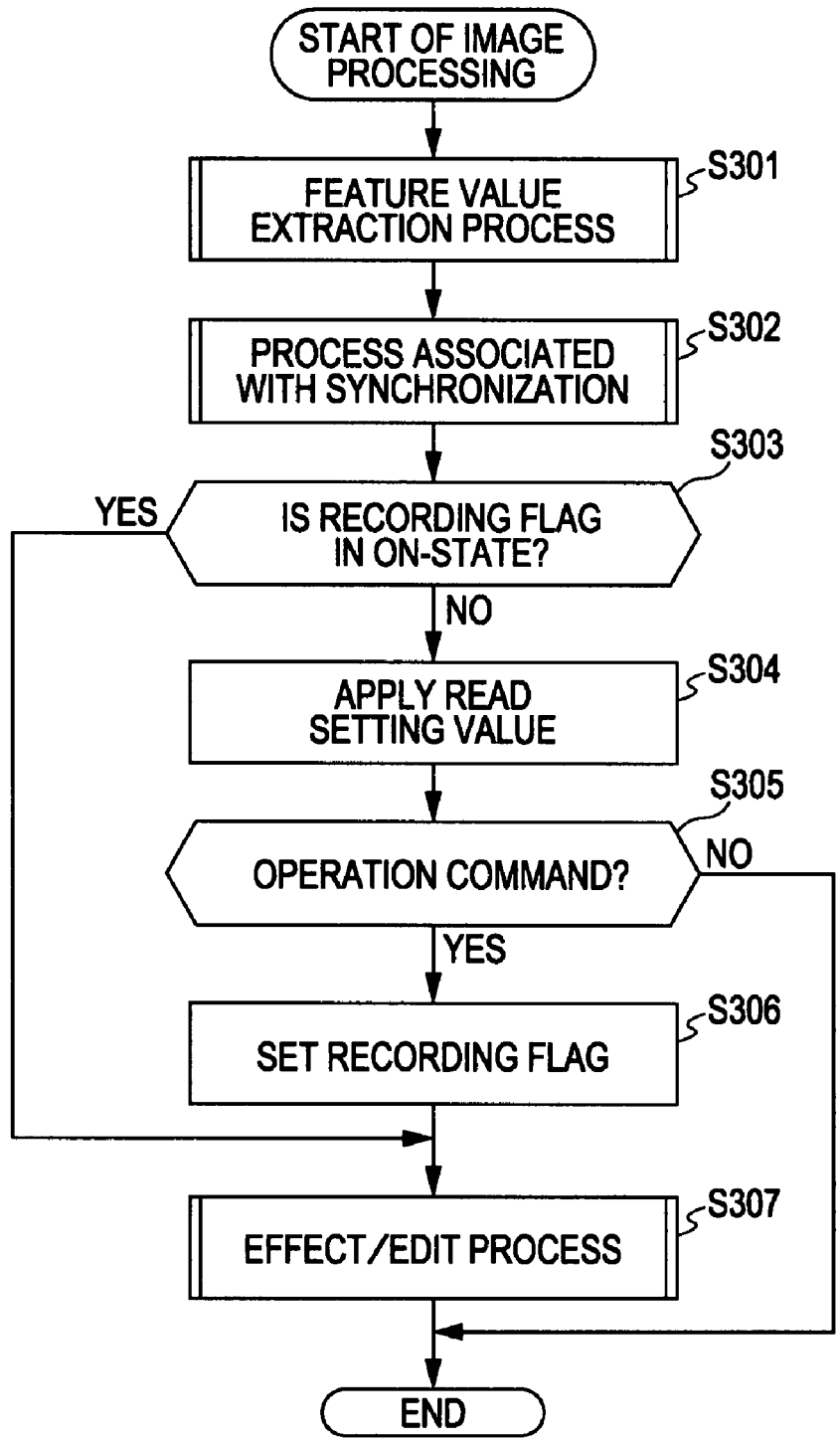
FIG. 28 is a flow chart showing image processing according to an embodiment of the present invention.

After the synchronization detection process, the process proceeds to step S303 in the flow chart shown in FIG. 28. In step S303, it is determined whether the recording flag is in the on-state. In the smooth end process described above with reference to the flow chart shown in FIG. 20, it is determined in step S202 whether the recording flag is in the on-state, and the process associated with synchronization is performed in step S203.

The process of the flow chart shown in FIG. 28 is different from the process of the flow chart shown in FIG. 20 in that the step of determining whether the recording flag is in the on-state, that is, whether the setting-value is being recorded and the step of performing the process associated with synchronization are exchanged with each other in terms of processing order.

By performing the process associated with synchronization before the determination is made as to whether the recording flag is in the on-state, that is, by performing the process associated with synchronization regardless of whether the recording flag is in the on-state, it becomes possible to acquire a setting-value in a state in which playback is performed without performing recording.

In a case where it is determined in step S303 that the recording flag is in the off-state, the process proceeds to step S304 to apply the read setting-value. Because the process associated with synchronization has been performed in step S302 regardless of whether recording flag is in the on-state, and thus the setting-value has been set in step S324 or S325 (FIG. 29). Thus, in the present step S304, the setting-value is applied to the image.

In step S305, it is determined whether an effect/edit control operation is performed. If it is determined that an effect/edit control operation has been performed, the process proceeds to step S306 in which the recording flag is set. The process then proceeds to step S307 to perform the effect/edit process. The details of the process associated with synchronization in step S307 are described below with reference to a flow chart shown in FIG. 30.

In step S341, the operation information analysis unit 45 analyzes the signal supplied from the light receiver 44 to identify operation information and supplies the identified operation information to the setting-information determination unit 46. In step S342, it is determined whether the operation information acquired in step S341 is of a record end command.

In a case where it is determined in step S342 that the acquired operation information is not of the record end command, the process proceeds to step S343. However, if it is determined in step S342 that the acquired operation information is of the record end command, the process proceeds to step S347.

In step S343, it is determined that an automatic end condition is satisfied. Note that the automatic end condition is satisfied, as described above with reference to FIGS. 25A to 25C, when no effect/edit control operation is performed over a period with a length equal to or greater than the predetermined value (that is, when the length of the no-operation period is equal to or greater than the predetermined value). More specifically, the automatic operation end controller 301 (FIG. 26) measures the time during which the setting-value supplied from the setting-information determination unit 46 remains unchanged, and determines whether the measured time has reached the predetermined value (that is, whether the setting-information has remained unchanged over a period with a predetermined length or longer), thereby determining whether the automatic end condition is satisfied.

Alternatively, the automatic end condition may be regarded as being satisfied when the difference between a setting-value corresponding to a current effect/edit control operation and an already-recorded setting-value is within a predetermined range. In this case, the automatic operation end controller 301

(FIG. 26) checks whether the difference between the setting-value supplied from the setting-information determination unit 46 and the setting-value read from the feature value/setting-information recording unit 62 is within the predetermined range, to determine whether the automatic end condition is satisfied.

The automatic end condition may include a plurality of conditions, and the automatic end condition may be regarded as being satisfied when all or part of the conditions are satisfied.

The automatic operation end controller 311 (FIG. 27) also determines whether the automatic end condition is satisfied. However, in the case of the automatic operation end controller 311, the determination is made on the basis of effect/edit control operation information supplied from the operation information analysis unit 45 and operation information stored in the feature value/operation information recording unit 162.

In a case where it is determined in step S343 that the automatic end condition is satisfied, the process proceeds to step S347. However, when the automatic end condition is not satisfied, the process proceeds to step S344.

Thus, in the present embodiment, either when the record end command is issued by a user or when the automatic end condition is satisfied, the process proceeds to step S347, and the same process is performed in both cases. That is, even when the operation end command is not issued by a user, if the automatic end condition is satisfied, the same process as that performed in response to the operation end command is performed.

Steps S344 to S349 are similar to steps S93 to S98 described above with reference to the flow chart shown in FIG. 14, and thus a duplicated explanation thereof is omitted herein.

The automatic effect/edit control operation end function allows it to automatically end the operation in the above-described manner.

In some cases, a combination of a plurality of setting-values is used to express one state. In such a case, it is determined that the automatic end condition is satisfied when all setting-values become close to values described in operation log data or become close to normal values. For example, in the case of zoom, it is determined that the automatic end condition is satisfied when all of three parameters, that is, the zoom ration, the horizontal coordinates of the zoom center, and the vertical coordinate of the zoom center become close to values of operation log data or normal values.

Additive Editing Function

Editing is allowed for various effects such as zoom or various purposes such as compensation for camera shake. Thus, in some cases, editing is performed a plurality of times such that editing of one item is performed at a time. For example, compensation for camera shake is performed in a first-time edit operation, and editing of zoom is performed in a second-time edit operation.

Figure 31A:
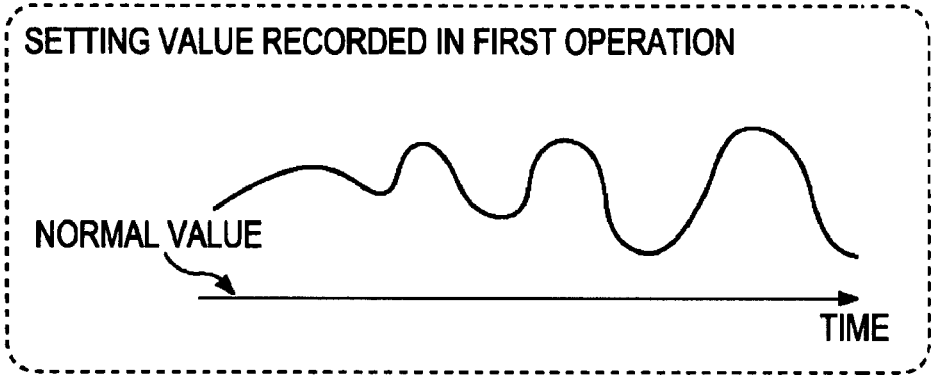
FIG. 31 is a diagram illustrating an addition process according to an embodiment of the present invention.
Figure 31B:
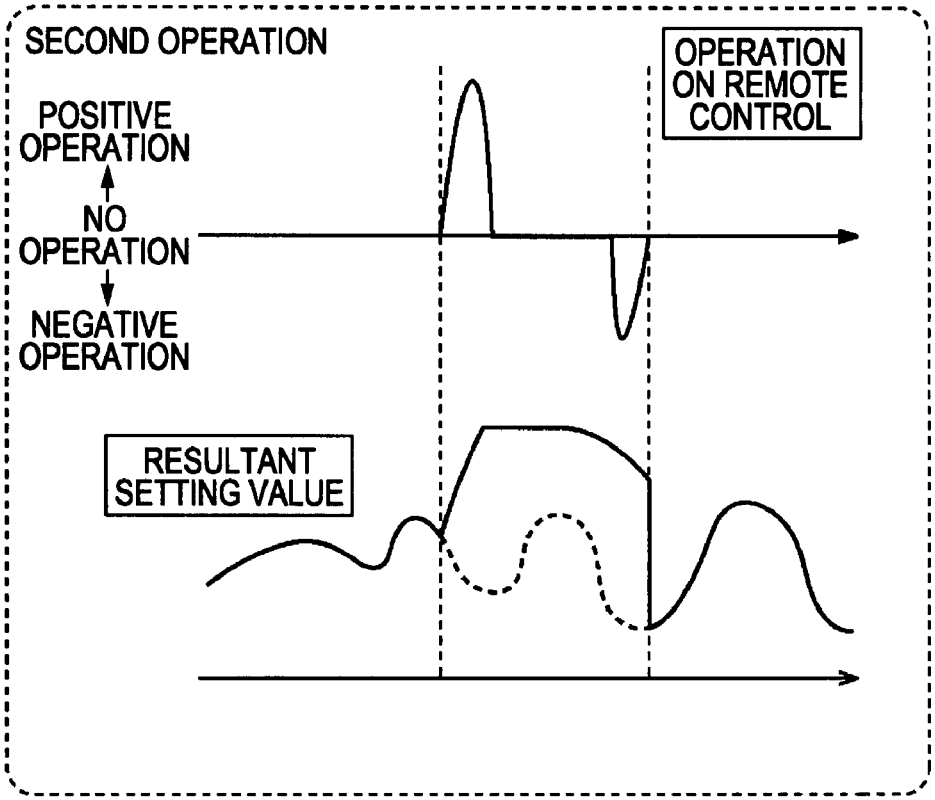
Figure 32A:
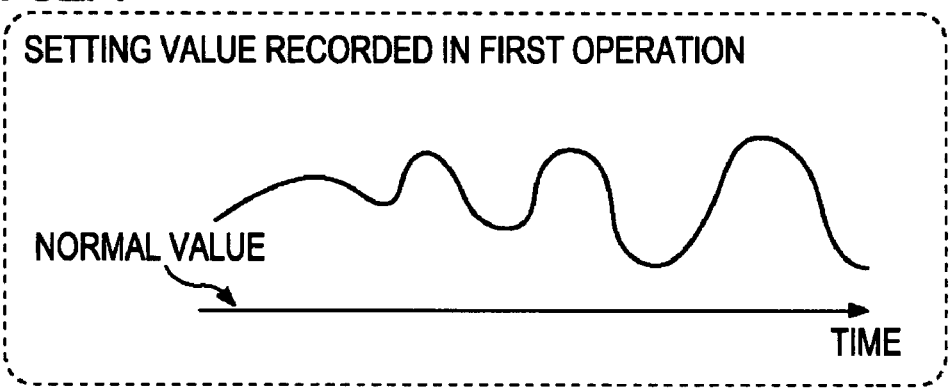
FIG. 32 is a diagram illustrating an addition process according to an embodiment of the present invention.
Figure 32B:
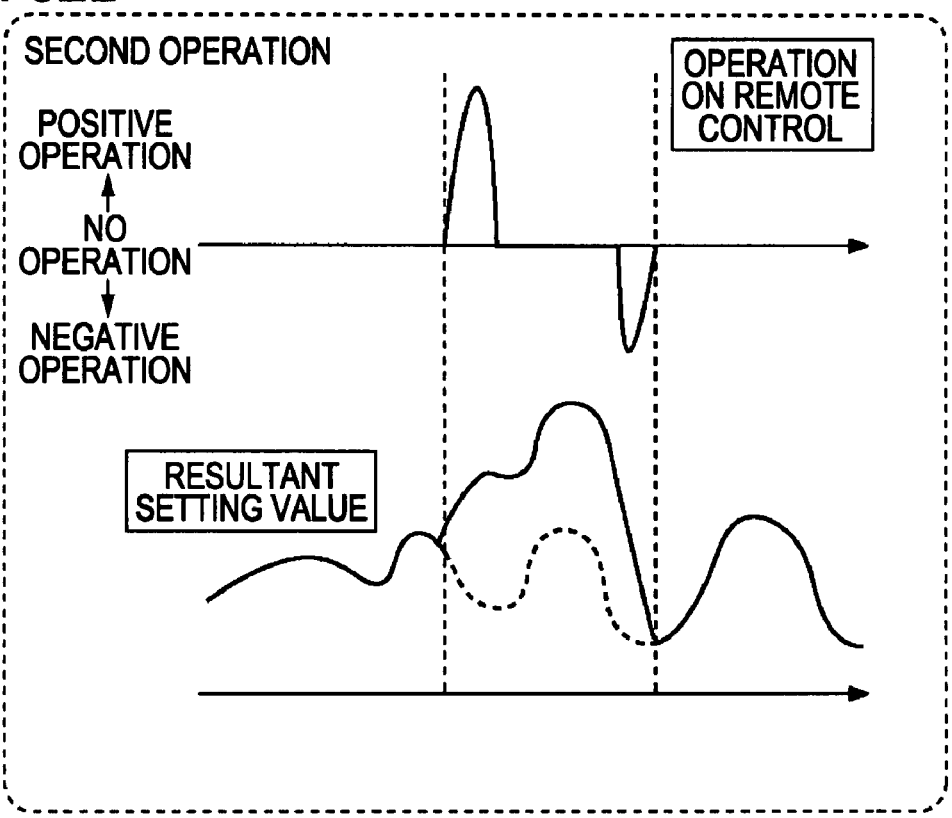

However, when there is a difference in item between one edit operation and another, a problem can occur as described below with reference to FIGS. 31A, 31B, 32A, and 32B. FIGS. 31A and 31B show a problem that can occur in the conventional recording method. FIGS. 32A and 32B show a recording method, which does not produce such a problem, according to an embodiment of the present invention.

FIG. 31A shows an example of a change in a setting-value recorded in accordance with a first-time effect/edit control operation, such as an effect/edit control operation for compensation for camera shake, in accordance with the conventional technique. If an effect/edit control operation such as that shown in the upper part of FIG. 31B is further performed, for example, to zoom the content for which the above-described setting-value has been recorded, then a setting-value corresponding to this effect/edit control operation is overwritten on the setting-value recorded in the first-time effect/edit control operation. That is, a setting-value represented by a broken line in the lower part of FIG. 31B is overwritten on a setting-value represented by a solid line.

As a result of overwriting the setting-value, the original setting-value is lost. That is, the designation made in the first-time effect/edit control operation in terms of the compensation for camera shake is cancelled as a result of performing the second-time effect/edit control operation in terms of zooming.

In the present embodiment, to avoid the above-described problem in the conventional technique, setting-values are set and recorded as shown in FIGS. 32A and 23B. FIG. 32A shows an example of a setting-value recorded in accordance with a first-time effect/edit control operation, such as an effect/edit control operation for compensation for camera shake. FIG. 32B shows a second-time effect/edit control operation and a setting-value recorded in accordance with the effect/edit control operation.

In the upper part of FIG. 32B, as in the upper part of FIG. 31B, there is shown operation information indicating an effect/edit control operation such as a zoom control operation performed by a user in the second-time operation. In the lower part of FIG. 32B, there is shown a setting-value produced as an overall result of the operation by the additive editing function, which will be described in detail below.

As shown in the lower part of FIG. 32B, as a result of the operation by the additive editing function, the sum of the setting-value given in the first-time effect/edit control operation and the setting-value given in the second-time effect/edit control operation is recorded as the resultant setting-value. More specifically, in the lower part of FIG. 32B, the setting-value given in the second-time effect/edit control operation is added to the setting-value given in the first-time effect/edit control operation represented by a broken line, and the resultant value is recorded as the setting-value, as represented by a solid line.

Thus, because the new setting-value is added to the setting-value given in the previous operation, the designation made in the previous operation in terms of the image processing to be performed is maintained without being cancelled.

Figure 33:
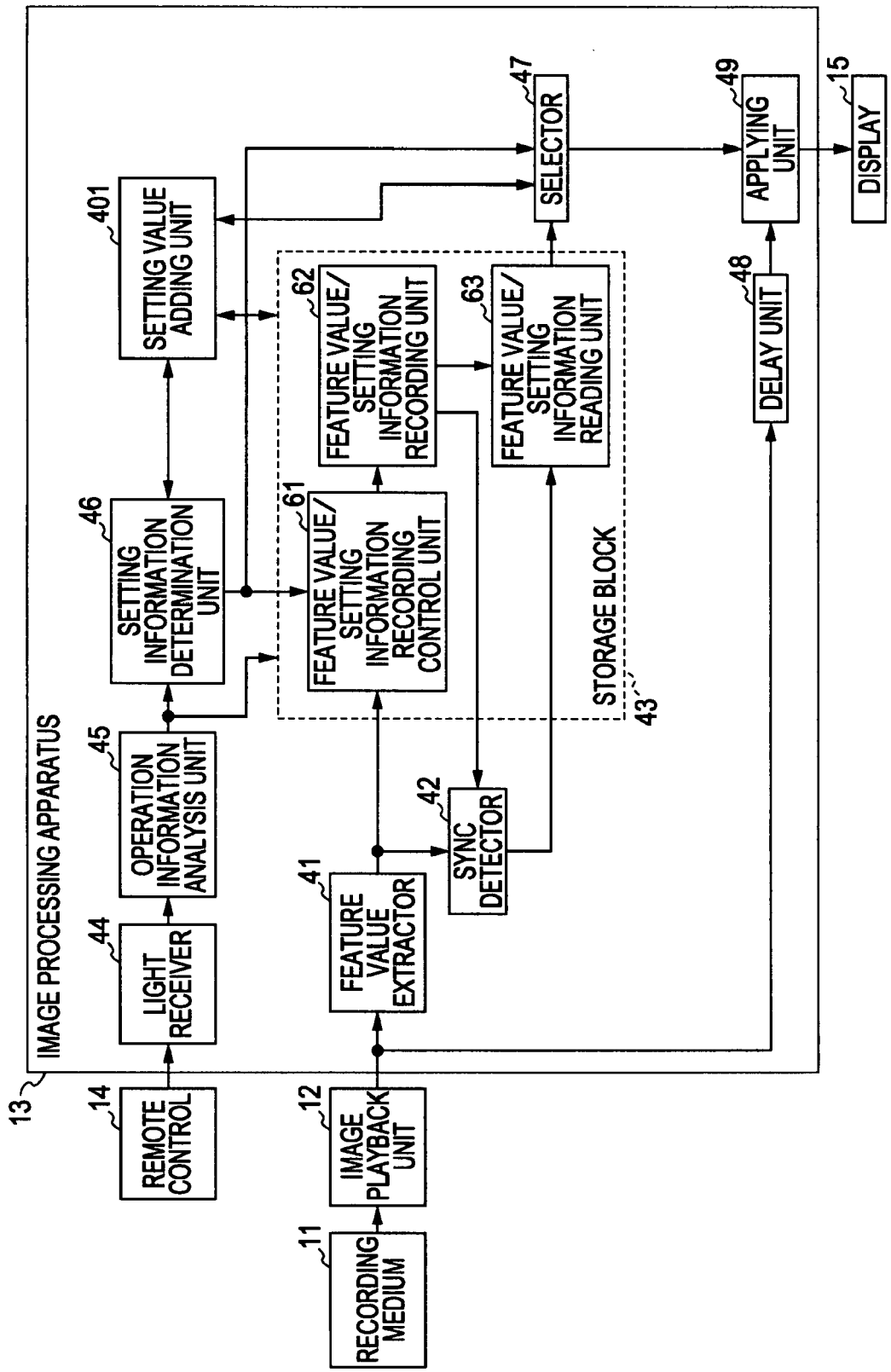
FIG. 33 is a block diagram showing a configuration of an image processing apparatus according to an embodiment of the present invention.

An example of a configuration of an image processing apparatus 13 with the additive editing function is described below. FIG. 33 shows an example of a configuration of an image processing apparatus obtained by modifying the configuration of the image processing apparatus 13 shown in FIG. 5 so as to have the additive editing function, and FIG. 34 shows an example of a configuration of an image processing apparatus obtained by modifying the configuration of the image processing apparatus 13 shown in FIG. 6 so as to have the additive editing function.

In FIG. 33, similar parts to those in FIG. 5 are denoted by similar reference numerals, and a duplicated explanation thereof is omitted herein. The image processing apparatus 13 shown in FIG. 33 is similar to the image processing apparatus 13 shown in FIG. 5 except that it additionally includes a setting-value adder 401 adapted to perform a process associated with the additive editing function.

The setting-value adder 401 produces a setting-value by adding a setting-value to an already existing setting-value. The resultant setting-value produced by the setting-value adder 401 is stored in the feature value/setting-information recording unit 62 and is also supplied to the selector 47.

Figure 34:
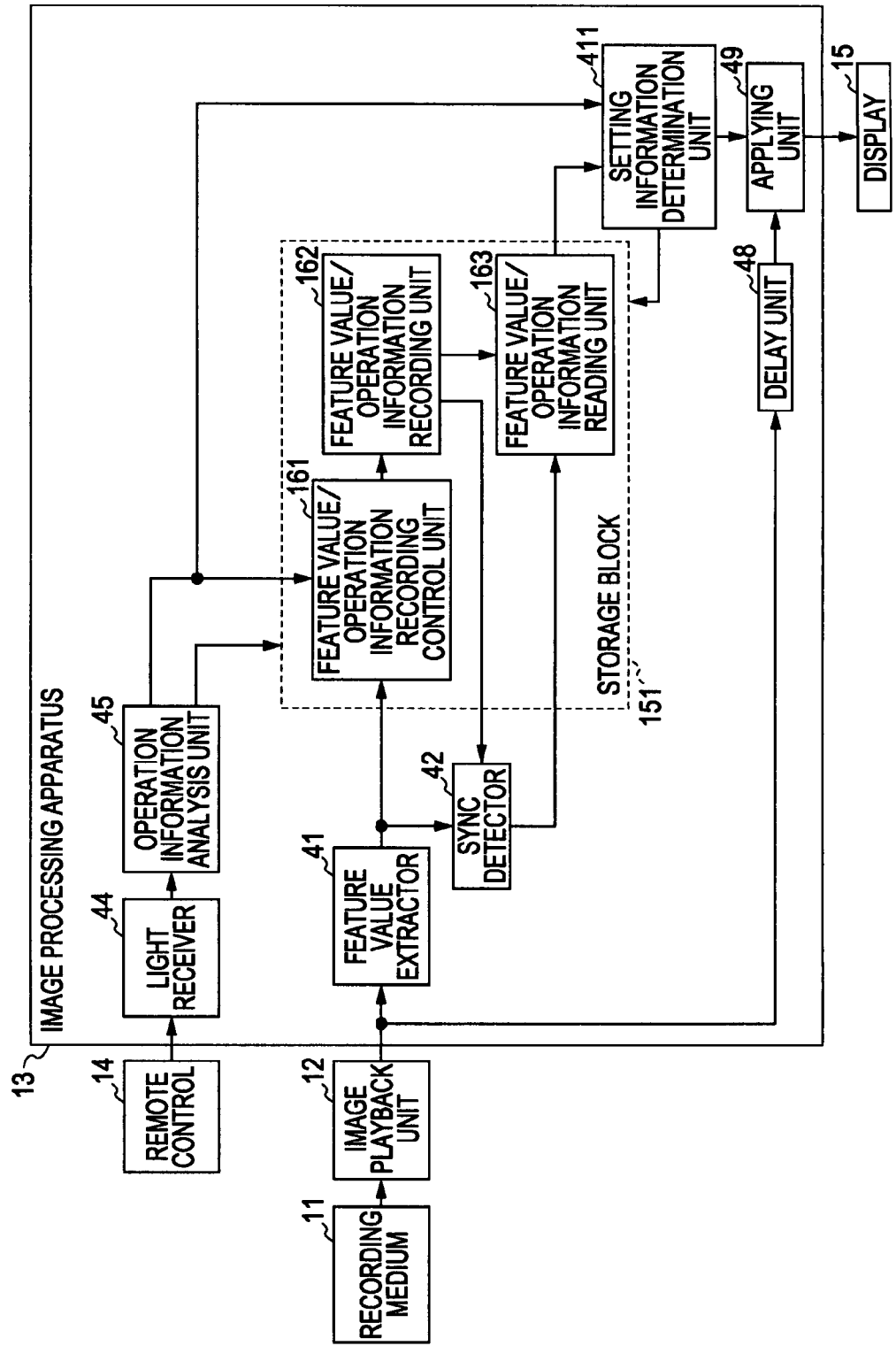
FIG. 34 is a block diagram showing a configuration of an image processing apparatus according to an embodiment of the present invention.

In FIG. 34, similar parts to those in FIG. 6 are denoted by similar reference numerals, and a duplicated explanation thereof is omitted herein. The image processing apparatus 13 shown in FIG. 34 is similar to the image processing apparatus 13 shown in FIG. 6 except that the setting-information determination unit 411 is adapted to also have the additive editing function and the selector 152 is removed.

The setting-information determination unit 411 produces operation information by adding operation information identified by the operation information analysis unit 45 to already existing operation information. The resultant setting-information produced by the setting-information determination unit 411 is stored in the feature value/operation information recording unit 162 and is also supplied to the applying unit 49.

Figure 35:
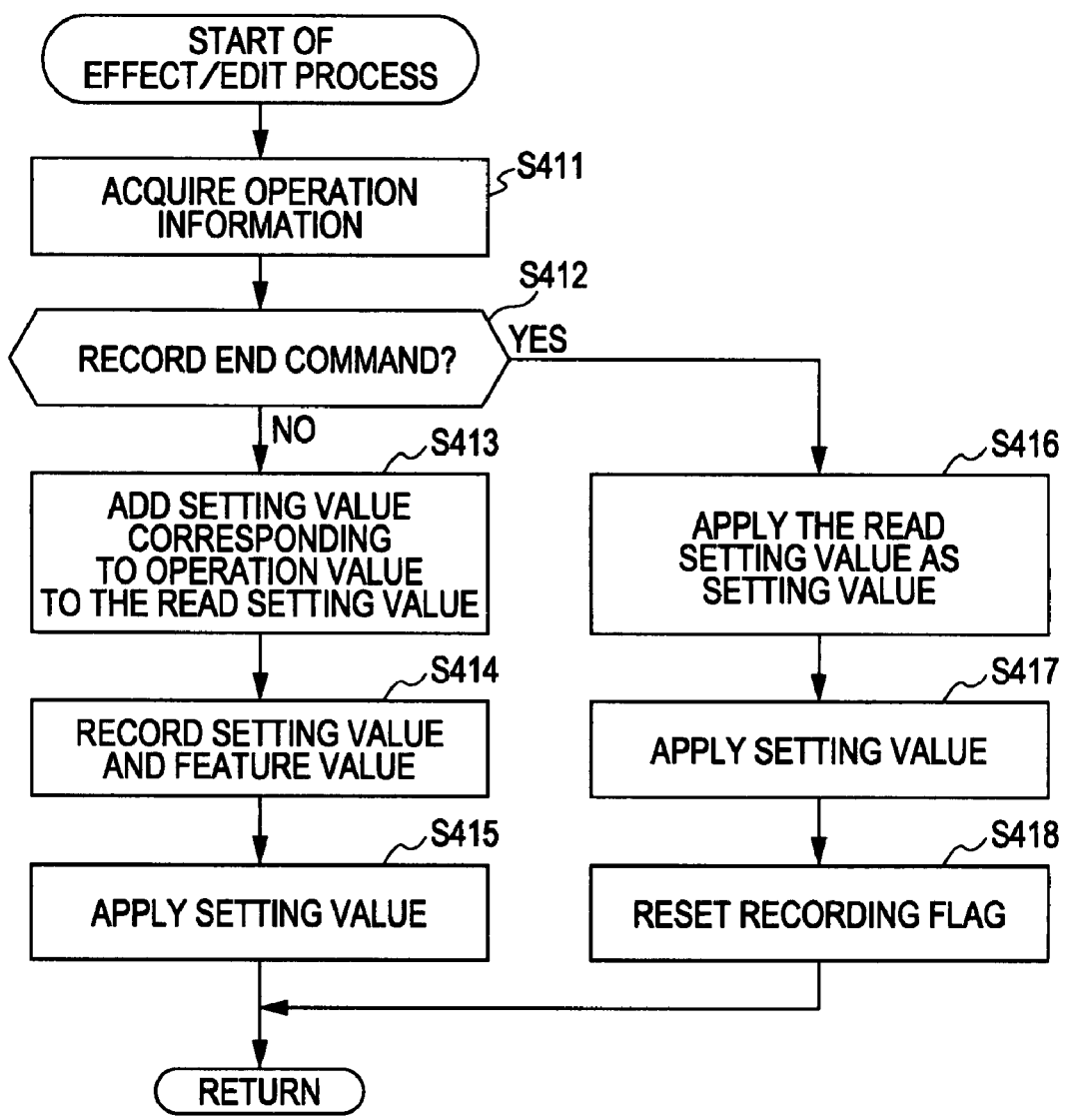
FIG. 35 is a flow chart showing an effect/edit process according to an embodiment of the present invention.

Operations of the image processing apparatus 13 shown in FIGS. 33 and 34 are described in further detail below with reference to a flow chart shown in FIG. 35. The operation of the image processing apparatus 13 shown in FIG. 34 is basically similar to that of the image processing apparatus 13 shown in FIG. 33, and thus the operation is explained below, by way of example, for the image processing apparatus 13 shown in FIG. 13 with reference to flow chart shown in FIG. 35.

Image processing performed by the image processing apparatus 13 shown in FIG. 33 is basically similar to the process described above with reference to the flow chart shown in FIG. 10, and thus the following discussion will be focused on differences.

In the process of the flow chart shown in FIG. 10, step S16 is performed differently as described below with reference to FIG. 35. In step S411, the operation information analysis unit 45 analyzes the signal supplied from the light receiver 44 to identify operation information and supplies the identified operation information to the setting-information determination unit 46. In step S412, it is determined whether the operation information acquired in step S411 is of a record end command.

In a case where it is determined in step S412 that the acquired operation information is not of the record end command, the process proceeds to step S413. However, if it is determined in step S412 that the acquired operation information is of the record end command, the process proceeds to step S416.

In step S413, a setting-value corresponding to an effect/edit control operation is added to an already existing setting-value. More specifically, the feature value/setting-information reading unit 63 reads a setting-value from the feature value/setting-information recording unit 62 and supplies it to the setting-value adder 401. The setting-information determination unit 46 produces a setting-value according to the operation information supplied from the operation information analysis unit 45 and supplies it to the setting-value adder 401.

As a result of the above-described process, the setting-value read from the feature value/setting-information recording unit 62 and the new setting-value corresponding to the effect/edit control operation are supplied to the setting-value adder 401. The setting-value adder 401 produces a new setting-value by adding the two supplied setting-values. In step S414, the produced setting-value is stored together with synchronization information in the feature value/setting-information recording unit 62.

The setting-value output from the setting-value adder 401 is also supplied to the selector 47 and further to the applying unit 49 via the selector 47. In step S415, the applying unit 49 processes the image in accordance with the supplied setting-value.

On the other hand, in a case where it is determined in step S412 that the command issued by the user is a record end command, the process proceeds to step S416. In step S416, an existing setting-value is employed as the setting-value for the image. More specifically, a setting-value is read from the feature value/setting-information recording unit 62 and is employed as the setting-value according to which to process the current frame. In step S417, the image is processed according to the determined setting-value.

In step S418, the recording flag is reset. In response, the recording of the setting-value is ended.

The above-described process is basically similar to the effect/edit process according to an effect/edit control operation described above with reference to the flow chart shown in FIG. 14 except that a setting-value is produced in step S413 by adding a new setting-value to an existing setting-value whereby a new effect can be applied to an image without losing an effect specified by the existing setting-value.

Designation of Recording Range Before Recording

In an embodiment described below, a range in which to record a setting-value for a content is defined in advance, and the setting-value is recorded in the defined range in accordance with an effect/edit control operation performed. Alliteratively, after a setting-value is recorded in accordance with an effect/edit control operation, a recording range may be specified and the setting-value may be applied only in the specified recording range. First, referring to FIGS. 36A to 36C, a process of setting a recording range and a process of recording a setting-value in the specified recording range are described.

Figure 36A:
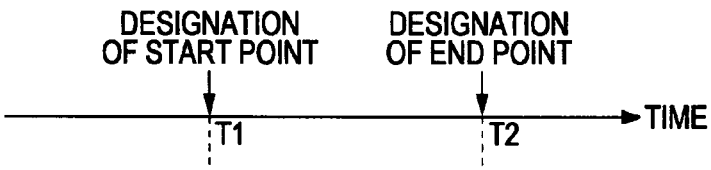
FIG. 36 is a diagram illustrating designation of a recording range according to an embodiment of the present invention.

In the example shown in FIG. 36A, a first-time effect/edit control operation is performed such that a start point T1 at which to start recording is specified, and an end point T2 at which to end recording is specified.

Figure 36B:
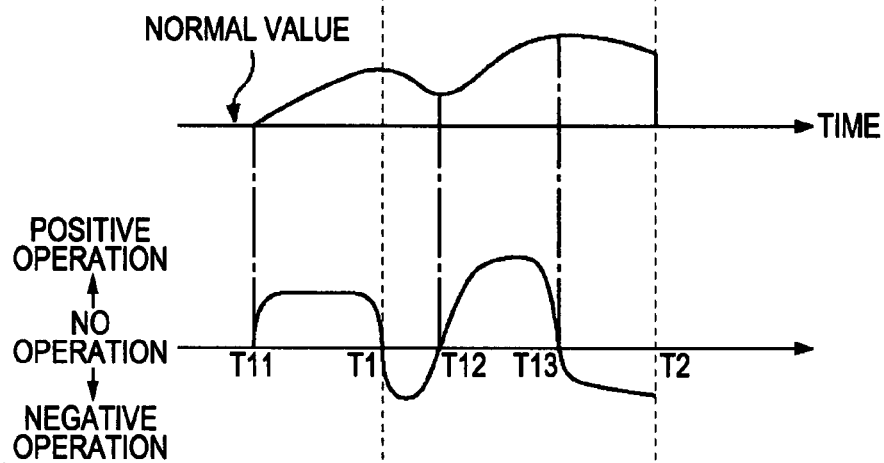

After that, if a second-time effect/edit control operation is performed as shown in the lower part of FIG. 36B, a setting-value is recorded as shown in the upper part of FIG. 36B. More specifically, in the present example, a positive operation is performed in a period from T11 to T1 (start point), a negative operation is performed in a period from T1 to T12, a positive operation is performed in a period from T12 to T13, and a negative operation is performed in a period from T13 to T2 (end point). As a result, the setting-value is recorded as shown in the upper part of FIG. 36B. Note that the setting-value is stored temporarily at this stage, and a final setting-value will be determined later as described below.

Figure 36C:
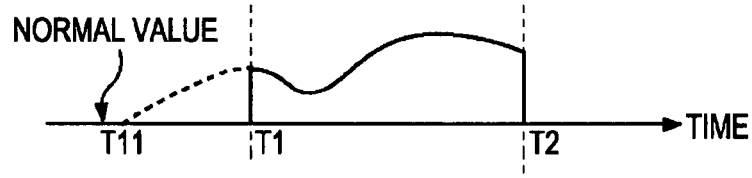

FIG. 36C shows the finally recorded setting-value. That is, the setting-value in the period from T11 to the start point T1 is not recorded, and only the setting-value in the period from the start point T1 to the end point T2 is recorded.

In the example described above with reference to FIGS. 36A to 36C, the recording range is specified before the effect/edit control operation is performed. Alternatively, the recording range may be specified after the effect/edit control operation is performed. In this case, the effect/edit control operation shown in FIG. 36B is performed first, and then the operation shown in FIG. 36A is performed.

Recording of only a setting-value in a particular specified range provides the following advantage. In the conventional recording method, as described above with reference to FIG. 1 or 2, recording is started when an effect/edit control operation is started. Thus, in the conventional recording method, the setting-value at the start of recording is set to a normal value, and the setting-value is continuously changed to a specified value, for any effect/edit control operation. In contrast, in the present embodiment of the invention, as shown in FIG. 36C, the setting-value at the specified record start point can be set to an arbitrary value which can be different from the normal value, and the setting-value can be continuously changed from this value.

In the conventional recording method, when recording of the setting-value is ended, a user has to operate an end button or the like when the recording is being performed. However, in this method, it is difficult for the user to operate the end button at a precisely right time at which the recording should be ended. In the present embodiment of the invention, unlike the conventional recording method, because the end point can be specified separately from the recording operation, it is easy for a user to exactly set the end point to a desired point.

An example of an image processing apparatus 13 configured to have the capability of setting the recording range is described below. First, an example of an image processing apparatus 13 is described which is configured to set the recording range before the effect/edit control operation is performed.

FIG. 37 shows an example of an image processing apparatus configured to have the recording range designation function by modifying the configuration of the image processing apparatus 13 shown in FIG. 5. FIG. 38 shows an example of an image processing apparatus configured to have the recording range designation function by modifying the configuration of the image processing apparatus 13 shown in FIG. 6.

In FIG. 37, similar parts to those in FIG. 5 are denoted by similar reference numerals, and a duplicated explanation thereof is omitted herein. The image processing apparatus 13 shown in FIG. 37 is similar to the image processing apparatus 13 shown in FIG. 5 except that it additionally includes a range designation unit 501, a range recording unit 502, and a trigger unit 503 whereby a process associated with the recording range designation function is performed.

The range designation unit 501 specifies a start point at which to start recording of a setting-value and an end point at which to end the recording of the setting-value in accordance with operation information supplied from the operation information analysis unit 45, that is, in accordance with a command issued by a user.

The range recording unit 502 reads synchronization feature values at the start and end points specified by the range designation unit 501, from the feature value/setting-information recording unit 62 of the storage block 43, and the range recording unit 502 stores the read synchronization feature values. The trigger unit 503 detects the start point and the end point by comparing the synchronization feature values stored in the feature value/setting-information recording unit 62 with the synchronization feature value stored in the range recording unit 502, and the trigger unit 503 commands the storage block 43 to start and end the recording of the synchronization feature value or setting-information at the detected start and end points, respectively.

In FIG. 38, similar parts to those in FIG. 6 are denoted by similar reference numerals, and a duplicated explanation thereof is omitted herein. The image processing apparatus 13 shown in FIG. 38 is similar to the image processing apparatus 13 shown in FIG. 6 except that it additionally includes a range designation unit 511, a range recording unit 512, and a trigger unit 513 whereby a process associated with the recording range designation function is performed.

In the configuration of the image processing apparatus 13 shown in FIG. 38, the operation information output from the operation information analysis unit 45 is directly input to the range designation unit 511. The range designation unit 511 analyzes the input operation information and sets the start point at which to start recording a setting-value and the end point at which to end the recording of the setting-value in accordance with the analysis result.

The range recording unit 512 reads synchronization feature values at the start and end points specified by the range designation unit 511, from the feature value/setting-information recording unit 162 of the storage block 151, and the range recording unit 512 stores the read synchronization feature values. The trigger unit 513 detects the start point and the end point by comparing the synchronization feature values stored in the feature value/setting-information recording unit 162 with the synchronization feature value stored in the range recording unit 512, and the trigger unit 513 commands the storage block 151 to start and end the recording of the synchronization feature value or setting-information at the detected start and end points, respectively.

Operations of the image processing apparatus 13 shown in FIGS. 37 and 38 are described in further detail below with reference to flow charts shown in FIGS. 39 to 42. The operation of the image processing apparatus 13 shown in FIG. 38 is basically similar to that of the image processing apparatus 13 shown in FIG. 37, and thus the operation is explained below, by way of example, for the image processing apparatus 13 shown in FIG. 37 with reference to flow charts shown in FIGS. 39 to 42.

Figure 39:
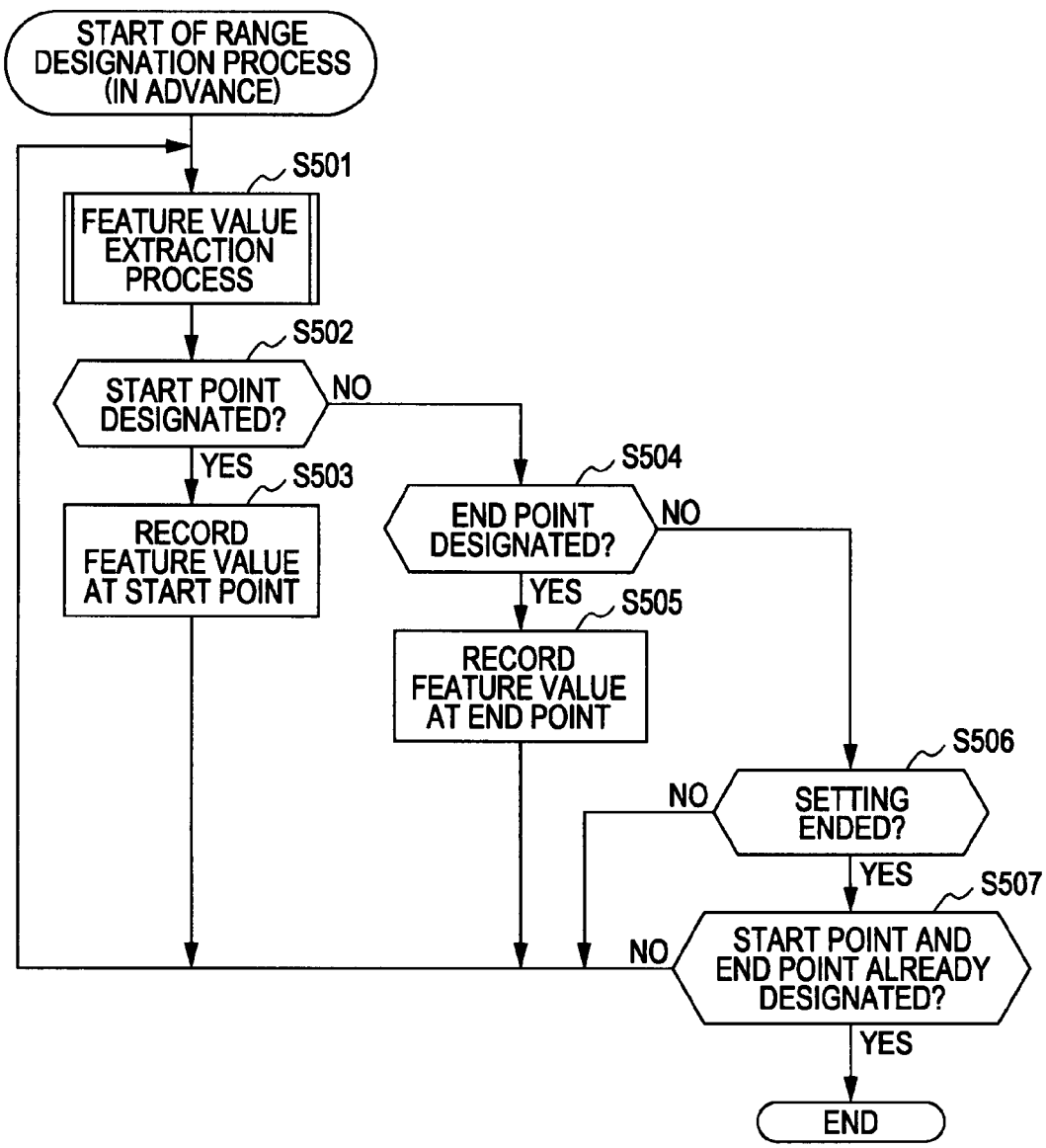
FIG. 39 is a flow chart showing a process of specifying a recording range according to an embodiment of the present invention.

First, with reference to a flow chart shown in FIG. 39, a process of specifying the range in which to record the setting-value is described below.

In step S501, the feature value extraction process is performed. The feature value extraction process in step S501 is performed in a similar manner as described above with reference to the flow chart shown in FIG. 11, and thus a duplicated explanation thereof is omitted herein.

In step S502, it is determined whether the start point has been specified. More specifically, the range designation unit 501 analyzes the operation information identified by the operation information analysis unit 45 to determine whether the operation performed by a user was an operation to specify the start point. Note that, of frames of a moving image, the start point is set at a particular frame (or a field) specified by the user. Thus, in this step S502, a determination is made as whether a frame at which to start recording of the setting-value has been specified.

In a case where it is determined in step S502 that the start point has been specified, the process proceeds to step S503 in which a feature value at the start point is recorded. More specifically, if the range designation unit 501 determines that the start point has been specified, the range designation unit 501 extracts the feature value (synchronization feature value) of the frame at the start point (that is, the feature value extracted in step S501), and records the extracted feature value in the range recording unit 502. If the recording of the feature value at the start point in the range recording unit 502 is completed, the process returns to step S501 to repeat the above-described process for a next frame.

On the other and, in a case where it is determined in step S502 that the start point has not been specified, the process proceeds to step S504, in which it is determined whether the end point has been specified. More specifically, the range designation unit 501 analyzes the operation information identified by the operation information analysis unit 45 to determine whether the operation performed by the user was an operation to specify the end point. As with the start point, the end point is also specified by specifying a particular frame or field.

In a case where it is determined in step S504 that the end point has been specified, the process proceeds to step S505, in which a feature value at the end point is recorded. More specifically, if the range designation unit 501 determines that the end point has been specified, the range designation unit 501 records a feature value (a synchronization feature value) extracted from an a frame at this point of time (that is, a feature value extracted in step S501) in the range recording unit 502. If the recording of the feature value at the end point in the range recording unit 502 is completed, the process returns to step S501 to repeat the above-described process for a next frame.

On the other and, in a case where it is determined in step S504 that the end point has not been specified, the process proceeds to step S506. In step S506, it is determined whether setting of the range has been ended. If it is determined in step S506 that setting of the range has not been ended, the process returns to step S501 to repeat the above-described process for a next frame.

The determination in step S506 as to whether setting of the range has been ended may be made by checking whether a command to end setting has been issued by a user, or setting of the range may be determined to be ended when the end point is specified. In a case where a last frame of a content has been reached in the above process, the end point may be set at this last frame and it may be determined that setting of the range has been ended.

On the other hand, in the case where it is determined in step S506 that setting of the range has been ended, the process proceeds to step S507. In step S507, it is determined whether the start point and the end point have been specified. This determination is made based on whether the feature values of the start point and the end point are recorded in the range recording unit 502.

If it is determined in step S507 that the start point and the end point have not been specified, the process returns to step S501 to repeat the above-described process for a next frame. Note that because this step S507 is performed after it was determined in step S506 that the setting of the range was ended, the start point and the end point have already been specified in most cases. However, there is a possibility that a user determines by mistake that setting of the range is complete when actually the end point has not been specified. In such a case, a message such as "No end point is specified" or the like may be displayed to warn a user that setting of the range is not completed.

After the range in which setting-information is to be recorded has been set in the above-described manner, the setting-value is recorded in the specified range as described below with reference to a flow chart shown in FIG. 40.

In step S521, the feature value extraction process is performed. The feature value extraction process in step S521 is performed in a similar manner as described above with reference to the flow chart shown in FIG. 11, and thus a duplicated explanation thereof is omitted herein.

In step S522, a triggering process is performed. The details of the triggering process in step S522 are described below with reference to a flow chart shown in FIG. 41. Note that the triggering process is performed by a trigger unit 503.

In step S541, the trigger unit 503 determines whether the current frame is of the start point. More specifically, the trigger unit 503 compares the feature value of the current frame with the feature value of the start point recorded in the range recording unit 502. If they are identical to each other, it is determined that the current frame is of the start point. If it is determined in step S541 that the current frame is at the start point, the process proceeds to step S542. In step S542, the recording flag is set into the on-state in order to start recording of the setting-value. In a period in which the recording flag is in the on-state, the feature value and the setting-value are recorded (stored) in the feature value/setting-information recording unit 62. After the recording flag is set, the triggering process is ended, and the process proceeds to step S523 (FIG. 40).

On the other hand, in a case where it is determined in step S543 that the current frame is not at the start point, the process proceeds to step S543. In step S543, it is determined whether the current frame is at the end point. The determination in step S543 as to the end point is also made in a similar manner to the start point. If it is determined in step S543 that the current frame is at the end point, the process proceeds to step S544. In step S544, the recording flag is reset into the off-state in order to end the recording of the setting-value. In response to resetting of the recording flag, the recording (storing) of the setting-value in the feature value/setting-information recording unit 62 is ended. After the recording flag is reset, the triggering process is ended, and the process proceeds to step S523 (FIG. 40).

Figure 40:
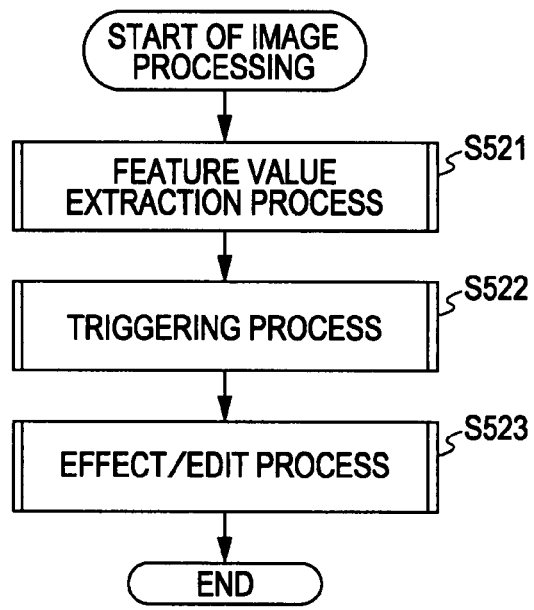
FIG. 40 is a flow chart showing image processing according to an embodiment of the present invention.
Figure 41:
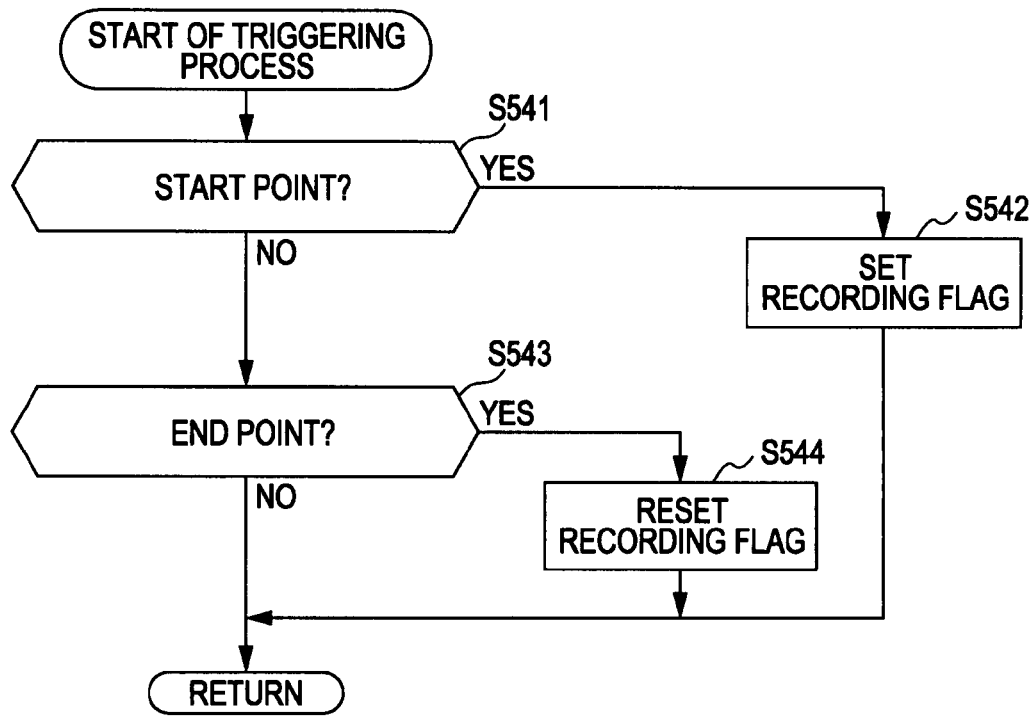
FIG. 41 is a flow chart showing a triggering process according to an embodiment of the present invention.
Figure 42:
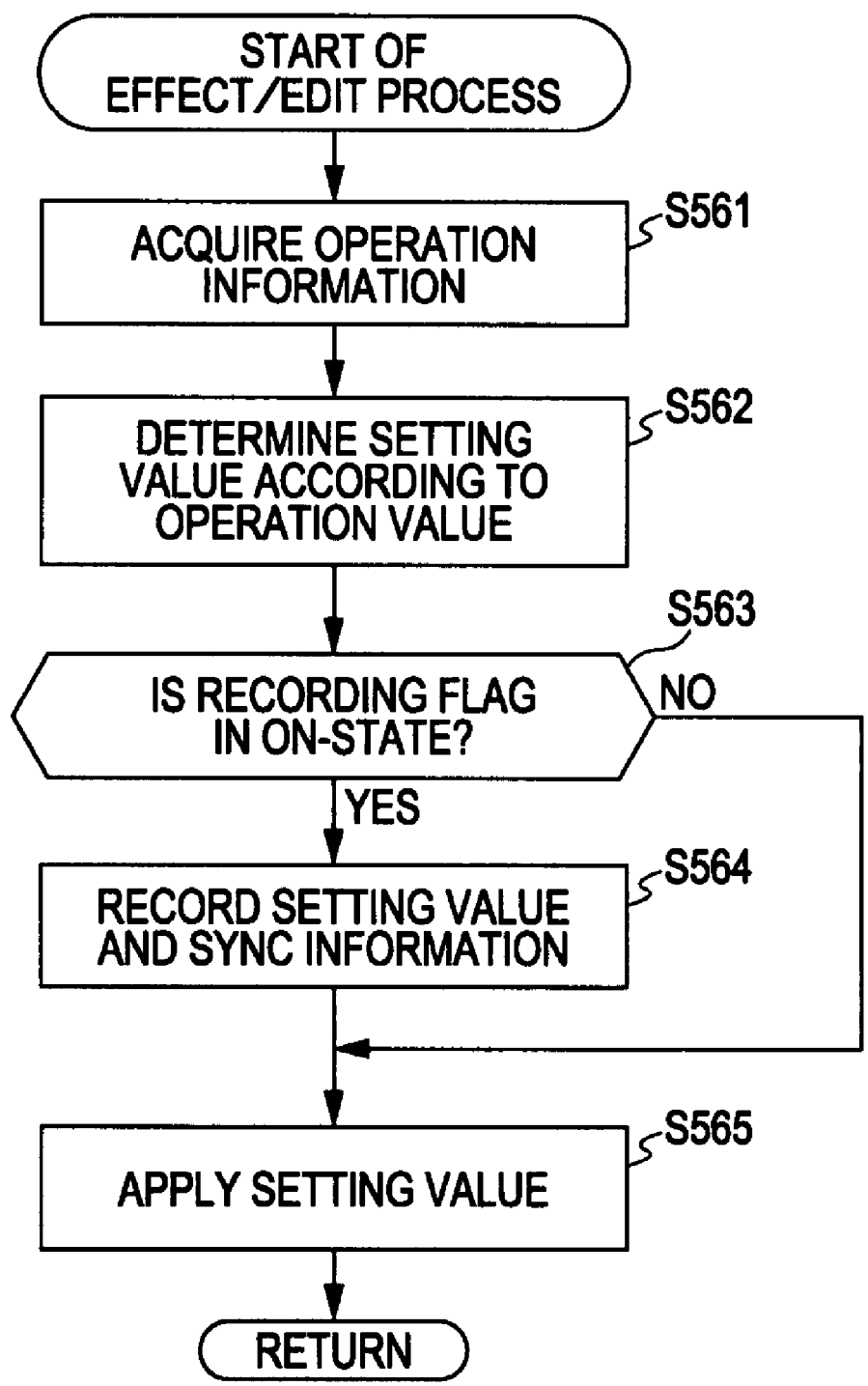
FIG. 42 is a flow chart showing an effect/edit process according to an embodiment of the present invention.

On the other and, in a case where it is determined in step S543 that the current frame is not at the end point, the triggering process is ended, and the process proceeds to step S523 (FIG. 40).

As described above, the trigger unit 503 commands the storage block 43 to start recording the setting-value from the frame at the specified start point and end the recording at the frame at the specified end point.

Referring back to the flow chart shown in FIG. 40, in step S523, the effect/edit process is performed. The details of the process associated with synchronization in step S523 are described below with reference to a flow chart shown in FIG. 42.

In step S561, operation information is acquired. In step S562, the setting-value is determined according to the acquired operation information. In step S563, it is determined whether the recording flag is in the on-state. If the recording flag is in the on-state, the setting-value is recorded. More specifically, if it is determined in step S563 that the recording flag is in the on-state, the process proceeds to step S564, and the setting-value and the synchronization information are stored in the feature value/setting-information recording unit 62.

After the setting-value and the synchronization information are stored in the feature value/setting-information recording unit 62, the setting-value is applied to the image in step S565.

In a case where it is determined in step S563 that the recording flag is in the off-state, step S564 is skipped and the process proceeds to step S565. In step S565, the setting-value is applied. When the process proceeds to step S565 from step S563, recording of the setting-value is not performed, but applying of the setting-value to the image is performed.

In the present embodiment, the setting-value and other related data are recorded in the period from the start point to the end point specified in advance, in the above-described manner.

In the above-described embodiment, the recording range is set before the setting-value is recorded. In an alternative embodiment, as described below, the recording range may be set after the setting-value is recorded.

Designation of Recording Range After Recording Operation

Figure 43:
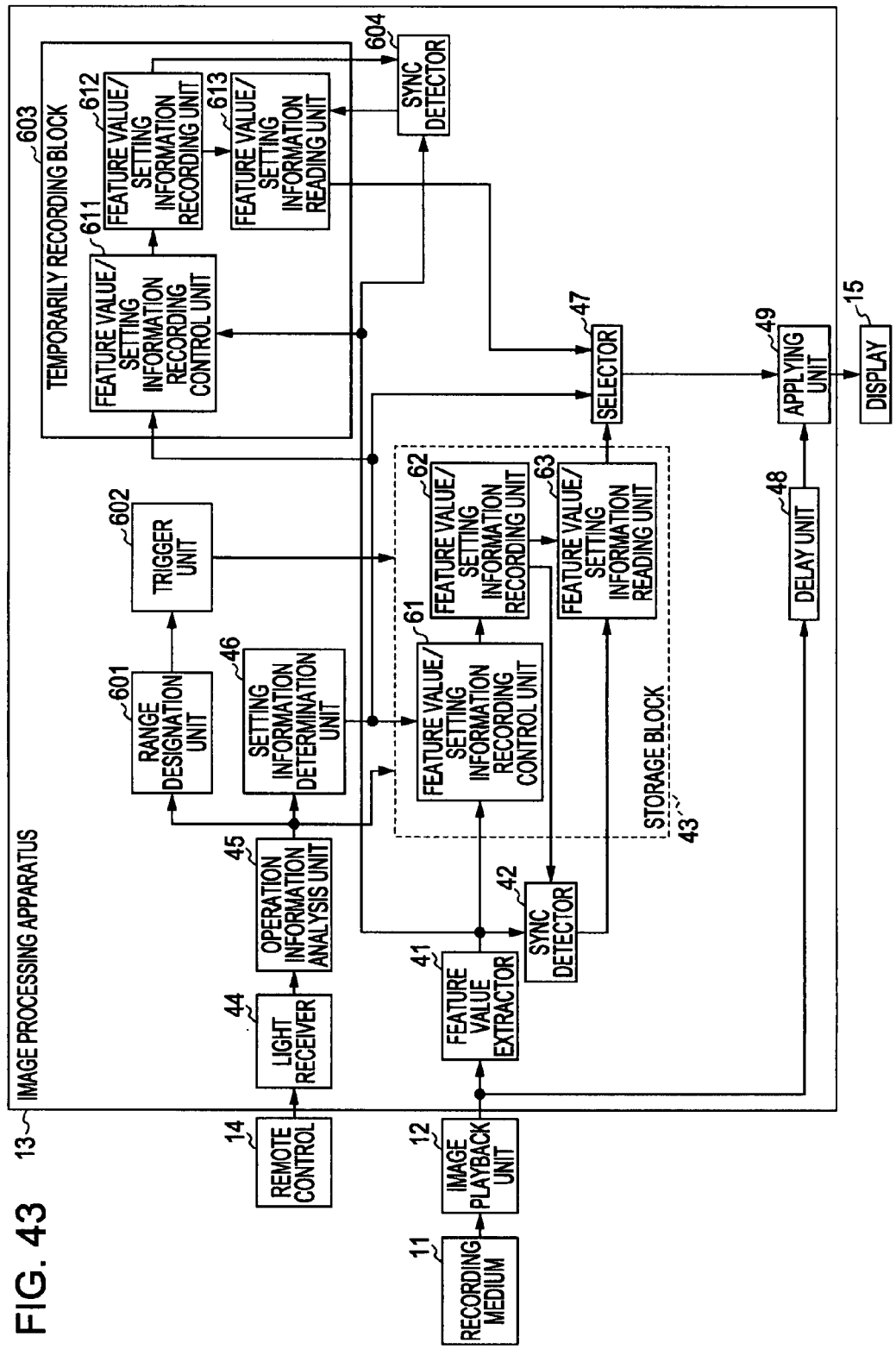
FIG. 43 is a block diagram showing a configuration of an image processing apparatus according to an embodiment of the present invention.
Figure 44:
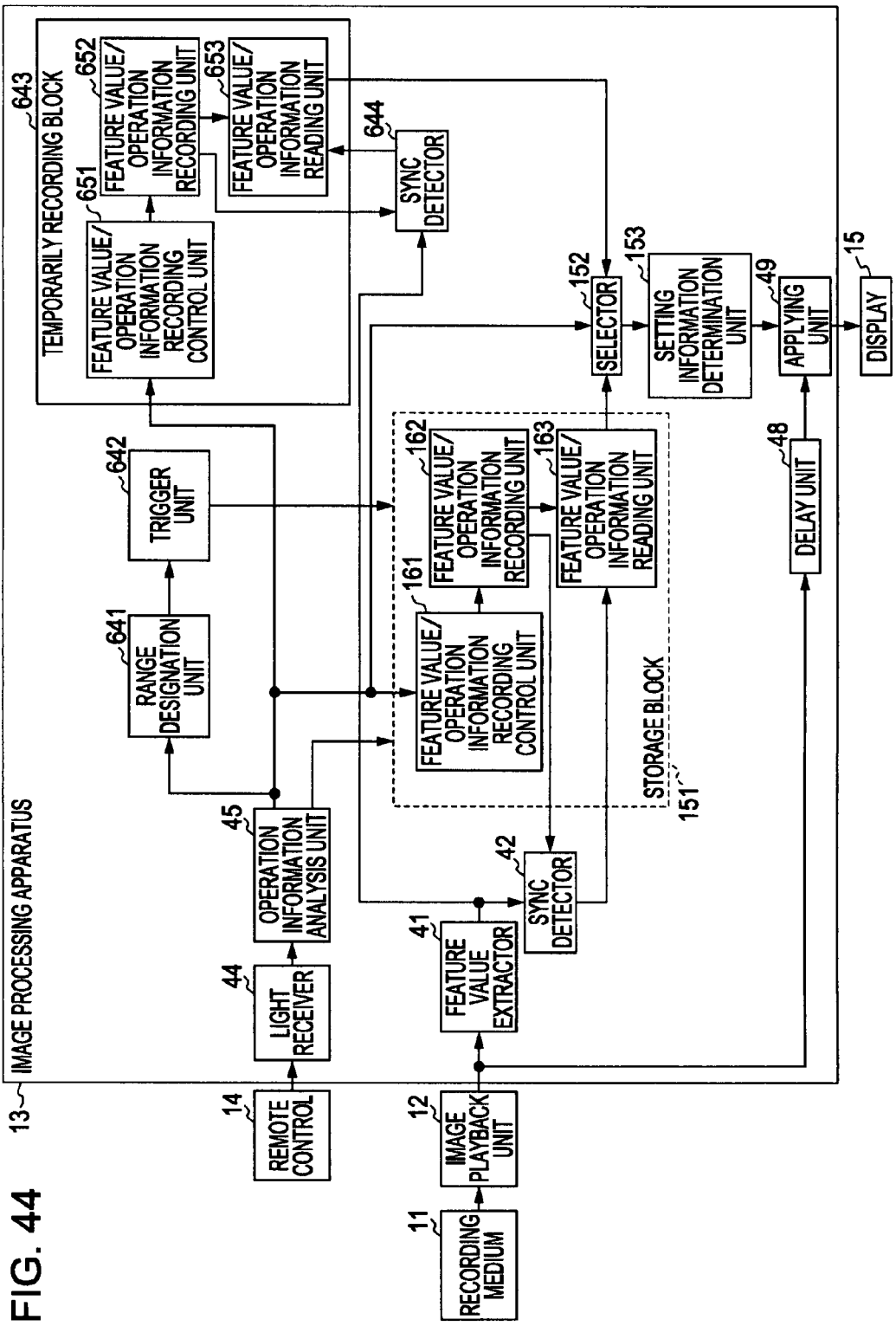
FIG. 44 is a block diagram showing a configuration of an image processing apparatus according to an embodiment of the present invention.

FIG. 43 shows an example of an image processing apparatus configured to have the recording range designation function by modifying the configuration of the image processing apparatus 13 shown in FIG. 5. FIG. 44 shows an example of an image processing apparatus configured to have the recording range designation function by modifying the configuration of the image processing apparatus 13 shown in FIG. 6.

In FIG. 43, similar parts to those in FIG. 5 are denoted by similar reference numerals, and a duplicated explanation thereof is omitted herein. The image processing apparatus 13 shown in FIG. 43 is similar to the image processing apparatus 13 shown in FIG. 5 except that it additionally includes a range designation unit 601, a trigger unit 602, a temporarily storing block 603, and a synchronization detector 604, whereby a process associated with the recording range designation function is performed.

The temporarily storing block 603 includes a feature value/setting-information recording control unit 611, a feature value/setting-information recording unit 612, and a feature value/setting-information reading unit 613. That is, the temporarily storing block 603 is configured in a similar manner to the storage block 43. However, in the present embodiment, the recording range is specified after the setting-value (synchronization information) is recorded. In order to allow processing steps to be performed in the above order, it is necessary to temporarily record setting-information before the final recording. For the above purpose, the temporarily storing block 603 temporarily records setting-information.

The range designation unit 601 specifies (sets) the start point at which to start recording the setting-value and the end point at which to end the recording of the setting-value in accordance with operation information supplied from the operation information analysis unit 45, that is, in accordance with a command issued by a user. The trigger unit 602 commands the storage block 43 to start and end the recording of the synchronization feature value at the start and end points, respectively, specified by the range designation unit 601.

The parts of the temporarily storing block 603 are similar to those of the storage block 43, but recording of the setting-value and the synchronization information is performed before the recording range is specified. The synchronization detector 604 detects synchronization in a similar manner to the synchronization detector 42 and supplies information associated with the detected synchronization to the feature value/setting-information reading unit 613. In the above process, setting-information necessary to detect synchronization is supplied from the feature value/setting-information recording unit 612 to the synchronization detector 604.

In FIG. 44, similar parts to those in FIG. 6 are denoted by similar reference numerals, and a duplicated explanation thereof is omitted herein. The image processing apparatus 13 shown in FIG. 44 is similar to the image processing apparatus 13 shown in FIG. 6 except that it additionally includes a range designation unit 641, a trigger unit 642, a temporarily storing block 643, and a synchronization detector 644, whereby a process associated with the recording range designation function is performed.

The temporarily storing block 643 includes a feature value/operation information recording control unit 651, a feature value/operation information recording unit 652, and a feature value/operation information reading unit 653. That is, the temporarily storing block 643 is similar in configuration to the storage block 151. In the present configuration, the recording range is specified after the operation information is recorded in accordance with an effect/edit control operation, and thus it is necessary to temporarily record setting-information before the final recording. For the above purpose, the temporarily storing block 643 temporarily records setting-information.

The range designation unit 641 specifies (sets) the start point at which to start recording the operation information and the end point at which to end the recording of the operation information in accordance with operation information supplied from the operation information analysis unit 45, that is, in accordance with a command issued by a user. The trigger unit 642 commands the storage block 151 to start and end the recording of the synchronization operation information at the start and end points, respectively, specified by the range designation unit 641.

The parts of the temporarily storing block 643 are similar to those of the storage block 151, but recording of the operation information is performed before the recording range is specified. The synchronization detector 644 detects synchronization in a similar manner to the synchronization detector 42 and supplies information associated with the detected synchronization to the feature value/operation information reading unit 653. In the above process, operation information necessary to detect synchronization is supplied from the feature value/operation information recording unit 652 to the synchronization detector 644.

Figure 45:
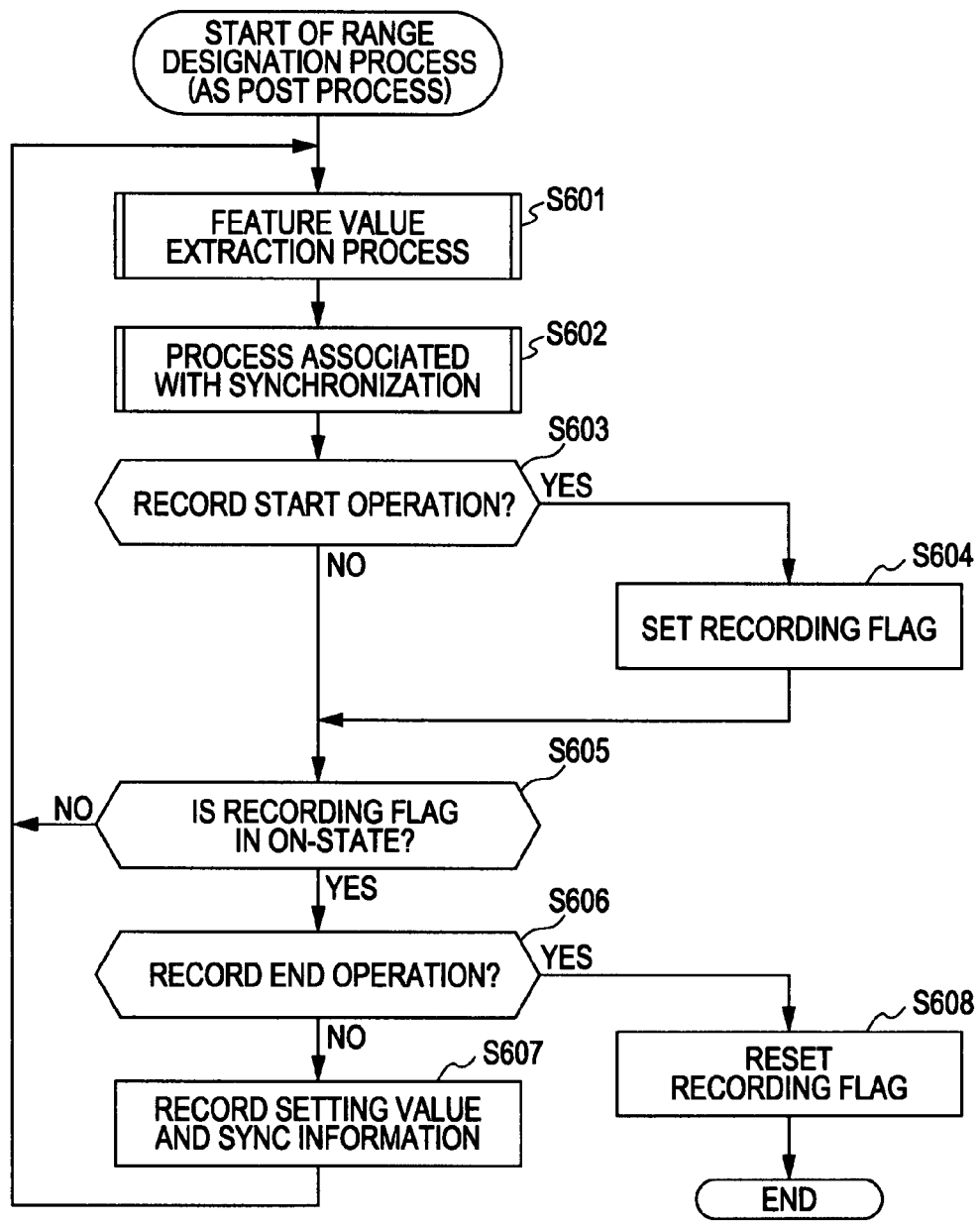
FIG. 45 is a flow chart showing a process of specifying a recording range according to an embodiment of the present invention.

Operations of the image processing apparatus 13 shown in FIGS. 43 and 44 are described in further detail below with reference to a flow chart shown in FIG. 45. The operation of the image processing apparatus 13 shown in FIG. 44 is basically similar to that of the image processing apparatus 13 shown in FIG. 43, and thus the operation is explained below, by way of example, for the image processing apparatus 13 shown in FIG. 43 with reference to flow chart shown in FIG. 45.

First, with reference to a flow chart shown in FIG. 45, a process of specifying the range in which to record the setting-information (setting-value) is described below. In this process, at a point of time before the recording range is set, editing by a user is completed, and setting-information is recorded in the temporarily storing block 603. The recording of setting-information can be performed in a similar manner to the manner according to the above-described embodiment. More specifically, for example, the recording of setting-information can be performed in a similar manner as described above with reference to the flow chart shown in FIG. 10. Thus, a duplicated explanation of the process of recording setting-information is omitted herein, and a process of specifying the recording range performed after setting-information is recorded is described below with reference to a flow chart shown in FIG. 45.

In step S601, the feature value extraction process is performed. More specifically, in order to specify the recording range, a user again plays back the content for which setting-information has been temporarily recorded. The feature value of each frame of the content being played back is extracted by the feature value extractor 41 and supplied to the synchronization detector 604. The feature value extraction process in step S601 is performed in a similar manner as described above with reference to the flow chart shown in FIG. 11, and thus a duplicated explanation thereof is omitted herein.

In step S602, the synchronization detector 604 performs a process associated with synchronization is performed. The process associated with synchronization in step S602 is performed in a similar manner as described above with reference to the flow chart shown in FIG. 12, and thus a duplicated explanation thereof is omitted herein. Note that detection of synchronization is performed by the synchronization detector 604 by comparing the feature value supplied from the feature value extractor 41 and the feature value stored in the feature value/setting-information recording unit 612.

In step S603, it is determined whether a user has performed an operation to start recording. More specifically, the range designation unit 601 analyzes operation information supplied from the operation information analysis unit 45 to determine whether the operation performed by the user was an operation to issue a record start command. If it is determined in step S603 that the record start command has been performed, the process proceeds to step S604, in which the recording flag is set into the on-state.

In a period in which the recording flag is in the on-state, as described later, setting-value stored in the feature value/setting-information recording unit 612 is supplied to the storage block 43 and stored in the feature value/setting-information recording unit 62. That is, in response to the effect/edit control operation, setting-information stored in the temporarily storing block 603 is copied into the storage block 43.

If the recording flag is set in step S604 or if it is determined in step S603 that an operation of issuing the record start command has not been performed, the process proceeds to step S605.

In step S605, it is determined whether the recording flag is in the on-state. If it is determined in step S605 that the recording flag is in the on-state, the process proceeds to step S606. However, if it is determined in step S605 that the recording flag is in the off-state, the process returns to step S601 to repeat the process from step S601.

In step S606, it is determined whether an operation to end the recording has been performed by the user. More specifically, as with determination of whether the record start command has been issued, the range designation unit 601 analyzes operation information supplied from the operation information analysis unit 45 to determine whether the operation performed by the user was an operation to issue the record end command. If it is determined in step S606 that the record end command has not been issued, the process proceeds to step S607.

In step S607, setting-information is stored. The storing of setting-information is performed, as described above, by reading setting-information temporarily stored in the feature value/setting-information recording unit 612 of the temporarily storing block 603 and copying the read setting-information into the feature value/setting-information recording unit 62 of the storage block 43. If the process in step S607 is completed, the processing flow returns to step S601 to repeat the process from step S601.

On the other hand, in the case where it is determined in step S606 that the record end command has been issued, the process proceeds to step S608, and the recording flag is reset into the off-state. In response to resetting of the recording flag, the recording of the setting-information is ended.

In the present embodiment, as described above, when an effect/edit control operation is performed for a content, the effect/edit is applied only in a specified range.

In the present embodiments, as described above, by designating the recording range in which to record setting-information, it becomes possible to set the setting-value to an arbitrary value at the record start point, that is, the setting-value at the record start point is no longer limited to the normal value. Thus, greater flexibility is allowed in editing of a content. At the record end point, a user is allowed to perform an operation to end the recording separately from the effect/edit control operation. This makes it possible for the user to designate an exact point (frame) at which to end the recording.

Recording Based on Scene Change Detection

Recording of setting information or the like may be controlled such that recording is started or ended when a scene change or a change in content is detected, as described below with reference to FIGS. 46A to 46C.

Figure 46A:
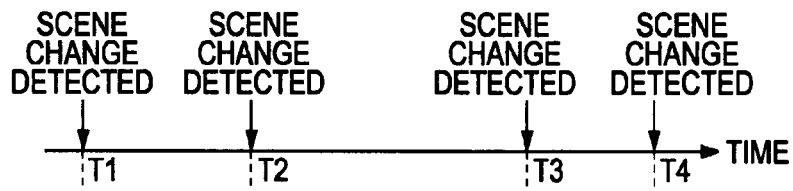
FIG. 46 is a diagram illustrating scene change detection according to an embodiment of the present invention.
Figure 47:
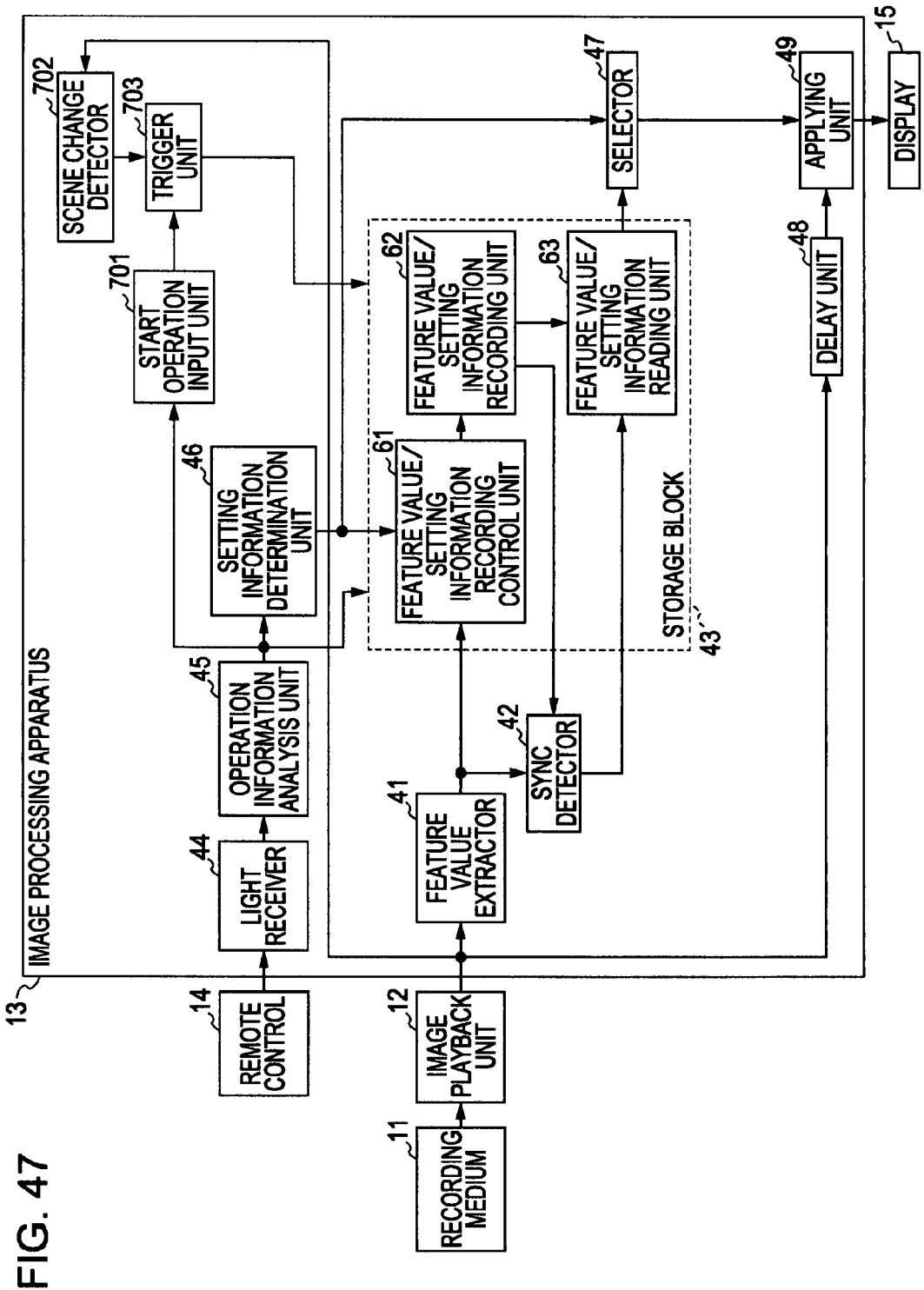
FIG. 47 is a block diagram showing a configuration of an image processing apparatus according to an embodiment of the present invention.
Figure 48:
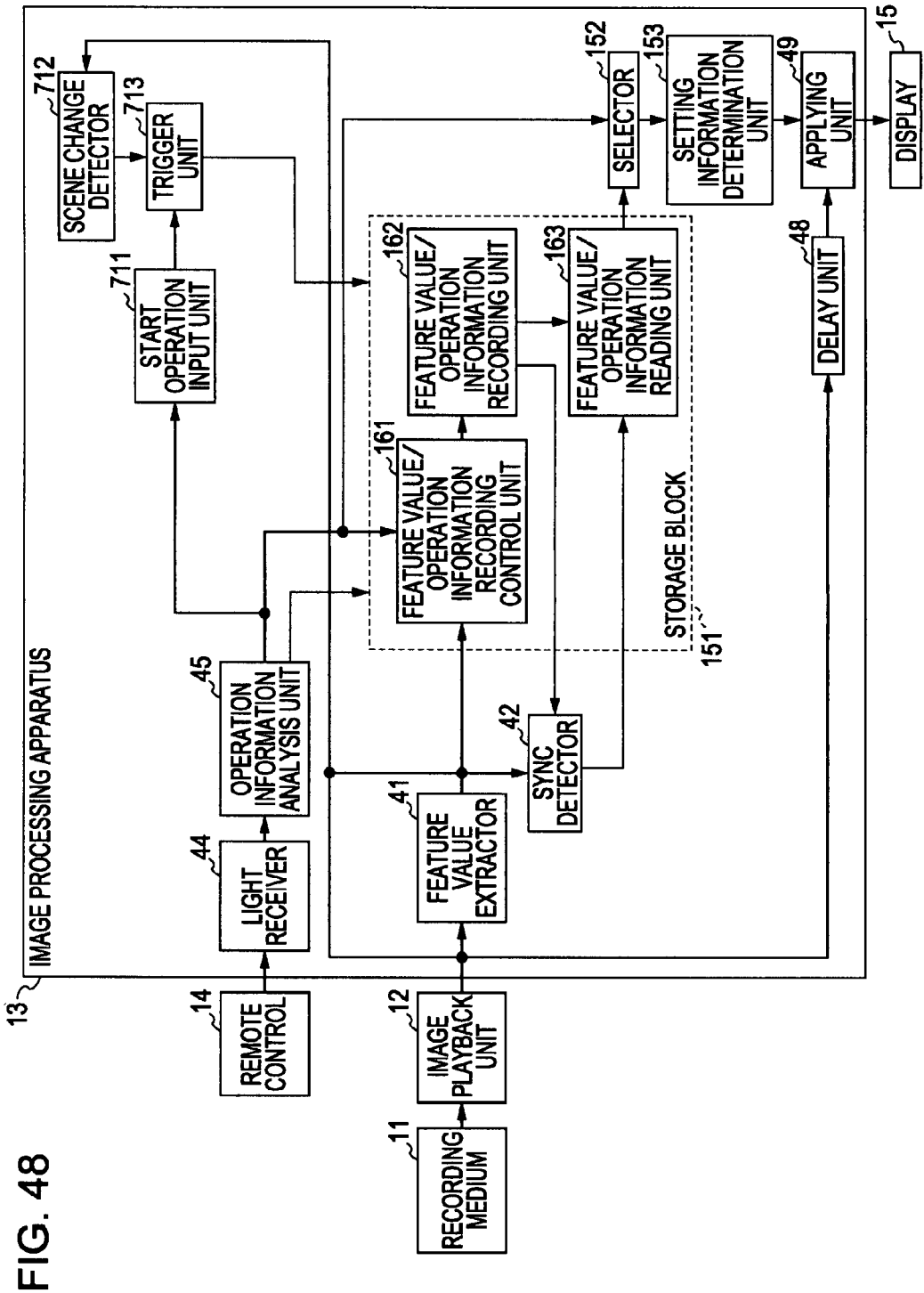
FIG. 48 is a block diagram showing a configuration of an image processing apparatus according to an embodiment of the present invention.

In a specific example shown in FIG. 46A, scene changes are detected at points T1 to T4 by a scene change detector (FIG. 47 or 48). The term "scene change" refer to a transition from one scene to another in a content. A scene change occurs, for example, at a boundary between a main program and a commercial, or at a boundary between a nighttime scene and a daytime scene, or at a boundary between one scene and another very different scene.

Figure 46B:
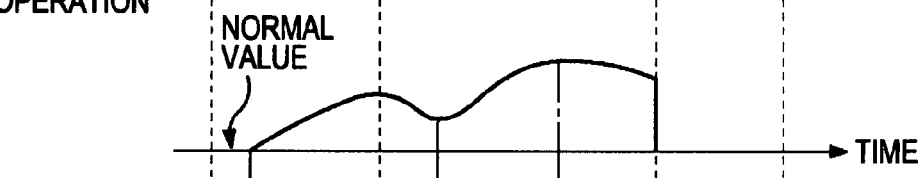
Figure 46C:

In this specific example, as shown in the lower part of FIG. 46B, a positive operation is performed in a period from a time T11 to a time T13, a negative operation is performed in a period from T13 to T14, a positive operation is performed in a period from T14 to T15, and a negative operation is performed in a period from T15 to T16. As a result, a setting-value varying as shown in the upper part of FIG. 46B is recorded.

If the record start button is pressed at the time T12 to start recording setting-information, then recording is started at the time T12. However, in the case where the recording operation is controlled such that recording is started at a scene change, recording is not started at the time T12 at which the record start button is pressed, but recording is actually started at the time T2 at which a scene change is detected. Thus, the setting-value is actually recorded in the period from the time T2 to the time T3 as shown in FIG. 46C.

By controlling the recording operation such that setting-information is recorded in a period between two scene changes, the following advantages are provided. In the conventional recording method, as described above with reference to FIG. 1 or 2, recording is started immediately when an effect/edit control operation is started. Thus, in the conventional recording method, the setting-value at the start of recording is set to a normal value, and the setting-value is continuously changed to a specified value. In contrast, in the present embodiment, starting of recording is controlled in the above described manner, and thus, as shown in FIG. 46C, the setting-value at the start of recording is allowed to be set to a desired value, which can be different from the normal value, and the setting-value is allowed to be continuously changed from that value.

Furthermore, in the conventional recording method, when recording of the setting-value is ended, a user has to operate an end button or the like when the recording is being performed. However, it is difficult for the user to operate the end button at a precisely right time at which the recording should be ended. In the present embodiment of the invention, unlike the conventional recording method, it is easy for a user to exactly set the end point to a desired point.

Furthermore, by controlling the recording operation such that setting-information is recorded in a period from one scene change to a next scene change, that is, in a period of one scene, it becomes possible to continuously change the setting-value within the scene, while the setting-value can be changed discontinuously between different scenes, without a user needing to perform a particular operation. Thus, a user is allowed to perform a desired operation on a scene-by-scene basis without having to specify a boundary between scenes. This is very convenient for users.

An example of an image processing apparatus 13 is described below which is configured to have the capability of detecting scene changes and recording setting-information in a period between detected scene changes.

FIG. 47 shows an example of an image processing apparatus configured to have the recording range designation function by modifying the configuration of the image processing apparatus 13 shown in FIG. 5. FIG. 48 shows an example of an image processing apparatus configured to have the recording range designation function by modifying the configuration of the image processing apparatus 13 shown in FIG. 6.

In FIG. 47, similar parts to those in FIG. 5 are denoted by similar reference numerals, and a duplicated explanation thereof is omitted herein. The image processing apparatus 13 shown in FIG. 47 is similar to the image processing apparatus 13 shown in FIG. 5 except that it additionally includes a start command input unit 701, a scene change detector 702, and a trigger unit 703.

The start command input unit 701 analyzes operation information output from the operation information analysis unit 45 to determine whether a user has issued a command to start recording setting-information. If it is determined that the record start command has been issued, the trigger unit 703 is set into a ready state.

The scene change detector 702 detects a scene change by analyzing an image supplied from the image playback unit 12. If a scene change is detected, the scene change detector 702 notifies the trigger unit 703 that a scene change has been detected. If the trigger unit 703 receives the notification from the scene change detector 702 when the trigger unit 703 is in the ready state, the trigger unit 703 commands the storage block 43 to start recording setting-information or to end recording setting-information.

In FIG. 48, similar parts to those in FIG. 6 are denoted by similar reference numerals, and a duplicated explanation thereof is omitted herein. The image processing apparatus 13 shown in FIG. 48 is similar to the image processing apparatus 13 shown in FIG. 6 except that it additionally includes a start command input unit 711, a scene change detector 712, and a trigger unit 713.

The start command input unit 711 analyzes operation information output from the operation information analysis unit 45 to determine whether a user has issued a command to start recording operation information. If it is determined that the record start command has been issued, the trigger unit 713 is set into a ready state.

The scene change detector 712 detects a scene change by analyzing an image supplied from the image playback unit 12. If a scene change is detected, the scene change detector 712 notifies the trigger unit 713 that a scene change has been detected. If the trigger unit 713 receives the notification from the scene change detector 712 when the trigger unit 713 is in the ready state, the trigger unit 713 commands the storage block 151 to start recording operation information or to end recording operation information.

Operations of the image processing apparatus 13 shown in FIGS. 47 and 48 are described in further detail below with reference to flow charts shown in FIGS. 49 and 50. The operation of the image processing apparatus 13 shown in FIG. 48 is basically similar to that of the image processing apparatus 13 shown in FIG. 47, and thus the operation is explained below, by way of example, for the image processing apparatus 13 shown in FIG. 47 with reference to flow charts shown in FIGS. 49 and 50.

First, referring to a flow chart shown in FIG. 49, a process performed by the image processing apparatus 13 to detect a scene change, and start or end recording in response to detection of the scene change is described below. The process of the flow chart shown in FIG. 49 is basically similar to that shown in FIG. 40 except that the triggering process in step S522 is replaced by step S702 in which a process associated with a scene change is performed.

In the triggering process in step S522 described above, the start point at which to start recording and the end point at which to end recording are specified by a user, and recording of setting-information is controlled according to triggering at the start point or the end point. On the other hand, in the process associated with scene changes in step S702, triggering for starting/ending recording setting-information is performed at a point where a scene change occurs. Steps other than step S702 are performed in a similar manner as described above with reference to the flow chart shown in FIG. 40, and thus a duplicated explanation thereof is omitted herein.

The details of the process associated with scene changes in step S702 are described below with reference to a flow chart shown in FIG. 50. In step S731, it is determined whether a record start command has been issued. The record start command is issued by a user with the intention of starting recording setting-information at a next scene change, for example, by operating a particular button on the remote control 14. In the example shown in FIG. 46B, the record start command is issued at the time T12.

The start command input unit 701 analyzes operation information output from the operation information analysis unit 45 to determine whether the operation performed by the user was an operation to issue a record start command. If it is determined in step S731 that the record start command has been performed, the process proceeds to step S732, in which a scene change detection flag is set into an on-state. In a period in which the scene change detection flag is in the on-state, the scene change detector 702 performs a scene change detection process.

After the scene change detection flag is set in step S732, the process proceeds to step S733. The process also proceeds to step S733 when it is determined in step S731 that the record start command has not been issued. In step S733, it is determined whether the scene change detection flag is in the on-state.

If it is determined in step S733 that the scene change detection flag is in the on-state, the process proceeds to step S734. In step S734, it is determined whether a scene change has been detected. More specifically, if the scene change detection flag is in the on-state, the scene change detector 702 examines image data supplied from the image playback unit 12 to determine whether a scene change has occurred.

Figure 49:
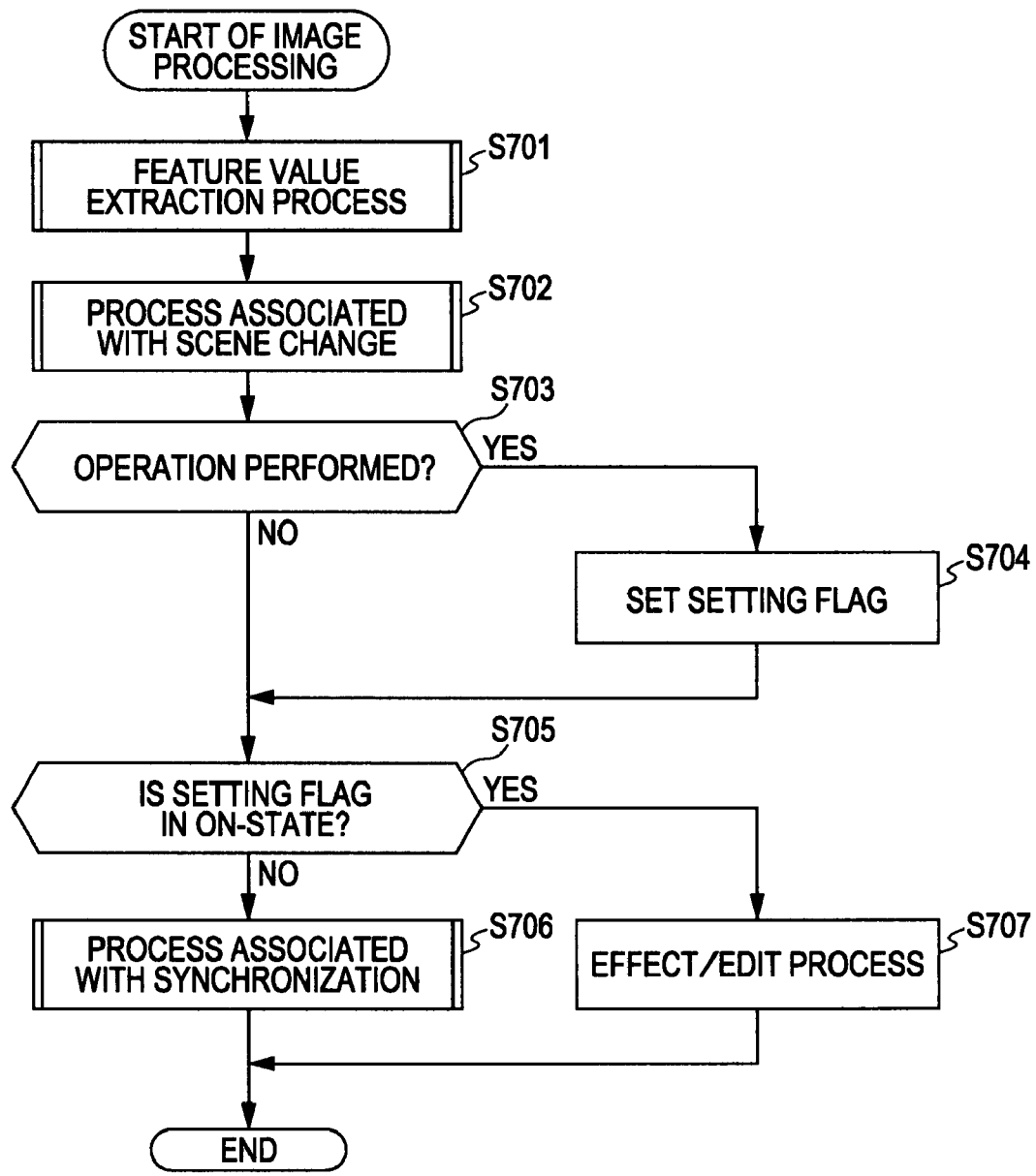
FIG. 49 is a flow chart showing image processing according to an embodiment of the present invention.

If it is determined in step S734 that no scene change is detected, the process associated with scene change detection is ended, and the process proceeds to step S703 (FIG. 49).

On the other hand, if it is determined in step S734 that a scene change has been detected, the process proceeds to step S735. In step S735, it is determined whether the recording flag is in the on-state. If it is determined in step S735 that the recording flag is in the off-state, the process proceeds to step S736, in which the recording flag is set. The process associated with scene change detection is ended, and the process proceeds to step S703 (FIG. 49). In response to setting of the recording flag into the on-state, recording of setting-information according to an operation (effect/edit control operation) by a user is started.

On the other hand, if it is determined in step S735 that the recording flag is in the on-state, the process proceeds to step S737. In step S737, the recording flag is reset into the off-state. Note that it is determined that the recording flag is in the on-state at step S735 only in a situation in which after the record start command was issued by a user, a scene change (a first scene change) was detected and recording was started. Thus, when a second scene change is detected, the recording flag is reset into the off-state to end the recording.

By controlling the recording flag in the above-described manner, recording is controlled such that recording is started when a first scene change is detected, and recording is ended when a second scene change is detected.

In step S738, the scene change detection flag is reset into the off-state. Thereafter, the process associated with scene change detection is ended, and the process proceeds to step S703 (FIG. 49).

By controlling the scene change detection flag in the above-described manner, it becomes possible to record setting-information only for one scene immediately following a point of time at which a record start command is issued by a user.

By controlling the recording of setting-information or like based on scene change detection in the above-described manner, it becomes possible to set the setting-value to an arbitrary value at the record start point, that is, the setting-value at the record start point is no longer limited to the normal value. Thus, greater flexibility is allowed in editing of a content. At the record end point, a user is allowed to perform an operation to end the recording separately from the effect/edit control operation. In response to the record end command issued by the user, the recording is ended exactly at the end of the current scene.

Recording Based on Specified Key Points

Recording may be controlled based on specified key points. The term "key points" refers to points defined by a user before or after editing is performed such that setting-value is changed smoothly between two key points. First, referring to FIGS. 51A to 51C, setting of key points and recording of a setting-value between key points are described below.

Figure 51A:
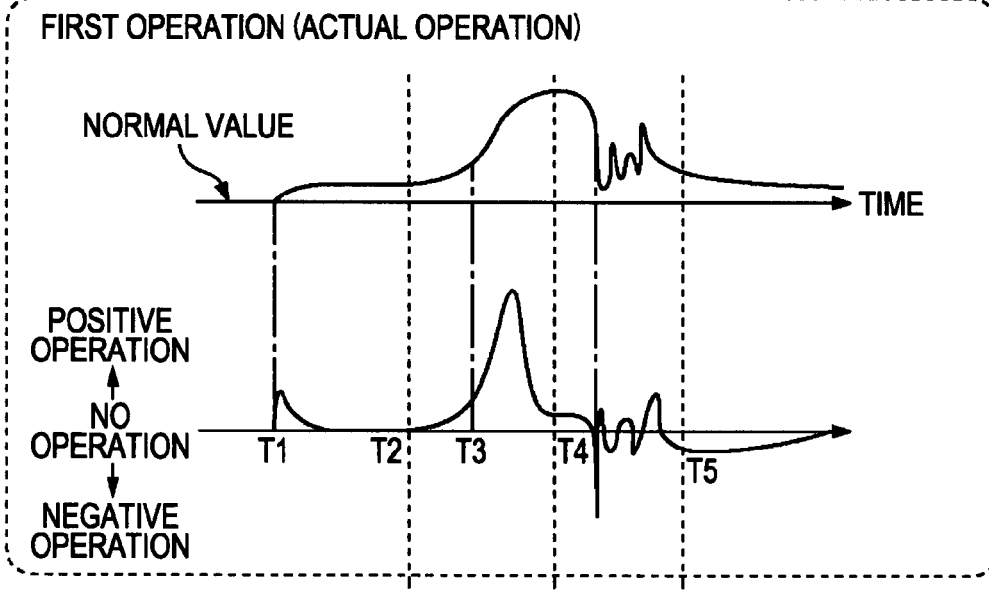
FIG. 51 is a diagram illustrating key points according to an embodiment of the present invention.

As shown in FIG. 51A, if a first-time effect/edit control operation is started at a point of time T1, recording is started at this point of time T1. Before or after the setting-value is recorded, key points are specified as shown in FIG. 51B (in the specific example shown in FIGS. 51A and 51B, key points are specified after the setting-value is recorded).

Figure 51B:
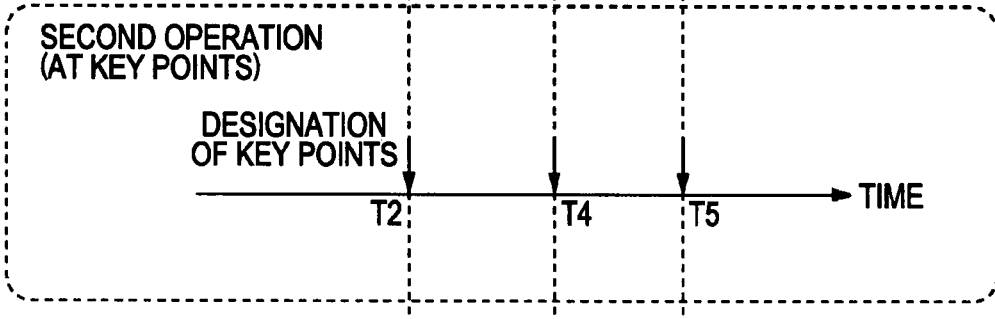

In the example shown in FIG. 51B, three key points are specified at times T2, T4, and T5, respectively, after T1. If key points are specified, then for any first-time effect/edit control operation, the setting-value is interpolated between key points such that the setting-value changes smoothly as shown in FIG. 51C, and resultant setting-value is recorded.

In a period from the time T1 to the time T2 (key point), the setting-value is interpolated such that it gradually increases, and the resultant setting-value is recorded. In a period from the time T2 to the time T4, the setting-value is also interpolated such that it gradually increases, and the resultant setting-value is recorded. In the first-time effect/edit control operation shown in FIG. 51A, a greater setting-value was set at the time T4 than at the time T1, and thus the setting-value is gradually increased in the period from T1 to T4 as shown in FIG. 51C.

Figure 51C:
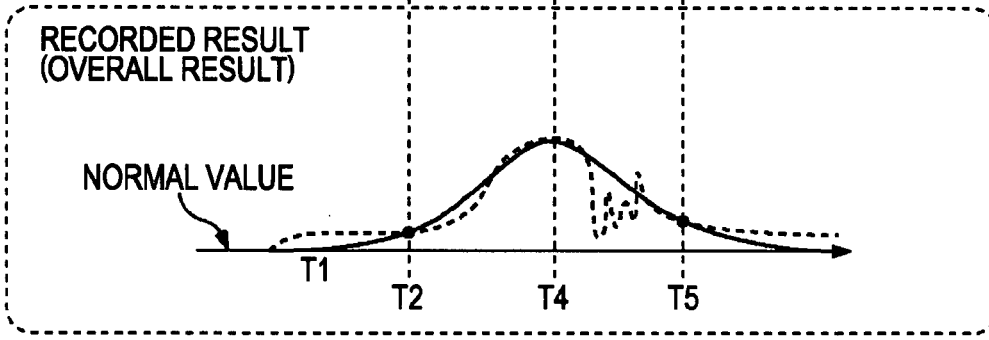

In a period from the key point T4 to the key point T5, a smaller setting-value was set at T5 than at T4 in the first-time effect/edit control operation shown in FIG. 51A, and thus the setting-value is gradually decreased in the period from T4 to T5 as shown in FIG. 51C.

As described above, if key points are set, the setting-value, which has already been recorded before the setting of the key points or which will be recorded after the setting of the key points, is modified based on values at the key points such that the setting-value gradually changes between the key points, and the resultant modified setting-value is recorded. That is, by processing the setting-value in the above-described manner, it is possible to modify the setting-value so as to smoothly change between key points.

An example of an image processing apparatus 13 is described below which is configured to have the capability of setting and recording setting-information such that the setting-value smoothly changes between specified key points.

Figure 52:
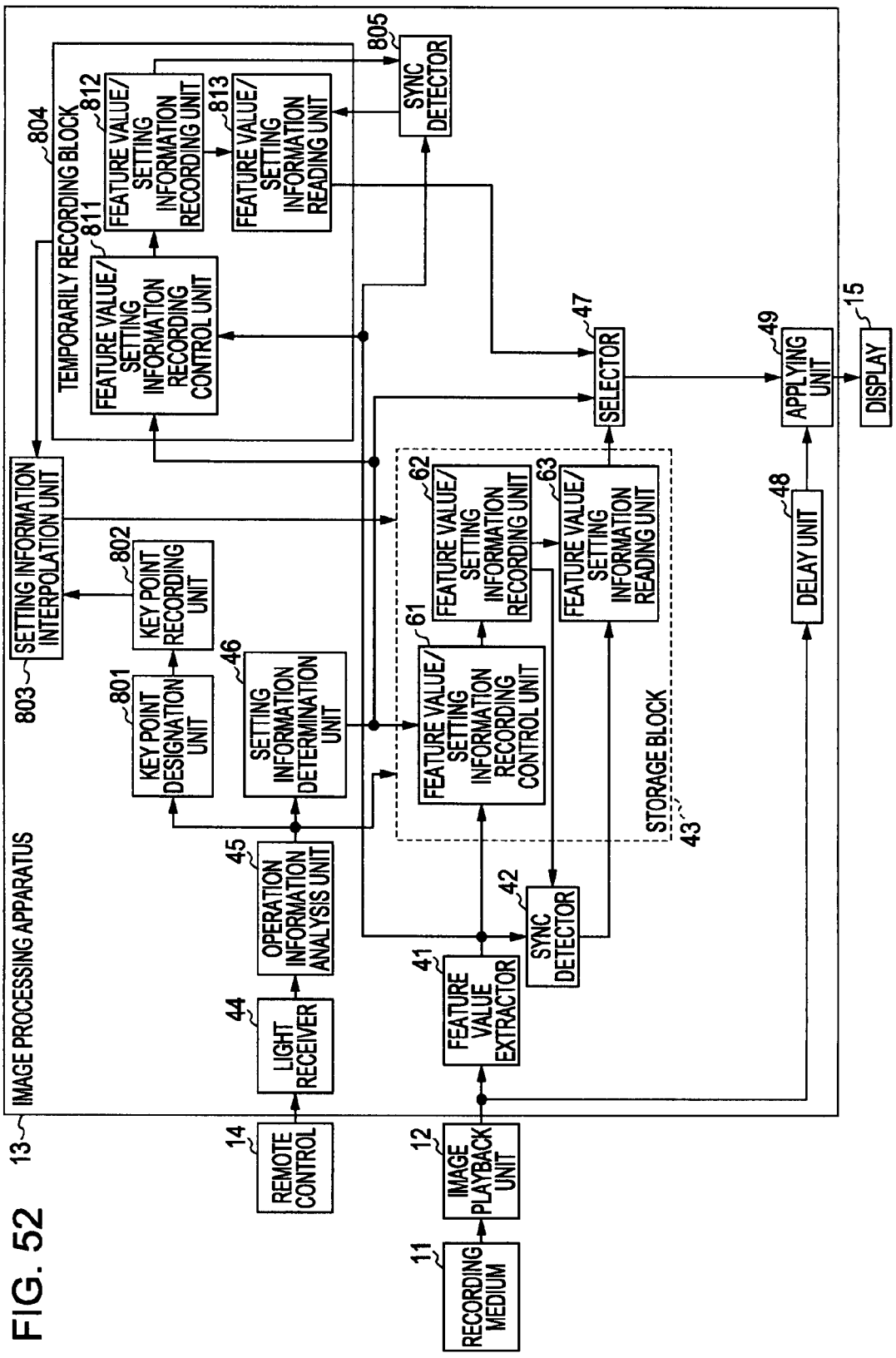
FIG. 52 is a block diagram showing a configuration of an image processing apparatus according to an embodiment of the present invention.
Figure 53:
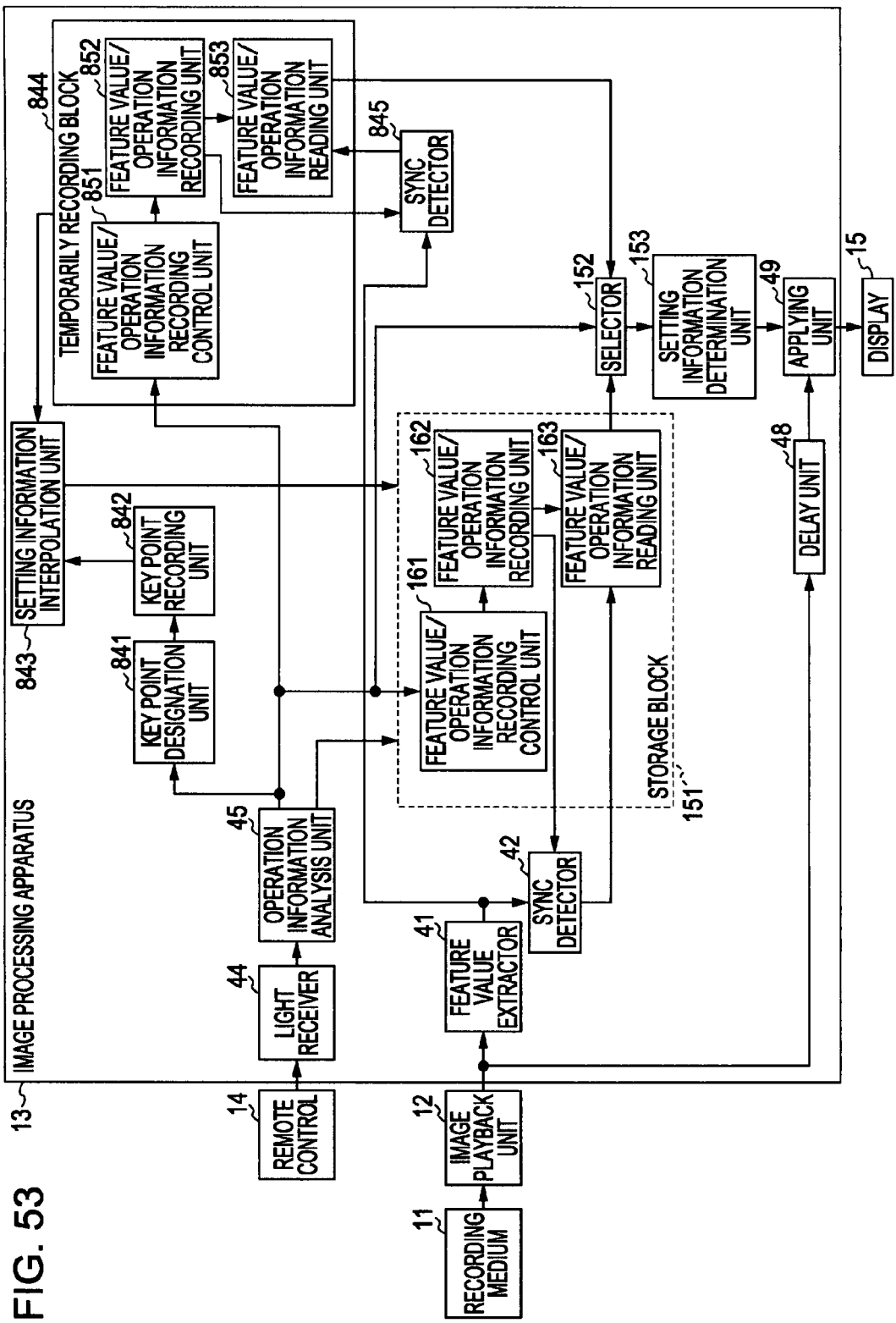
FIG. 53 is a block diagram showing a configuration of an image processing apparatus according to an embodiment of the present invention.

FIG. 52 shows an example of an image processing apparatus obtained by modifying the configuration of the image processing apparatus 13 shown in FIG. 5 to as to have the capability of specifying the recording range by key points. FIG. 53 shows an example of an image processing apparatus obtained by modifying the configuration of the image processing apparatus 13 shown in FIG. 6 to as to have the capability of specifying the recording range by key points.

In FIG. 52, similar parts to those in FIG. 5 are denoted by similar reference numerals, and a duplicated explanation thereof is omitted herein. The image processing apparatus 13 shown in FIG. 52 is similar to the image processing apparatus 13 shown in FIG. 5 except that it additionally includes a key point designation unit 801, a key point storage unit 802, a setting-information interpolation unit 803, a temporarily storing block 804, and a synchronization detector 805, whereby the process associated with key points is performed.

The temporarily storing block 804 includes a feature value/setting-information recording control unit 811, a feature value/setting-information recording unit 812, and a feature value/setting-information reading unit 813. That is, the temporarily storing block 804 is configured in a similar manner to the storage block 43. In this configuration, after key points are set, an effect/edit control operation is performed, and setting-information between the key points is interpolated. In order to perform the process in the above-described manner, it is necessary to temporarily store the setting-value (synchronization information) corresponding to the effect/edit control operation such that the setting-value can be interpolated later. To this end, it is necessary to temporarily store the setting-information. Thus, the temporarily storing block 804 is configured to temporarily store necessary data.

The key point designation unit 801 performs the process associated with setting (designation) of key points in accordance with operation information supplied from the operation information analysis unit 45, that is, in accordance with a command issued by a user. The key point storage unit 802 stores key points designated by the key point designation unit 801. The setting-information interpolation unit 803 reads the key points stored in the key point storage unit 802 and the setting-information stored in the temporarily storing block 804, and interpolates the setting-information between the key points.

The parts of the temporarily storing block 804 are similar to those of the storage block 43, and they are adapted to temporarily store setting-information and other data necessary to perform interpolation between the key points. The synchronization detector 805 detects synchronization in a similar manner to the synchronization detector 42.

In FIG. 53, similar parts to those in FIG. 6 are denoted by similar reference numerals, and a duplicated explanation thereof is omitted herein. The image processing apparatus 13 shown in FIG. 53 is similar to the image processing apparatus 13 shown in FIG. 6 except that it additionally includes a key point designation unit 841, a key point storage unit 842, an operation information interpolation unit 843, a temporarily storing block 844, and a synchronization detector 845, whereby the process associated with key points is performed.

The temporarily storing block 844 includes a feature value/operation information recording control unit 851, a feature value/operation information recording unit 852, and a feature value/operation information reading unit 853. That is, the temporarily storing block 844 is configured in a similar manner to the storage block 151. In this configuration, after key points are set, an effect/edit control operation is performed and operation information between the key points is interpolated. In order to perform the process in the above-described manner, it is necessary to temporarily store the synchronization information corresponding to the effect/edit control operation such that the operation information can be interpolated later. Thus, the temporarily storing block 844 is configured to temporarily store necessary data.

The key point designation unit 841 performs the process associated with setting (designation) of key points in accordance with operation information supplied from the operation information analysis unit 45, that is, in accordance with a command issued by a user. The key point storage unit 842 stores key points designated by the key point designation unit 841. The operation information interpolation unit 843 reads the key points stored in the key point storage unit 842 and the operation information stored in the temporarily storing block 844, and interpolates the operation information between the key points.

The parts of the temporarily storing block 844 are similar to those of the storage block 151, but they are adapted to temporarily store operation information and other data necessary to perform interpolation between the key points. The synchronization detector 845 detects synchronization in a similar manner to the synchronization detector 42.

Figure 54:
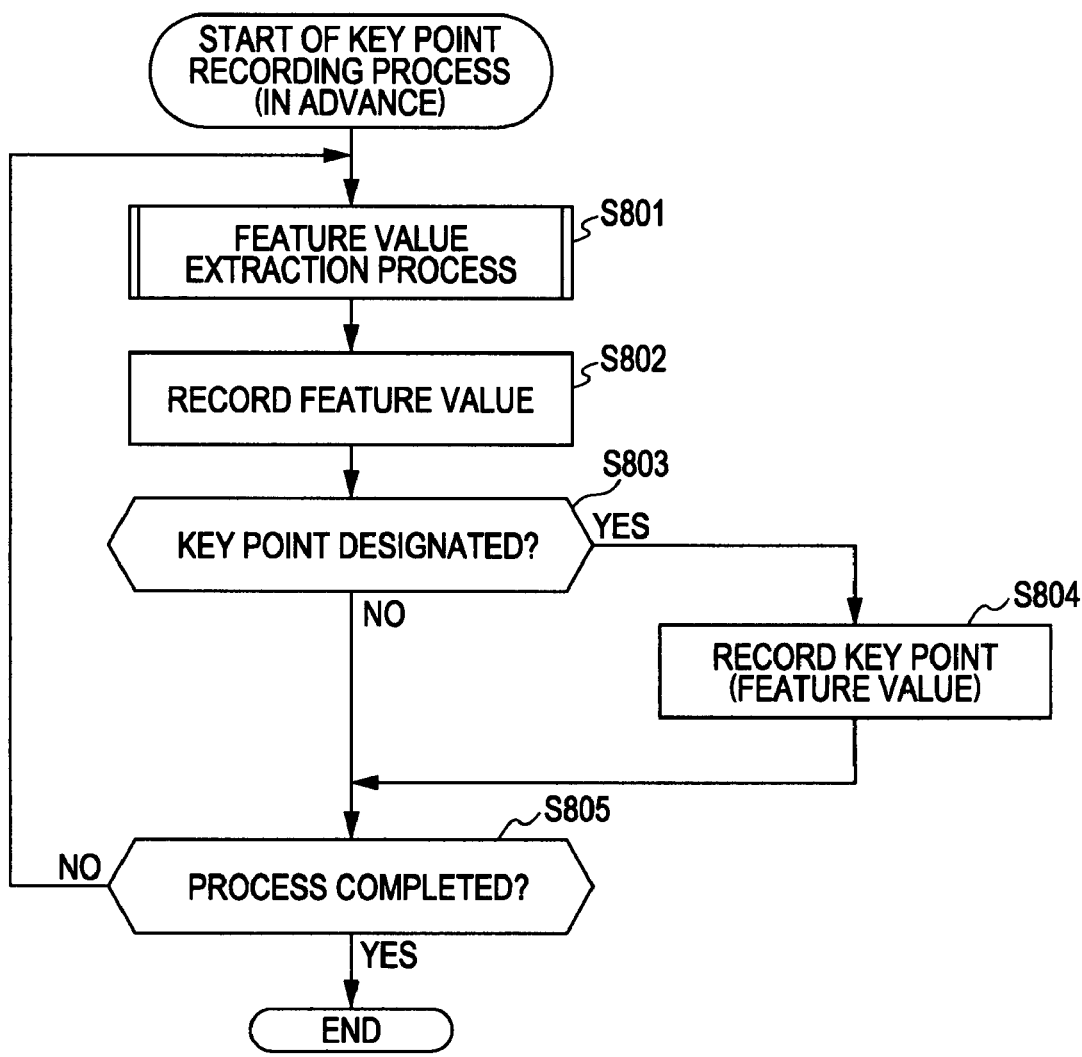
FIG. 54 is a flow chart showing a key point recording process according to an embodiment of the present invention.
Figure 55:
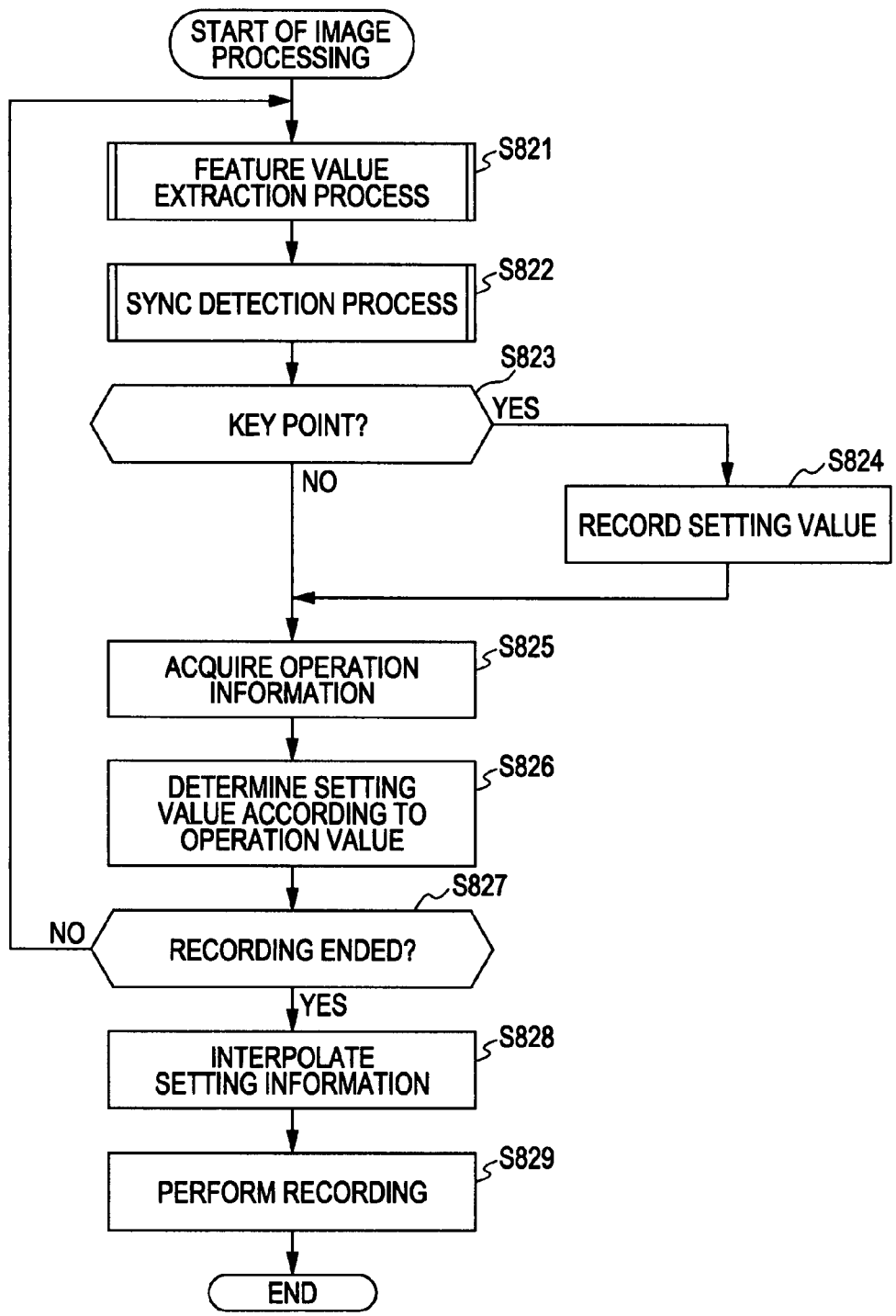
FIG. 55 is a flow chart showing image processing according to an embodiment of the present invention.

Operations of the image processing apparatus 13 shown in FIGS. 52 and 53 are described in further detail below with reference to flow charts shown in FIGS. 54 and 55. The operation of the image processing apparatus 13 shown in FIG. 53 is basically similar to that of the image processing apparatus 13 shown in FIG. 52, and thus the operation is explained below, by way of example, for the image processing apparatus 13 shown in FIG. 52 with reference to flow charts shown in FIGS. 54 and 55.

In the process performed by the image processing apparatus 13, after key points are set, an effect/edit control operation is performed and a setting-value is recorded. The details of this process associated with setting of key points recording of the setting-value are described below with reference to a flow chart shown in FIG. 54.

In step S801, the feature value extraction process is performed on an image (frame) input from the image playback unit 12. The feature value extraction process in step S801 is performed in a similar manner as described above with reference to the flow chart shown in FIG. 11, and thus a duplicated explanation thereof is omitted herein. The feature value extracted in step S801 is recorded in the feature value/setting-information recording unit 812 in step S802.

In step S803, it is determined whether a key point has been specified. More specifically, the key point designation unit 801 analyzes the operation information identified by the operation information analysis unit 45 to determine whether the operation performed by the user was a key point designation operation. Note that, of frames of a moving image, each key point is set at a particular frame specified by the user.

In a case where it is determined in step S803 that a key point has been specified, the process proceeds to step S804 and a feature value of the image at the specified key point is recorded. More specifically, if the key point designation unit 801 determines that a key point has been specified, the key point designation unit 801 records a feature value (a synchronization feature value) extracted from a frame at the key point (that is, a feature value extracted in step S801) in the key point storage unit 802 in association with the key point. The feature value is also stored in the temporarily storing block 804.

After the feature value at the key point is recorded in association with the key point, the process proceeds to step S805. The process also proceeds to step S805 when it is determined in step S803 that no key point has been specified.

In step S805, it is determined whether setting of key points has been ended. If it is determined in step S805 that setting of key points has not been ended, the process returns to step S801 to repeat the above-described process for a next frame. In a case where it is determined in step S805 that a command to end the setting of key points has been issued, the setting of key points is ended.

The determination in step S805 as to whether setting of key points has been ended may be made by determining whether a command to end setting of key points has been issued by a user. In a case where a last frame of a content has been reached before the command to end setting of key points is issued, it may be determined that setting of key points has been ended.

The process of controlling recording of setting-value so as to gradually change between key points specified before the recording is described in further detail below with reference to a flow chart shown in FIG. 55.

In step S821, the feature value extraction process is performed. The feature value extraction process in step S821 is performed in a similar manner as described above with reference to the flow chart shown in FIG. 11, and thus a duplicated explanation thereof is omitted herein. In step S822, the synchronization detection process is performed. The synchronization detection process in step S822 is performed in a similar manner as described above with reference to the flow chart shown in FIG. 13, and thus a duplicated explanation thereof is omitted herein.

In step S823, it is determined whether the current frame is at a key point. More specifically, key points (synchronization feature values at key points) stored in the key point storage unit 802 are read, the determination is step S823 is made. If it is determined in step S823 that the current frame is at a key point, the process proceeds to step S824.

In step S824, the setting-value is recorded in the temporarily storing block 804 in association with the key point. That is, in order that in step S829 to be performed later, the setting-value can be interpolated based on setting-values associated with key points, the setting-value is stored, in step S824, in the temporarily storing block 804 in association with the key point.

If the process in step S824 is completed, or if it is determined in step S823 that the current frame is not at a key point, the process proceeds to step S825. In step S825, operation information is acquired. In step S826, the acquired operation information is applied to the setting-value.

In step S828, it is determined whether recording is ended. If it is determined in step S828 that recording is not ended, the processing flow returns to step S821 to repeat the process from step S821. On the other hand, if it is determined in step S827 that recording is ended, the process proceeds to step S828.

Thus, by performing the process from step S821 to S827 repeatedly, setting-values are recorded at a plurality of specified key points. After recording of setting-values is completed, step S828 and following steps are performed.

In step S828, interpolation of setting-values is performed. More specifically, the setting-information interpolation unit 803 reads setting-values associated with the key points from the temporarily storing block 804. The setting-information interpolation unit 803 also reads two key points adjacent in time to each other (by referring to the feature values of the key points stored in the key point storage unit 802 as required), and interpolates the setting-information between the two adjacent key points.

In the specific example shown in FIG. 51C, setting-information at a key point set at time T2 and setting-information at a next key point set at time T3 are read, and the setting-information is interpolated between the key points corresponding to T2 and T3 on the basis of the read setting-information.

Note that there is no particular limitation on an interpolation method, and the interpolation may be performed in many ways. For example, the setting value between two key points may be linearly interpolated or may be interpolated by a curve according to a polynomial approximation function, a spline function, a Bezier function, or the like.

In a case where adjacent key points are apart far from each other (that is, in a case where the distance between two adjacent key points is equal to or greater than a predetermined threshold value), interpolation between these two adjacent key points may be performed using not only setting-information at these key points but also setting-information at particular points between these adjacent key points. In this case, as described above with reference to FIG. 52 or 53, because the image processing apparatus 13 includes the temporarily storing block 804 (844), it is possible to acquire setting-information at positions other than key points by reading setting-information from the temporarily storing block 804 (844).

The function used in interpolation may be switched depending on the distance between adjacent key points.

In step S829, the setting-information obtained by the interpolation in step S828 is supplied to the storage block 43 and stored therein.

By smoothly interpolating the setting-information between specified key points and recording the resultant interpolated setting-information, a user is allowed to achieve smooth effects on an image and record the result in the operation log, without needing a complicated operation.

When key points are specified after an effect/edit control operation is performed by a user, the process is performed as follows. In this case, the user first performs an effect/edit control operation on an image and then specifies key points. After that, interpolation of setting-information is performed.

For the case where key points are specified after the effect/edit control operation, the image processing apparatus 13 may also be configured in a similar manner to that shown in FIG. 52 or 53. That is, setting-information (operation information) given in an effect/edit control operation is stored in the temporarily storing block 804 (844). After the setting-information is stored in the temporarily storing block 804 (844), key points are stored in the key point storage unit 802 (842). After the key points are stored in the key point storage unit 802 (842), the setting-information interpolation unit 803 (the operation information interpolation unit 843) interpolates the setting-information (the operation information) and stores the resultant setting-information (the operation information) in the storage block 43 (151).

Thus, when key points are set after editing is performed, the image processing apparatus 13 may be configured in a similar manner to the case in which key points are set before editing is performed.

Operations of the image processing apparatus 13 shown in FIGS. 52 and 53 are described below. The operation of the image processing apparatus 13 shown in FIG. 53 is basically similar to that of the image processing apparatus 13 shown in FIG. 52, and thus the operation is explained below, by way of example, for the image processing apparatus 13 shown in FIG. 52.

As described above, before key points are set, an effect/edit control operation is performed and setting-information produced in the effect/edit control operation is stored in the temporarily storing block 804. The operation of the image processing apparatus 13 until the setting-information is stored in the temporarily storing block 804 is similar to that described above with reference to the flow chart shown in FIG. 10, and thus a duplicated explanation thereof is omitted herein.

Figure 56:
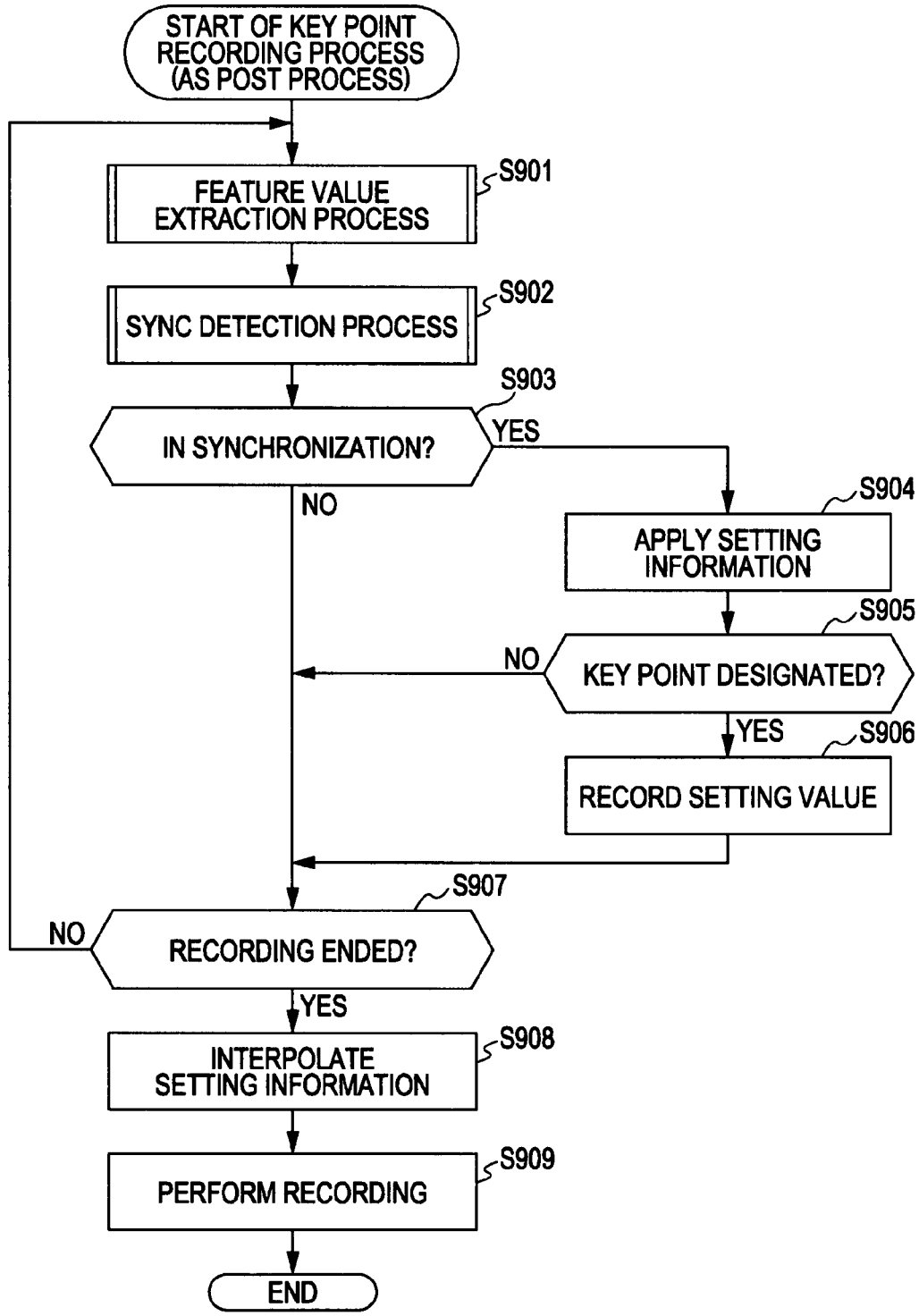
FIG. 56 is a flow chart showing a key point recording process according to an embodiment of the present invention.

After the setting-information is stored in the temporarily storing block 804, key points are set as described below with reference to a flow chart shown in FIG. 56.

In step S901, the feature value extraction process is performed. The feature value extraction process in step S901 is performed in a similar manner as described above with reference to the flow chart shown in FIG. 11, and thus a duplicated explanation thereof is omitted herein. In step S902, the synchronization detection process is performed. The synchronization detection process in step S902 is performed in a similar manner as described above with reference to the flow chart shown in FIG. 13, and thus a duplicated explanation thereof is omitted herein.

In step S903, it is determined whether synchronization has been detected. If it is determined in step S903 that synchronization has been detected, the process proceeds to step S904. In step S904, the setting-information stored in the temporarily storing block 804 is applied to the image, and the resultant image is displayed.

In step S905, it is determined whether a key point has been specified. The determination in this step is made by the key point designation unit 801 in a similar manner to step S803 in FIG. 54.

In a case where it is determined in step S905 that a key point has been specified, the process proceeds to step S906. In step S906, the setting-value is recorded This process in steps S906 is performed in a similar manner to step S824 in FIG. 55. More specifically, setting-information at a specified key point is recorded in association with the key point in the temporarily storing block 804 (that is, in this case, setting-information stored in the temporarily storing block 804 is associated with the key point).

If it is determined in step S903 that synchronization is not detected, or if it is determined in step S905 that no key point is specified, or if step S906 is completed, the process proceeds to step S907. In step S907, it is determined whether recording is ended.

In a case where it is determined in step S907 that recording is not ended, the processing flow returns to step S901 to repeat the process from step S901. On the other hand, if it is determined in step S907 that recording is ended, the process proceeds to step S908.

Recording is determined to be ended, when a record end command is issued by a user or when there are no more pieces of setting-information in the temporarily storing block 804.

In step S908, interpolation of setting-information is performed. In step S909, the resultant setting-information is recorded. Steps S908 and S909 are similar to steps S828 and S829 described above with reference to FIG. 55, and thus a duplicated explanation thereof is omitted herein.

Also in the case in which key points are set after the effect/edit operation, it is possible to obtain setting-information varying smoothly between key points as in the case where key points are set before the effect/edit operation. Thus, it is possible to prevent an abrupt change from occurring in an image provided to a user.

Although in the embodiments described above, it is assumed, by way of example, that the setting-value is controlled such that no abrupt change occurs in the setting-value when an effect/edit control operation is performed by a user, the present invention may also be applied to a wide variety processes.

As described above, the present invention makes it possible to record a high-quality image in a flexible manner without having an abrupt change in the image, which would give a discomfort impression to a user.

Storage Medium

The sequence of processing steps described above may be performed by means of hardware or software. When the processing sequence is executed by software, a program forming the software may be installed from a storage medium onto a computer which is provided as dedicated hardware or may be installed onto a general-purpose computer capable of performing various processes in accordance with various programs installed thereon.

The above-described functions of the image processing apparatus 13 may be implemented by executing a software program on a personal computer. FIG. 57 shows an example of a configuration of a personal computer usable for the above purpose, according to an embodiment of the present invention. In the personal computer shown in FIG. 57, a CPU 1001 is responsible for control of the whole personal computer. If a command is issued by a user via by operating an input unit 1006 including a keyboard, a mouse, etc., the command is input to the CPU 1001 via an input/output interface 1005 and a bus 1004. In response, the CPU 1001 executes a program stored in a ROM (Read Only Memory) 1002. Alternatively, the program may be installed in advance in a storage unit 1008 from a removable storage medium 1021, such as a magnetic disk, an optical disk, a magetooptical disk, or a semiconductor memory, mounded on a drive 1010, and the CPU 1001 may load the program from the removable storage medium 1021 into a RAM (Random Access Memory) 1003 and may execute the program loaded in the RAM 1003. By executing the program, the above-described functions of the image processing apparatus 13 are implemented by software. The CPU 1001 also transmits/receives data to/from an external apparatus via a communication unit 1009.

The program may be stored in the removable storage medium 1021 in the form of a package medium and may be supplied to a user separately from a computer, as shown in FIG. 57. Specific examples of such removable storage media include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk™)), and a semiconductor memory. The program may also be supplied to a user by preinstalling it on a built-in ROM 1002 or a storage unit 1008 such as a hard disk disposed in the computer.

In the present description, the steps described in the program stored in the storage medium may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus comprising:
feature value extraction means for extracting a feature value from an image, the feature value being a selected sequence of bits derived from a longer sequence of bits representing a sum of pixel values of pixels in an image data area of a frame;
setting means for setting setting-information defining a process to be performed on the image;
edit means for editing the setting-information set by the setting means; and
recording means for recording the setting-information edited by the edit means, in association with the feature value of the image, on a data recording medium.

2. The image processing apparatus according to claim 1, wherein when the setting by the setting means is ended, the edit means edits the setting-information between first setting-information given at the end of the setting by the setting means and second setting-information defined as normal setting-information such that the setting-information gradually changes from the first setting-information to the second setting-information.

3. The image processing apparatus according to claim 1, wherein when the setting by the setting means is ended, the edit means edits the setting-information between first setting-information given at the end of the setting by the setting means and second setting-information which has been assigned for the image at a point of time later than the point of time corresponding to the first setting-information and which has been recorded on the data recording medium such that the setting-information gradually changes from the first setting-information to the second setting-information.

4. The image processing apparatus according to claim 3, wherein the edit means subtracts or adds a predetermined value from or to a value indicated by the first setting-information, and assigns third setting-information indicating the result of the subtraction or the addition to the image at a point of time next to the point of time corresponding to the first setting-information; if the value indicated by the third setting-information is not within a predetermined range from the value indicated by the second setting-information, the edit means further subtracts or adds the predetermined value from or to the value indicated by the third setting-information, and assigns setting-information, as new third setting-information, indicating the result of the subtraction or the addition to the image at a further next point of time; and if the value indicated by the third setting-information falls within the predetermined range from the value indicated by the second setting-information, the edit means employs the third setting-information as the second setting-information.

5. The image processing apparatus according to claim 1, wherein the edit means adds a value indicated by setting-information set by the setting means to a value indicated by setting-information which has been set for the same image as the image for which the former setting-information is assigned and which has been recorded on the data recording medium.

6. The image processing apparatus according to claim 1, further comprising key point setting means for setting a key point specifying a start point or an end point of a period during which editing is to be performed by the edit means, wherein the edit means edits the setting-information such that the setting-information gradually changes in value between two adjacent key points of the key points set by the key point setting means.

7. The image processing apparatus according to claim 6, wherein the key point setting means sets the key points at a point of time before recording is performed by the recording means or at a point of time after recording is performed by the recording means.

8. An image processing method, comprising:
using a processor to carry out the following:
extracting a feature value from an image, the feature value being a selected sequence of bits derived from a longer sequence of bits representing a sum of pixel values of pixels in an image data area of a frame, setting setting-information defining a process to be performed on the image, editing the setting-information set in the setting step, and controlling a recording operation so as to record the setting-information edited in the editing step, in association with the feature value of the image, on a data recording medium.

9. A non-transitory computer readable medium on which a program is stored, the program being executable by a computer to perform a process comprising:

extracting a feature value from an image, the feature value being a selected sequence of bits derived from a longer sequence of bits representing a sum of pixel values of pixels in an image data area of a frame;

setting setting-information defining a process to be performed on the image;

editing the setting-information set in the setting step; and controlling a recording operation so as to record the setting-information edited in the editing step, in association with the feature value of the image, on a data recording medium.

10. A processor encoded with instructions for carrying out a program to perform a process comprising:

extracting a feature value from an image, the feature value being a selected sequence of bits derived from a longer sequence of bits representing a sum of pixel values of pixels in an image data area of a frame;

setting setting-information defining a process to be performed on the image;

editing the setting-information set in the setting step; and controlling a recording operation so as to record the setting-information edited in the editing step, in association with the feature value of the image, on a data recording medium.

11. An image processing apparatus comprising:

feature value extraction means for extracting a feature value from an image, the feature value being a selected sequence of bits derived from a longer sequence of bits representing a sum of pixel values of pixels in an image data area of a frame;

setting means for setting setting-information defining a process to be performed on the image;

recording means for recording the setting-information, in association with the feature value of the image, on a data recording medium; and control means for determining whether the recording means should record the setting-information on the data recording medium, and controlling recording performed by the recording means in accordance with a determination result.

12. The image processing apparatus according to claim 11, wherein the control means determines that the recording means should not record the setting-information on the data recording medium, when at least one of the following conditions is satisfied: (a) identical setting-information is set continuously by the setting means; (b) the setting-information set by the setting means is close to corresponding setting-information recorded on the data recording medium; and (c) the setting-information set by the setting means is close to setting-information defined as normal setting-information.

13. The image processing apparatus according to claim 11, further comprising specifying means for specifying a start point at which to start recording by the recording means and an end point at which to end the recording, wherein the control means determines that recording of the setting-information on the data recording medium by the recording means is to be started at the start point specified by the specifying means, and the control means determines that recording of the setting-information on the data recording medium by the recording means is to be ended at the end point specified by the specifying means.

14. The image processing apparatus according to claim 13, wherein the specifying means specifies the start point and the end point at a point of time before recording is performed by the recording means.

15. The image processing apparatus according to claim 13, wherein the recording means temporarily records the setting-information on the data recording medium, the specifying means specifies the start point and the end point after recording is performed by the recording means, and the control means re-records the setting-information temporarily recorded on the data recording medium such that re-recording of the setting-information is started at the start point and ended at the end point.

16. The image processing apparatus according to claim 15, further comprising detection means for detecting a scene change, wherein when a scene change is detected by the detection means, if recording of setting-information on the data recording medium by the recording means is not being performed, the control means determines that recording should be started, but if recording of setting-information on the data recording medium by the recording means is being performed, the control means determines that recording should be ended.

17. An image processing method, comprising:

using a processor to carry out the following:

extracting a feature value from an image, the feature value being a selected sequence of bits derived from a longer sequence of bits representing a sum of pixel values of pixels in an image data area of a frame, setting setting-information defining a process to be performed on the image, and controlling recording of the setting-information, in association with the feature value of the image, on a data recording medium such that a determination is made as to whether the setting-information should be recorded on the data recording medium, and recording is controlled in accordance with a determination result.

18. A non-transitory computer readable medium on which a program is stored, the program being executable by a computer to perform a process comprising:

extracting a feature value from an image, the feature value being a selected sequence of bits derived from a longer sequence of bits representing a sum of pixel values of pixels in an image data area of a frame;

setting setting-information defining a process to be performed on the image;

controlling recording of the setting-information, in association with the feature value of the image, on a data recording medium such that a determination is made as to whether the setting-information should be recorded on the data recording medium, and recording is controlled in accordance with a determination result.

19. A processor encoded with instructions for carrying out a program to perform a process comprising:

extracting a feature value from an image, the feature value being a selected sequence of bits derived from a longer sequence of bits representing a sum of pixel values of pixels in an image data area of a frame;

setting setting-information defining a process to be performed on the image;

controlling recording of the setting-information, in association with the feature value of the image, on a data recording medium such that a determination is made as to whether the setting-information should be recorded on the data recording medium, and recording is controlled in accordance with a determination result.

20. An image processing apparatus comprising:
feature value extraction means for extracting a feature value from an image, the feature value being a selected sequence of bits derived from a longer sequence of bits representing a sum of pixel values of pixels in an image data area of a frame;
operation means for performing an operation to specify a process to be performed on the image;
setting means for, in accordance with the operation performed by the operation means, setting operation information according to which to perform the process on the image;
edit means for editing the operation information; and
recording means for recording the operation information edited by the edit means, in association with the feature value of the image, on a data recording medium.

21. The image processing apparatus according to claim 20, wherein when the operation by the operation means is ended, the edit means edits the operation information between first operation information given at the end of the operation by the operation means and second operation information defined as normal operation information such that the operation information gradually changes from the first operation information to the second operation information.

22. The image processing apparatus according to claim 20, wherein when the operation by the operation means is ended, the edit means edits the operation information between first operation information given at the end of the operation by the operation means and second operation information which has been assigned at a point of time later than the point of time corresponding to the first operation information and which has been recorded on the data recording medium such that the operation information gradually changes from the first operation information to the second operation information.

23. The image processing apparatus according to claim 22, wherein the edit means subtracts or adds a predetermined value from or to a value indicated by the first operation information, and assigns third operation information indicating the result of the subtraction or the addition to the image at a point of time next to the point of time corresponding to the first operation information; if the value indicated by the third operation information is not within a predetermined range from the value indicated by the second operation information, the edit means further subtracts or adds the predetermined value from or to the value indicated by the third operation information, and assigns operation information, as new third operation information, indicating the result of the subtraction or the addition to the image at a further next point of time; and if the value indicated by the third operation information falls within the predetermined range from the value indicated by the second operation information, the edit means employs the third operation information as the second operation information.

24. The image processing apparatus according to claim 20, wherein the edit means adds a value indicated by the operation information to a value indicated operation information which has been assigned for the same image as the image for which the former operation information is assigned and which has been recorded on the data recording medium.

25. The image processing apparatus according to claim 20, further comprising key point setting means for setting a key point specifying a start point or an end point of a period during which editing is to be performed by the edit means, wherein the edit means edits the operation information such that the operation information gradually changes in value between two adjacent key points of the key points set by the key point setting means.

26. The image processing apparatus according to claim 25, wherein the key point setting means sets the key points at a point of time before recording is performed by the recording means or at a point of time after recording is performed by the recording means.

27. An image processing method, comprising:
using a processor to carry out the following:
extracting a feature value from an image, the feature value being a selected sequence of bits derived from a longer sequence of bits representing a sum of pixel values of pixels in an image data area of a frame,
performing an operation to specify a process to be performed on the image,
in accordance with the operation performed in the operation step, setting operation information according to which to perform the process on the image,
editing the operation information, and
controlling a recording operation so as to record the operation information edited in the editing step, in association with the feature value of the image, on a data recording medium.

28. A non-transitory computer readable medium on which a program is stored, the program being executable by a computer to perform a process comprising:
extracting a feature value from an image, the feature value being a selected sequence of bits derived from a longer sequence of bits representing a sum of pixel values of pixels in an image data area of a frame;
performing an operation to specify a process to be performed on the image;
in accordance with the operation performed in the operation step, setting operation information according to which to perform the process on the image;
editing the operation information; and
controlling a recording operation so as to record the operation information edited in the editing step, in association with the feature value of the image, on a data recording medium.

29. A processor encoded with instructions for carrying out a program to perform a process comprising:
extracting a feature value from an image, the feature value being a selected sequence of bits derived from a longer sequence of bits representing a sum of pixel values of pixels in an image data area of a frame;
performing an operation to specify a process to be performed on the image;
in accordance with the operation performed in the operation step, setting operation information according to which to perform the process on the image;
editing the operation information; and
controlling a recording operation so as to record the operation information edited in the editing step, in association with the feature value of the image, on a data recording medium.

30. An image processing apparatus comprising:
feature value extraction means for extracting a feature value from an image, the feature value being a selected sequence of bits derived from a longer sequence of bits representing a sum of pixel values of pixels in an image data area of a frame;

operation means for performing an operation to specify a process to be performed on the image;

setting means for, in accordance with the operation performed by the operation means, setting setting-information according to which to perform the process on the image;

recording means for recording operation information indicating the operation performed by the operation means, in association with the feature value of the image, on a data recording medium; and control means for determining whether the recording means should record the operation information on the data recording medium, and controlling recording performed by the recording means in accordance with a determination result.

31. The image processing apparatus according to claim 30, wherein the control means determines that the recording means should not record the operation information on the data recording medium, when at least one of the following conditions is satisfied: (d) no signal is supplied from the operation means over a period with a length equal to or greater than a predetermined value; (e) the operation information is close to corresponding operation information recorded on the data recording medium; and (f) the operation information is close to operation information defined as normal operation information.

32. The image processing apparatus according to claim 30, further comprising specifying means for specifying a start point at which to start recording by the recording means and an end point at which to end the recording, wherein the control means determines that recording of the operation information on the data recording medium by the recording means is to be started at the start point specified by the specifying means, and the control means determines that recording of the operation information on the data recording medium by the recording means is to be ended at the end point specified by the specifying means.

33. The image processing apparatus according to claim 32, wherein the specifying means specifies the start point and the end point at a point of time before recording is performed by the recording means.

34. The image processing apparatus according to claim 32, wherein the recording means temporarily records the operation information on the data recording medium, the specifying means specifies the start point and the end point after recording is performed by the recording means, and the control means re-records the operation information temporarily recorded on the data recording medium such that re-recording of the operation information is started at the start point and ended at the end point.

35. The image processing apparatus according to claim 34, further comprising detection means for detecting a scene change, wherein when a scene change is detected by the detection means, if recording of operation information on the data recording medium by the recording means is not being performed, the control means determines that recording should be started, but if recording of operation information on the data recording medium by the recording means is being performed, the control means determines that recording should be ended.

36. An image processing method, comprising:
using a processor to carry out the following:
extracting a feature value from an image, the feature value being a selected sequence of bits derived from a longer sequence of bits representing a sum of pixel values of pixels in an image data area of a frame, performing an operation to specify a process to be performed on the image, in accordance with the operation performed in the operation step, setting operation information according to which to perform the process on the image, recording the operation information indicating the operation performed in the operation step, in association with the feature value of the image, on a data recording medium, and determining whether the operation information should be recorded on the data recording medium, and controlling recording in accordance with a determination result.

37. A non-transitory computer readable medium on which a program is stored, the program being executable by a computer to perform a process comprising:

extracting a feature value from an image, the feature value being a selected sequence of bits derived from a longer sequence of bits representing a sum of pixel values of pixels in an image data area of a frame;

performing an operation to specify a process to be performed on the image;

in accordance with the operation performed in the operation step, setting operation information according to which to perform the process on the image; recording the operation information indicating the operation performed in the operation step, in association with the feature value of the image, on a data recording medium; and determining whether the operation information should be recorded on the data recording medium, and controlling recording in accordance with a determination result.

38. A processor encoded with instructions for carrying out a program to perform a process comprising:

extracting a feature value from an image, the feature value being a selected sequence of bits derived from a longer sequence of bits representing a sum of pixel values of pixels in an image data area of a frame;

performing an operation to specify a process to be performed on the image;

in accordance with the operation performed in the operation step, setting operation information according to which to perform the process on the image; recording the operation information indicating the operation performed in the operation step, in association with the feature value of the image, on a data recording medium; and determining whether the operation information should be recorded on the data recording medium, and controlling recording in accordance with a determination result.

39. An image processing apparatus, comprising:
a processor configured as the following:
a feature value extraction unit adapted to extract a feature value from an image, the feature value being a selected sequence of bits derived from a longer sequence of bits representing a sum of pixel values of pixels in an image data area of a frame, a setting unit adapted to set setting-information defining a process to be performed on the image, an editing unit adapted to edit the setting-information set by the setting unit, and recording unit adapted to record the setting-information edited by the editing unit, in association with the feature value of the image, on a data recording medium.

40. An image processing apparatus, comprising:

a processor configured as the following:

a feature value extraction unit adapted to extract a feature value from an image, the feature value being a selected sequence of bits derived from a longer sequence of bits representing a sum of pixel values of pixels in an image data area of a frame, setting unit adapted to set setting-information defining a process to be performed on the image, recording unit adapted to record the setting-information, in association with the feature value of the image, on a data recording medium, and a control unit adapted to determine whether the recording unit should record the setting-information on the data recording medium, and control recording performed by the recording unit in accordance with a determination result.

41. An image processing apparatus, comprising:

a processor configured as the following:

a feature value extraction unit adapted to extract a feature value from an image, the feature value being a selected sequence of bits derived from a longer sequence of bits representing a sum of pixel values of pixels in an image data area of a frame, an operation unit adapted to perform an operation to specify a process to be performed on the image, a setting unit adapted to, in accordance with the operation performed by the operation unit, set operation information according to which to perform the process on the image, an editing unit adapted to edit the operation information, and a recording unit adapted to record the operation information edited by the editing unit, in association with the feature value of the image, on a data recording medium.

42. An image processing apparatus, comprising:

a processor configured as the following:

a feature value extraction unit adapted to extract a feature value from an image, the feature value being a selected sequence of bits derived from a longer sequence of bits representing a sum of pixel values of pixels in an image data area of a frame, an operation unit adapted to perform an operation to specify a process to be performed on the image, a setting unit adapted to, in accordance with the operation performed by the operation unit, setting setting-information according to which to perform the process on the image, a recording unit adapted to record operation information indicating the operation performed by the operation unit, in association with the feature value of the image, on a data recording medium, and a control unit adapted to determine whether the recording unit should record the operation information on the data recording medium, and control recording performed by the recording unit in accordance with a determination result.

\* \* \* \* \*